United States Patent
Albrecht et al.

(10) Patent No.: US 12,157,947 B2
(45) Date of Patent: *Dec. 3, 2024

(54) SYSTEMS AND METHODS TO MAKE HYDROGEN GAS WITH A STEADY STATE pH DIFFERENTIAL

(71) Applicant: Verdagy, Inc., Moss Landing, CA (US)

(72) Inventors: Thomas Albrecht, Santa Clara, CA (US); Ryan J. Gilliam, San Jose, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,109

(22) Filed: Nov. 18, 2022

(65) Prior Publication Data

US 2023/0094222 A1   Mar. 30, 2023

Related U.S. Application Data

(63) Continuation of application No. 17/936,322, filed on Sep. 28, 2022.

(60) Provisional application No. 63/268,743, filed on Mar. 1, 2022, provisional application No. 63/249,133, filed on Sep. 28, 2021.

(51) Int. Cl.
| | |
|---|---|
| *C25B 1/04* | (2021.01) |
| *C25B 1/50* | (2021.01) |
| *C25B 9/19* | (2021.01) |
| *C25B 15/00* | (2006.01) |
| *C25B 15/02* | (2021.01) |
| *C25B 15/029* | (2021.01) |
| *C25B 15/031* | (2021.01) |
| *C25B 15/08* | (2006.01) |

(52) U.S. Cl.
CPC ............ *C25B 1/04* (2013.01); *C25B 1/50* (2021.01); *C25B 9/19* (2021.01); *C25B 15/00* (2013.01); *C25B 15/02* (2013.01); *C25B 15/029* (2021.01); *C25B 15/031* (2021.01); *C25B 15/087* (2021.01)

(58) Field of Classification Search
CPC ..................................................... C25B 1/04
See application file for complete search history.

(56) References Cited

U.S. PATENT DOCUMENTS

| | | |
|---|---|---|
| 2,843,537 A | 7/1958 | Carus |
| 2,908,620 A | 10/1959 | Carus |
| | (Continued) | |

FOREIGN PATENT DOCUMENTS

| | | |
|---|---|---|
| CN | 109208022 A | 1/2019 |
| CN | 110791773 | 2/2020 |
| | (Continued) | |

OTHER PUBLICATIONS

"U.S. Appl. No. 17/659,233, Non Final Office Action mailed Sep. 12, 2022", 10 pgs.

(Continued)

*Primary Examiner* — Salil Jain
(74) *Attorney, Agent, or Firm* — Schwegman Lundberg & Woessner, P.A.

(57) ABSTRACT

Disclosed herein are methods and systems that relate to electrochemically producing hydrogen gas by maintaining a steady-state pH differential of greater than 1 between an anode electrolyte and a cathode electrolyte in a hydrogen-gas generating electrochemical cell.

17 Claims, 8 Drawing Sheets

(56) References Cited

U.S. PATENT DOCUMENTS

| | | | |
|---|---|---|---|
| 3,062,734 | A | 11/1962 | Carus |
| 3,652,351 | A | 3/1972 | Guisti |
| 4,324,635 | A * | 4/1982 | Sweeney .................. C25B 9/19 204/266 |
| 5,660,712 | A | 8/1997 | Carus, III et al. |
| 11,613,816 | B2 * | 3/2023 | Albrecht .................. C25B 9/70 205/639 |
| 2010/0133111 | A1 | 6/2010 | Nocera et al. |
| 2012/0237440 | A1 | 9/2012 | Kodama et al. |
| 2014/0251819 | A1 * | 9/2014 | Logan ..................... C25B 1/02 204/252 |
| 2014/0318979 | A1 * | 10/2014 | Cronin .................... C25B 15/08 205/633 |
| 2015/0017494 | A1 | 1/2015 | Amstutz et al. |
| 2016/0222524 | A1 | 8/2016 | Joshi et al. |
| 2017/0306510 | A1 | 10/2017 | Rothschild et al. |
| 2018/0044267 | A1 | 2/2018 | Weiss et al. |
| 2018/0251903 | A1 | 9/2018 | Xiang et al. |
| 2018/0269515 | A1 | 9/2018 | Wang et al. |
| 2018/0305828 | A1 | 10/2018 | Takanami et al. |
| 2019/0284708 | A1 | 9/2019 | Weiss et al. |
| 2020/0040467 | A1 | 2/2020 | Rothschild et al. |
| 2020/0080209 | A1 | 3/2020 | Gilliam et al. |
| 2020/0270755 | A1 | 8/2020 | Modestino et al. |
| 2021/0054511 | A1 * | 2/2021 | Hosseiny ............. C25B 11/061 |
| 2021/0363651 | A1 | 11/2021 | Seymour et al. |
| 2022/0275520 | A1 | 9/2022 | Self et al. |
| 2022/0275521 | A1 | 9/2022 | Albrecht et al. |
| 2022/0275522 | A1 | 9/2022 | Self et al. |
| 2022/0325422 | A1 | 10/2022 | Albrecht et al. |
| 2023/0101593 | A1 * | 3/2023 | Albrecht .................. C25B 9/19 205/637 |
| 2023/0220561 | A1 | 7/2023 | Albrecht et al. |

FOREIGN PATENT DOCUMENTS

| | | | |
|---|---|---|---|
| CN | 117242209 | | 12/2023 |
| CN | 117545876 | | 2/2024 |
| JP | 2014502676 | A | 2/2014 |
| JP | 2024509839 | | 3/2024 |
| JP | 2024509842 | | 3/2024 |
| WO | 02066690 | | 8/2002 |
| WO | WO-2006113463 | A2 | 10/2006 |
| WO | WO-2018156480 | A1 * | 8/2018 ............... C25C 1/12 |
| WO | WO-2022187810 | A1 | 9/2022 |
| WO | WO-2022187811 | A1 | 9/2022 |
| WO | 2023056292 | | 4/2023 |

OTHER PUBLICATIONS

"U.S. Appl. No. 17/659,233, Response filed Aug. 10, 2022 to Restriction Requirement mailed Jul. 18, 2022", 7 pgs.
"U.S. Appl. No. 17/659,233, Response filed Nov. 4, 2022 to Non Final Office Action mailed Sep. 12, 2022", 16 pgs.
"U.S. Appl. No. 17/659,233, Restriction Requirement mailed Jul. 18, 2022", 7 pgs.
"U.S. Appl. No. 17/659,238, Non Final Office Action mailed Jul. 20, 2022", 10 pgs.
"U.S. Appl. No. 17/659,238, Response filed Jun. 28, 2022 to Restriction Requirement mailed Jun. 8, 2022", 7 pgs.
"U.S. Appl. No. 17/659,238, Response filed Oct. 20, 2022 to Non Final Office Action mailed Jul. 20, 2022", 13 pgs.
"U.S. Appl. No. 17/659,238, Restriction Requirement mailed Jun. 8, 2022", 6 pgs.
"International Application Serial No. PCT/US2022/070891, International Search Report mailed May 13, 2022", 3 pgs.
"International Application Serial No. PCT/US2022/070891, Written Opinion mailed May 13, 2022", 6 pgs.
"International Application Serial No. PCT/US2022/070892, International Search Report mailed May 11, 2022", 3 pgs.
"International Application Serial No. PCT/US2022/070892, Written Opinion mailed May 11, 2022", 6 pgs.

Anantharaj, Sengeni, et al., "Membrane free water electrolysis under 1.23 V with Ni3Se4/Ni anode in alkali and Pt cathode in acid", Applied Surface Science 478, (2019), pp. 184-192.
Issa, I. M., et al., "The Stability of Potassium Permanganate in Alkaline Solutions Containing Telluric Acid", Journal of the American Chemical Society 77.21, (1955), pp. 5503-5504.
Lin, Kaixiang, et al., "Alkaline quinone flow battery", Science 349.6255, (2015), pp. 1529-1532.
Teschke, O., et al., "Operation of a steady-state pH-differential water electrolysis cell", International Journal of Hydrogen Energy 7.12, (1982), pp. 933-937.
Teschke, O., "Theory and operation of a steady-state pH differential water electrolysis cell", Journal of Applied Electrochemistry 12.2, (1982), pp. 219-223.
Veprek-Siška, J., et al., "The mechanism of the decomposition of alkaline permanganate solutions", Journal of Inorganic and Nuclear Chemistry 31.3, (1969), pp. 789-798.
"U.S. Appl. No. 17/659,233, Notice of Allowance mailed Nov. 18, 2022", 9 pgs.
"U.S. Appl. No. 17/659,238, Final Office Action mailed Nov. 23, 2022", 11 pgs.
"U.S. Appl. No. 17/659,238, Response filed Feb. 20, 2023 to Final Office Action mailed Nov. 23, 2022", 11 pgs.
Palumbo, "Solar thermal decoupled water electrolysis process 1: Proof of concept", Chemical Engineering Science. vol. 84, (Aug. 23, 2012), 372-380.
"U.S. Appl. No. 18/171,545, Preliminary Amendment filed Mar. 28, 2023", 7 pgs.
"International Application Serial No. PCT US2022 077170, International Search Report mailed Mar. 28, 2023", 3 pgs.
"International Application Serial No. PCT US2022 077170, Written Opinion mailed Mar. 28, 2023", 5 pgs.
"U.S. Appl. No. 17/936,322, Non Final Office Action mailed May 11, 2023", 22 pgs.
"U.S. Appl. No. 17/936,322, Response filed Aug. 11, 2023 to Non Final Office Action mailed May 11, 2023", 14 pages.
"U.S. Appl. No. 17/936,322, Final Office Action mailed Aug. 22, 2023", 21 pages.
"International Application Serial No. PCT US2022 070891, International Preliminary Report on Patentability mailed Sep. 14, 2023", 8 pages.
"International Application Serial No. PCT US2022 070892, International Preliminary Report on Patentability mailed Sep. 14, 2023", 8 pages.
"Japanese Application Serial No. 2023-553422, Voluntary Amendment filed Oct. 27, 2023", with English claims, 16 pages.
"Japanese Application Serial No. 2023-553395, Voluntary Amendment filed Oct. 27, 2023", with English claims, 13 pages.
"U.S. Appl. No. 17/936,322, Non Final Office Action mailed Feb. 16, 2024", 9 pgs.
"U.S. Appl. No. 17/659,238, Response filed Feb. 29, 2024 to Non Final Office Action mailed Nov. 30, 2023", 15 pgs.
"U.S. Appl. No. 17/659,238, Final Office Action mailed Mar. 15, 2024", 11 pgs.
"International Application Serial No. PCT US2022 077170, International Preliminary Report on Patentability mailed Apr. 11, 2024", 7 pgs.
"U.S. Appl. No. 17/936,322, Response filed Nov. 21, 2023 to Final Office Action mailed Aug. 22, 2023", 14 pgs.
"U.S. Appl. No. 17/659,238, Non Final Office Action mailed Nov. 30, 2023", 12 pgs.
"U.S. Appl. No. 17/936,322, Advisory Action mailed Nov. 30, 2023", 3 pgs.
"U.S. Appl. No. 17/936,322, Response filed May 3, 2024 to Non Final Office Action mailed Feb. 16, 2024", 10 pgs.
"U.S. Appl. No. 17/936,322, Examiner Interview Summary mailed May 3, 2024", 2 pgs.
"U.S. Appl. No. 17/936,322, Notice of Allowance mailed Jun. 14, 2024", 8 pages.
"U.S. Appl. No. 17/936,322, Notice of Allowability mailed Jun. 26, 2024", 4 pages.
"Australian Application Serial No. 2022230462, First Examination Report mailed Aug. 22, 2024", 4 pages.

(56) References Cited

OTHER PUBLICATIONS

"Australian Application Serial No. 2022228486, First Examination Report mailed Aug. 22, 2024", 4 pages.

\* cited by examiner

SYSTEMS AND METHODS TO MAKE HYDROGEN GAS WITH A STEADY STATE pH DIFFERENTIAL

CROSS-REFERENCE TO RELATED APPLICATION

This application is a continuation of U.S. application Ser. No. 17/936,322, filed Sep. 28, 2022, which claims the benefit of priority to U.S. Provisional Patent Application Ser. No. 63/249,133, filed on Sep. 28, 2021, and to U.S. Provisional Application Ser. No. 63/268,743, filed on Mar. 1, 2022, the disclosures of each of which are incorporated by reference herein in their entireties.

BACKGROUND

As electricity production migrates to lower $CO_2$ footprint technologies, the ability to convert electricity into low-carbon/zero-carbon transportation fuels has become an increasingly important challenge in mitigating global $CO_2$ emissions. Among the options for such fuels, hydrogen ($H_2$) may have a unique advantage in that its oxidation product is water. Thus, hydrogen represents a low-carbon transportation fuel if it can be manufactured with a low-carbon footprint.

Hydrogen may be generated as a co-product in a number of industrially important processes such as steam cracking and the chloro-alkali process. On-purpose hydrogen production may be typically accomplished via a process known as steam-methane reforming (SMR), which converts the hydrogen atoms in both methane and water to hydrogen gas. Although this process can produce large amounts of hydrogen, the carbon atoms that were initially present in the methane ultimately leave the process as $CO_2$ emissions. Any effort to use hydrogen as a zero-carbon or low carbon transportation fuel would require another process.

SUMMARY

There are provided methods and systems herein that relate to the production of hydrogen gas and other commercially valuable products.

The present disclosure describes a method to generate hydrogen gas, the method comprising:
 providing an anode and an anode electrolyte in an electrochemical cell;
 providing a cathode and a cathode electrolyte in the electrochemical cell;
 forming hydrogen gas and hydroxide ions at the cathode;
 separating the anode electrolyte from the cathode electrolyte by a separator, such as an anion exchange membrane (AEM);
 migrating the hydroxide ions from the cathode electrolyte to the anode electrolyte through the separator; and
 maintaining a steady-state pH differential of greater than about 1 between the anode electrolyte and the cathode electrolyte.

In an example, the method further comprises operating the electrochemical cell at a theoretical voltage of less than about 1.23 V.

In an example, the pH of the cathode electrolyte is lower than pH of the anode electrolyte.

In an example, a pH of the anode electrolyte is from about 10 to about 15 and a pH of the cathode electrolyte is from about 8 to about 13.

In an example, the method further comprises adding a salt comprising a polyatomic anion to the cathode electrolyte. In an example, the polyatomic anion is selected from the group consisting of: carbonate, citrate, oxalate, ethylenediaminetetraacetic acid (EDTA), malate, acetate, phosphate, sulfate, and combinations thereof. In an example, a cation in the salt is selected from the group consisting of: lithium, sodium, potassium, and combinations thereof. In an example, the concentration of the salt is from about 0.1 M to about 3 M. In an example, the salt does not react with hydrogen gas and/or hydroxide ions in the cathode electrolyte. In an example, the salt is stable in the cathode electrolyte and does not migrate across the separator to the anode electrolyte. In an example, the method further comprises providing conductivity to the cathode electrolyte by adding the salt to the cathode electrolyte.

In an example, the method further comprises reducing water at the cathode to form the hydrogen gas and the hydroxide ions.

In an example, the method further comprises adding water to the cathode electrolyte from an external feedstock, or from an anode chamber, or both.

In an example, the method further comprises removing water thermally internally or externally from the anode chamber of the electrochemical cell and transferring the water to a cathode chamber.

In an example, the method further comprises oxidizing the hydroxide ions at the anode to form oxygen gas.

In an example, the anode electrolyte further comprises a redox mediator. In an example, the method further comprises oxidizing the redox mediator from a lower oxidation state to a higher oxidation state at the anode. In an example, the method further comprises transferring the anode electrolyte comprising the redox mediator in the higher oxidation state outside the electrochemical cell and subjecting the anode electrolyte to a thermal reaction to form oxygen gas and the redox mediator in the lower oxidation state. In an example, the method further comprises transferring the anode electrolyte comprising the redox mediator in the lower oxidation state back to the anode electrolyte of the electrochemical cell.

In an example, the method further comprises transferring at least a portion of the anode electrolyte comprising the redox mediator in the higher oxidation state outside the electrochemical cell; adding the transferred portion of the anode electrolyte to a second cathode electrolyte of a second electrochemical cell; reducing the redox mediator in the higher oxidation state to the lower oxidation state at a second cathode of the second electrochemical cell; migrating hydroxide ions from the second cathode electrolyte to a second anode electrolyte of the second electrochemical cell through a second separator (such as a second AEM) in the second electrochemical cell; and oxidizing the hydroxide ions at a second anode in the second electrochemical cell to form oxygen gas.

In an example, no oxygen gas is formed at the anode or less than 25% of the Faradaic efficiency is for the oxygen evolution reaction at the anode in the electrochemical cell.

In an example, the redox mediator is a redox metal oxyanion, or a redox non-metal oxyanion, or both.

In an example, a corresponding cation for the redox metal oxyanion or the redox non-metal oxyanion is an alkali metal cation or an alkali earth metal cation.

In an example, the alkali metal cation is sodium, potassium or lithium or the alkali earth metal cation is calcium, magnesium, or strontium.

In an example, the anode electrolyte further comprises a redox metal salt.

In an example, the method further comprises oxidizing the redox metal salt to a redox metal hydroxy salt at the anode. In an example, the method further comprises transferring the anode electrolyte comprising the redox metal hydroxy salt outside the electrochemical cell and subjecting the anode electrolyte to a thermal reaction to form oxygen gas and the redox metal salt. In an example, the method further comprises transferring the anode electrolyte comprising the redox metal salt back to the anode electrolyte of the electrochemical cell.

In an example, the method further comprises transferring at least a portion of the anode electrolyte comprising the redox metal hydroxy salt outside the electrochemical cell; adding the transferred portion of the anode electrolyte to a second cathode electrolyte of a second electrochemical cell; reducing the redox metal hydroxy salt to the redox metal salt at a second cathode of the second electrochemical cell; migrating hydroxide ions from the second cathode electrolyte to a second anode electrolyte of the second electrochemical cell through a second separator of the second electrochemical cell; and oxidizing the hydroxide ions at a second anode in the second electrochemical cell to form oxygen gas.

In an example, the anode electrolyte further comprises an alkali metal halide or an alkali earth metal halide.

In an example, the redox metal ion in the redox mediator or the redox metal oxyanion or the redox metal salt is selected from the group consisting of: manganese (Mn), iron (Fe), chromium (Cr), selenium (Se), copper (Cu), tin (Sn), silver (Ag), cobalt (Co), uranium (U), lead (Pb), mercury (Hg), vanadium (V), bismuth (Bi), titanium (Ti), ruthenium (Ru), osmium (Os), europium (Eu), zinc (Zn), cadmium (Cd), gold (Au), nickel (Ni), palladium (Pd), platinum (Pt), rhodium (Rh), iridium (Ir), technetium (Tc), rhenium (Re), molybdenum (Mo), tungsten (W), niobium (Nb), tantalum (Ta), zirconium (Zr), hafnium (Hf), and combination thereof.

In an example, the redox metal ion in the redox mediator or the redox metal oxyanion or the redox metal salt is selected from the group consisting of: manganese, chromium, copper, iron, tin, selenium, tantalum, and combinations thereof.

In an example, the redox metal oxyanion with the redox metal ion in the lower oxidation state is selected from the group consisting of: $MnO_4^{2-}$, $FeO_4^{2-}$, $RuO_4^{2-}$, $OsO_4^{2-}$, $HSnO_2^-$, $SeO_3^{2-}$, $Cu_2O$, $CrO_3^{3-}$, $TeO_3^{2-}$, and combinations thereof.

In an example, the redox metal oxyanion with the redox metal ion in the higher oxidation state is selected from the group consisting of: $MnO_4^-$, $HFeO_2^-$, $RuO_4^-$, $OsO_5^{2-}$, $SnO_3^{2-}$, $SeO_4^{2-}$, $CuO_4^{2-}$, $TeO_4^{2-}$, and combinations thereof.

In an example, the redox non-metal ion in the redox non-metal oxyanion is selected from the group consisting of: halogen, carbon, sulfur, nitrogen, and phosphorus.

In an example, the redox non-metal ion in the redox non-metal oxyanion is a halogen selected from chloro, fluoro, bromo, or iodo atoms.

In an example, the redox non-metal oxyanion with the redox non-metal ion in the lower oxidation state is selected from the group consisting of: $NO_2^-$, $PO_3^{3-}$, $SO_3^{2-}$, $ClO^-$, $ClO_2^-$, $ClO_3^-$, $BrO^-$, $BrO_2^-$, $BrO_3^-$, $IO^-$, $IO_2^-$, $IO_3^-$, and combinations thereof.

In an example, the redox non-metal oxyanion with the redox non-metal ion in the higher oxidation state is selected from the group consisting of: $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, $IO_4^-$, and combinations thereof.

In an example, the redox metal salt is selected from the group consisting of: CuCl, CuBr, CuI, $FeCl_2$, $FeBr_2$, $FeI_2$, $SnCl_2$, $SnBr_2$, $SnI_2$, $Cu_2SO_4$, $FeSO_4$, $SnSO_4$, $Cu^3PO_4$, $Fe_3(PO_4)_2$, $Sn_3(PO_4)^2$, and combinations thereof.

In an example, the redox metal hydroxy salt is a redox metal hydroxy halide selected from the group consisting of: $Cu(OH)_xCl_y$, $Cu(OH)_xBr_y$, $Cu(OH)_xI_y$, $Fe(OH)_xCl_y$, $Fe(OH)_xBr_y$, $Fe(OH)_xI_y$, and combinations thereof, wherein x and y are integers and add to balance the charge on the metal.

In an example, the anode electrolyte further comprises a redox organic compound.

In an example, the redox organic compound is hydroquinone.

In an example, the method further comprises oxidizing the hydroquinone to quinone at the anode. In an example, the method further comprises transferring at least a portion of the anode electrolyte comprising quinone outside the electrochemical cell; adding the transferred portion of the anode electrolyte to a second cathode electrolyte of a second electrochemical cell; reducing the quinone to hydroquinone at a second cathode of the second electrochemical cell; migrating hydroxide ions from the second cathode electrolyte to a second anode electrolyte in the second electrochemical cell through a second separator (such as a second AEM) in the second electrochemical cell; and oxidizing the hydroxide ions at a second anode in the second electrochemical cell to form oxygen gas. In an example, the method further comprises transferring at least a portion of the second cathode electrolyte comprising hydroquinone back to the anode electrolyte of the first electrochemical cell.

In an example, the temperature of the electrochemical cell is from about 50° C. to about 100° C.

The present disclosure also describes an electrochemical cell to generate hydrogen gas, the electrochemical cell comprising:

an anode and an anode electrolyte;
a cathode and a cathode electrolyte comprising water, wherein the cathode is configured to reduce water to form hydroxide ions and hydrogen gas; and
a separator (such as an anion exchange membrane (AEM)) disposed between the anode electrolyte and the cathode electrolyte and configured to migrate the hydroxide ions from the cathode electrolyte to the anode electrolyte;
wherein the electrochemical cell is configured to maintain a steady-state pH differential of greater than about 1 between the anode electrolyte and the cathode electrolyte.

In an example, the cathode electrolyte further comprises a salt comprising a polyatomic anion.

In an example, a system that includes the electrochemical cell further comprises a water recirculation system configured to remove water thermally internally or externally from an anode chamber of the electrochemical cell and transfer at least a portion of the removed water to a cathode chamber of the electrochemical cell.

In an example, the anode is configured to oxidize the hydroxide ions to form oxygen gas. In an example, the anode is configured to oxidize the hydroxide ions to form oxygen gas and oxidize a redox mediator at different current densities, as provided herein.

In an example, the anode electrolyte further comprises a redox mediator selected from the group consisting of: a redox metal oxyanion, a redox non-metal oxyanion, a redox metal salt, a redox organic compound, and combinations thereof, and the anode is configured to oxidize the redox mediator from a lower oxidation state to a higher oxidation state. In an example, the system including the electrochemical cell further comprises a thermal reactor operably connected to the electrochemical cell and configured to receive at least a portion of the anode electrolyte comprising the redox mediator in the higher oxidation state, wherein the thermal reactor is configured to subject the portion of the anode electrolyte to a thermal reaction to form oxygen gas and the redox mediator in the lower oxidation state. In an example, the system that includes the electrochemical cell further comprises a second electrochemical cell operably connected to the electrochemical cell and configured to receive at least a portion of the anode electrolyte comprising redox mediator in the higher oxidation state in a second cathode electrolyte of the second electrochemical cell; to reduce the redox mediator from the higher oxidation state to the lower oxidation state at a second cathode of the second electrochemical cell; to migrate hydroxide ions from the second cathode electrolyte to a second anode electrolyte through a second separator (such as a second AEM) in the second electrochemical cell; and to oxidize the hydroxide ions at a second anode in the second electrochemical cell to form oxygen gas.

BRIEF DESCRIPTION OF THE DRAWINGS

The drawings illustrate generally, by way of example, but not by way of limitation, various embodiments discussed in the present document.

DETAILED DESCRIPTION

Figure 1:
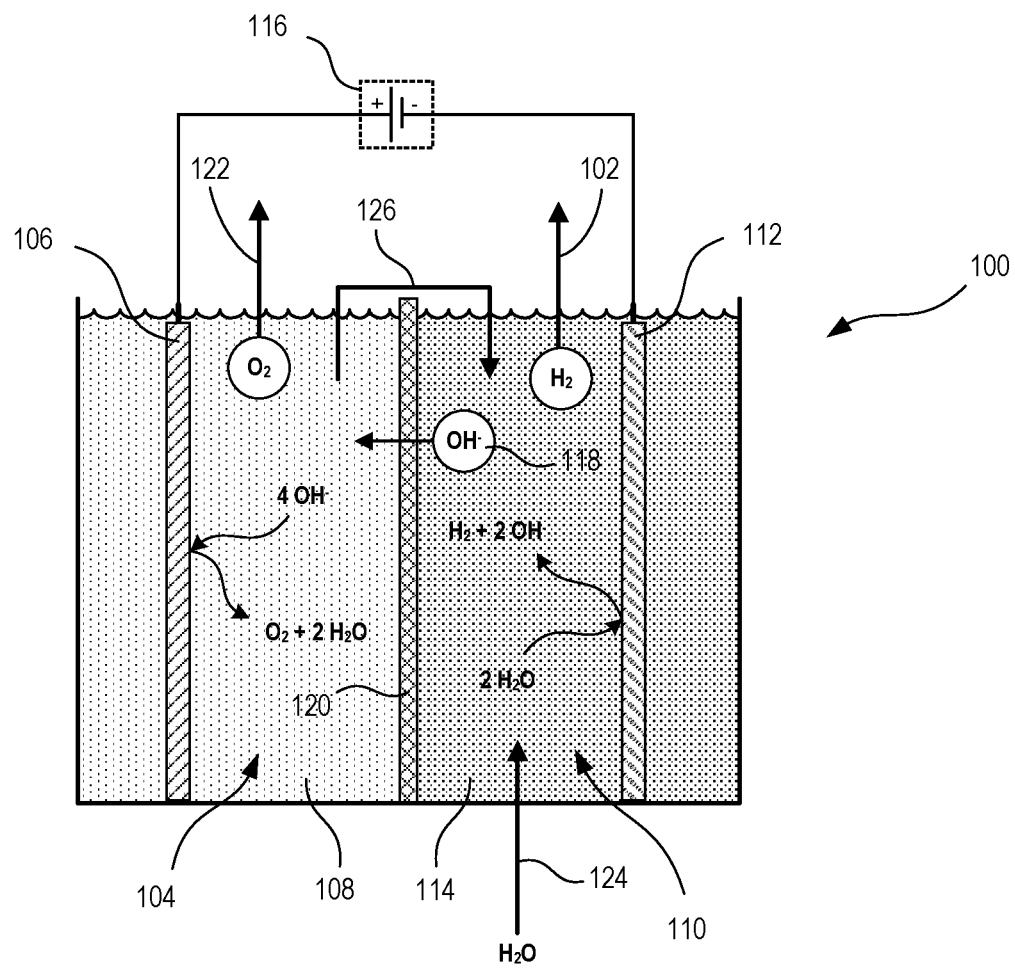
FIG. 1 is an illustration of an example electrochemical cell configured for the formation of hydrogen gas and hydroxide ions at a cathode.

Disclosed herein are systems and methods that relate to environmentally friendly and low-cost production of hydrogen gas and other commercially valuable products. Other commercially valuable products include, but not limited to, oxygen gas.

Hydrogen gas can be formed electrochemically by water splitting reaction where water is split into oxygen gas and hydrogen gas at an anode and a cathode of an electrochemical cell, respectively. Examples of such electrochemical processes include, without limitation, proton electrolyte membrane (PEM) electrolysis and alkaline water electrolysis (AWE). However, in such electrochemical reactions, operating energy of the cell is relatively high due to additional energy costs as a result of various energy inefficiencies. For example, to reduce unwanted migration of ionic species between the electrodes, the cathode and the anode may be separated by a component, such as a membrane, which may reduce these migrations. Although the components may improve the overall efficiency of the cell, they may come at a cost of additional resistive losses in the cell which in turn may increase the operating voltage. Other inefficiencies in water electrolysis may include solution resistance losses, electric conduction inefficiencies, and electrode over-potentials, among others. These various inefficiencies and the capital costs associated with reducing them can play an important role in the economic viability of hydrogen generation via water splitting electrolysis.

The methods and systems described herein relate to a unique electrochemical process and a unique combination of electrochemical and thermochemical or thermal processes or a combination of two electrochemical processes, or both, that when combined result in relatively efficient, lower-cost, and lower-energy production of hydrogen gas.

As will be appreciated by those having skill in the art, it is to be understood that the invention is not limited to the particular embodiments described herein, as such may, of course, vary. It is also to be understood that the terminology used herein is for the purpose of describing particular example embodiments only and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the range. The upper and lower limits of these smaller ranges may independently be included in the smaller ranges, subject to any specifically excluded limit in the stated range. Where the stated range includes one or both of the limits, ranges excluding either or both of those included limits are also included in the range.

The term "about," as used herein, can allow for a degree of variability in a value or range, for example, within 10%, within 5%, within 1%, within 0.5%, within 0.1%, within 0.05%, within 0.01%, within 0.005%, or within 0.001% of a stated value or of a stated limited of a range, and includes the exact stated value or limit of the range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

Unless defined otherwise, all technical and scientific terms used herein have the same meaning as commonly understood by one of ordinary skill in the art. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual examples described and illustrated herein have discrete components and features which may be readily separated from or combined with the features of any of the other several examples without departing from the scope or spirit of the present invention. Any recited method can be carried out in the order of events recited or in any other order which is logically possible.

Methods and Systems

A theoretical potential for water electrolysis to produce hydrogen gas may be about 1.23 V under standard conditions. Applicants have found unique methods and systems to lower the electrical energy needed for the hydrogen generating reaction so that more hydrogen gas can be produced per kWh of electricity or that less kWh of electricity is needed to make a desired amount of the hydrogen gas. Applicants have found unique methods and systems whereby maintaining a steady-state pH differential between the anode electrolyte and the cathode electrolyte, e.g., increasing the pH of the anolyte and/or decreasing the pH of the catholyte, the sum of the reactions at the anode and the cathode may result in a theoretical potential of less than 1.23 V. As used herein, the term "pH differential" refers to the difference in pH between the electrolyte in the anode chamber of the electrochemical cell (also referred to as the "anode electrolyte") and the electrolyte in the cathode chamber of the electrochemical cell (also referred to as the "cathode electrolyte"). As used herein, the term "steady-state pH differential" refers to the pH differential between the anode electrolyte and the cathode electrolyte after the electrochemical cell has been operating for a sufficiently long period of time that the cell has reached an equilibrium state, i.e., wherein the pHs of the anode and cathode electrolytes do not vary or substantially do not vary over time.

The methods and systems provided herein include alkaline water electrolysis employing a separator, such as a membrane, for example an anion exchange membrane (AEM), to separate the two electrode chambers, each of which can use alkaline electrolytes, such as but not limited to, NaOH or KOH. In an example, the catholyte may be at a lower pH and the anolyte may be a relatively higher pH solution, both of which can be maintained at their respective pH via thermal means for water balance. The theoretical voltage for the entire water electrolysis reaction may be $1.23-0.059*\Delta pH$ volts, where $\Delta pH$ is the pH difference between the anolyte and catholyte. For example, an anolyte pH of 15 and catholyte pH of 11 would have a theoretical water electrolysis potential of 0.994 V, or 0.236 V less than the 1.23 V theoretical potential.

In one aspect, a method to generate hydrogen gas is provided, the method comprising:
  providing an anode and an anode electrolyte in an electrochemical cell;
  providing a cathode and a cathode electrolyte in the electrochemical cell;
  forming hydrogen gas and hydroxide ions at the cathode;
  separating the anode electrolyte from the cathode electrolyte by a separator, such as an anion exchange membrane (AEM);
  migrating the hydroxide ions from the cathode electrolyte to the anode electrolyte through the separator; and
  maintaining a steady-state pH differential of greater than about 1 between the anode electrolyte and the cathode electrolyte.

In an example, the method further comprises operating the electrochemical cell at a voltage of less than 1.23 V.

In one aspect, an electrochemical cell to generate hydrogen gas is provided, the electrochemical cell comprising:
  an anode and an anode electrolyte;
  a cathode and a cathode electrolyte comprising water, wherein the cathode is configured to reduce water to form hydroxide ions and hydrogen gas; and
  a separator (such as an anion exchange membrane (AEM)) disposed between the anode electrolyte and the cathode electrolyte and configured for migration of the hydroxide ions from the cathode electrolyte to the anode electrolyte;
  wherein the electrochemical cell is configured to maintain a steady-state pH differential of greater than about 1 between the anode electrolyte and the cathode electrolyte.

FIG. 1 shows a schematic diagram of an example electrochemical cell 100 configured to generate hydrogen gas 102. The electrochemical cell 100 includes an anode chamber 104 that houses an anode 106 and an anode electrolyte 108 and a cathode chamber 110 that houses a cathode 112 and a cathode electrolyte 114. A voltage source 116 is electrically connected to the anode 106 and the cathode 112 and is configured to apply a potential across the electrodes 106, 112, as is known in the art. The cathode 112 is configured so that when the potential is applied across the electrodes 106, 112 by the voltage source 116, water ($H_2O$) within the cathode electrolyte 114 is reduced to form hydroxide ions 118 ($OH^-$) and the hydrogen gas 102 ($H_2$), such as via the reaction described below. A separator 120, which can be a membrane such as an anion exchange membrane (referred to as the "AEM 120" for brevity), separates the anode chamber 104 from the cathode chamber 110. The AEM 120 is configured to allow for the migration of the hydroxide ions 118 from the cathode electrolyte 114 in the cathode chamber 110 to the anode electrolyte 108 in the anode chamber 104. As described in more detail below, the electrochemical cell 100 is configured to maintain a steady-state pH differential between a pH of the anode electrolyte 108 (also referred to as the "first pH") and a pH of the cathode electrolyte 114 (also referred to as the "second pH"). In an example, the anode 106 is configured so that when the potential is applied by the voltage source 116, hydroxide ions 118 that had migrated across the AEM 120 are oxidized to form oxygen gas 122 ($O_2$) and water ($H_2O$).

In an example, the electrochemical cell 100 is configured to operate at a voltage of less than 1.23 V.

In an example, a pH of the cathode electrolyte 114 is lower than a pH of the anode electrolyte 108. In an example, the pH of the anode electrolyte 108 is from about 10 to about 15 and the pH of the cathode electrolyte 114 is from about 8 to about 13. In an example, the pH of the anode electrolyte 108 is from about 10 to about 15 and the pH of the cathode electrolyte is from about 8 to about 13 while maintaining the steady-state pH differential of greater than about 1 between the anode electrolyte 108 and the cathode electrolyte 114.

In an example, the pH of the anode electrolyte 108 is from about 10 to about 15, for example from about 10 to about 14, such as from about 10 to about 13, for example from about 10 to about 12, such as from about 10 to about 11, for example from about 11 to about 15, such as from about 11 to about 14, for example from about 11 to about 13, such as from about 11 to about 12, for example from about 12 to about 15, such as from about 12 to about 14, for example from about 12 to about 13, such as from about 13 to about 15, for example from about 13 to about 14, such as from about 14 to about 15.

In an example, the pH of the cathode electrolyte 114 is from about 8 to about 13, for example from about 8 to about 12, such as from about 8 to about 11, for example from about 8 to about 10, such as from about 8 to about 9, for example from about 9 to about 13, such as from about 9 to about 12, for example from about 9 to about 11, such as from about 9 to about 10 for example from about 10 to about 13, such as from about 10 to about 12, for example from about 10 to about 11 for example from about 11 to about 13, such as from about 11 to about 12, for example from about 12 to about 13.

In an example, the pH of the anode electrolyte 108 is between about 10 to about 15, for example from about 10 to about 14, such as from about 10 to about 13, for example from about 10 to about 12, such as from about 10 to about 11; and the pH of the cathode electrolyte 114 is between about 8 to about 13, for example from about 8 to about 12, such as from about 8 to about 11, for example from about 8 to about 10, such as from about 8 to about 9.

In an example, the pH of the anode electrolyte 108 is between about 12 to about 15, for example from about 12 to about 14, such as from about 12 to about 13, for example from about 13 to about 15, such as from about 13 to about 14, for example from about 14 to about 15; and the pH of the cathode electrolyte 114 is between about 11 to about 13, such as from about 11 to about 12, for example from about 12 to about 13.

In an example, the steady-state pH differential between the anode electrolyte 108 and the cathode electrolyte 114 is greater than 1, for example from about 1 to about 7, such as from about 1 to about 6, for example from about 1 to about 5, such as from about 1 to about 4, for example from about 1 to about 3, such as from about 1 to about 2, for example from about 2 to about 7, such as from about 2 to about 6, for example from about 2 to about 5, such as from about 2 to about 4, for example from about 2 to about 3, such as from about 3 to about 7, for example from about 3 to about 6, such as from about 3 to about 5, for example from about 3 to about 4, such as from about 4 to about 7, for example from about 4 to about 6, such as from about 4 to about 5, for example from about 5 to about 7, such as from about 5 to about 6, for example from about 6 to about 7.

In an example, the pH of the anode electrolyte 108 is between about 10 to about 15, for example from about 10 to about 14, such as from about 10 to about 13, for example from about 10 to about 12, such as from about 10 to about 11; the pH of the cathode electrolyte 114 is between about 8 to about 13, for example from about 8 to about 12, such as from about 8 to about 11, for example from about 8 to about 10, such as from about 8 to about 9; and the steady-state pH differential between the anode electrolyte 108 and the cathode electrolyte 114 is between about 1 to about 6, for example from about 1 to about 5, such as from about 1 to about 4, for example from about 1 to about 3, such as from about 1 to about 2.

Cathode Chamber and Reactions at the Cathode

In an example, the cathode chamber 110 comprises the cathode 112 and the cathode electrolyte 114, wherein the pH of the cathode electrolyte 114 is from about 8 to about 13, for example from about 11 to about 13, such as from about 8 to about 11. An example of the reaction that takes place at the cathode 112 is shown below and is also illustrated in FIG. 1:

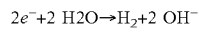

$2e^- + 2\ H2O \rightarrow H_2 + 2\ OH^-$

The hydrogen gas 102 formed at the cathode 112 may be captured and stored for commercial purposes.

As illustrated in FIG. 1, in the electrochemical cell 100 there is a formation of the hydrogen gas 102 and the hydroxide ions 118 at the cathode 112. The cathode chamber 110 and the anode chamber 104 are separated by the AEM 120 and at least a portion of the hydroxide ions 118 pass through the AEM 120 from the cathode electrolyte 114 to the anode electrolyte 108. Various reactions that can occur at the anode 106 are described in more detail below.

Figure 6:
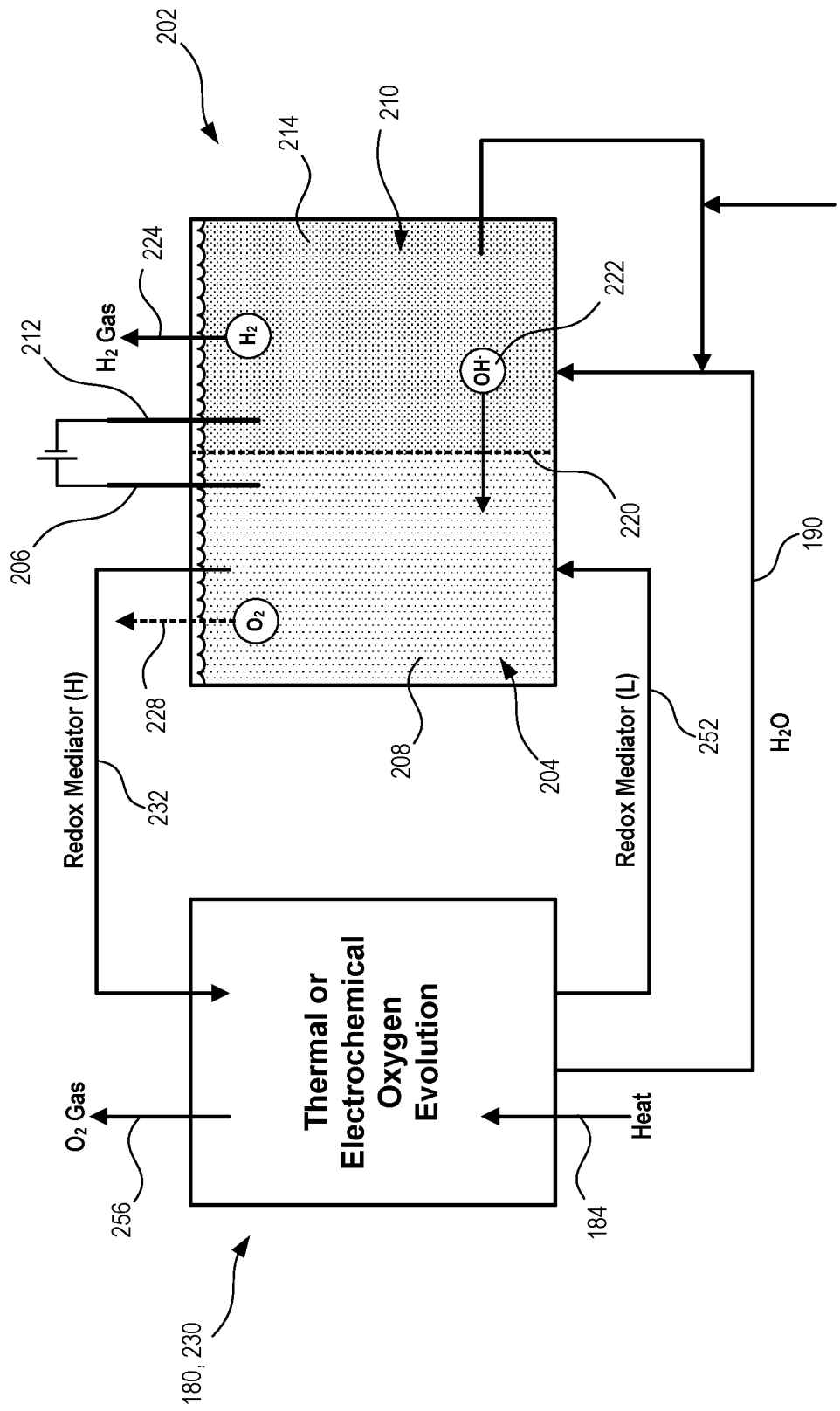
FIG. 6 is an illustration of another example system configured for the formation of hydrogen gas at a cathode of an electrochemical cell; oxidation of a redox mediator at an anode of the electrochemical cell; formation of oxygen gas at the anode of the electrochemical cell; and a thermal reactor and/or a second electrochemical reaction configured for reaction of the redox mediator to form oxygen gas.

The pHs of the cathode electrolyte 114 and the anode electrolyte 108 can be maintained via thermal means for water balance. In an example, water 124 is added to the cathode chamber 110, wherein the water 124 can be from an external feedstock or can be recirculated from the anode chamber 108, such as via the methods shown in FIGS. 2 and 6 (described in more detail below). In some examples, water may be removed thermally internally or externally from the anode chamber 104 of the electrochemical cell 100 and transferred to the cathode chamber 110, such as via an electrolyte circulation line 126. Means for the transfer of water or electrolyte between the anode chamber 104 and the cathode chamber 110 are well known in the art and include without limitation conduits, pipes, and/or tanks for the storage and/or transfer.

In an example, a balance between the electrical conductivity and the pH of the cathode electrolyte 114 is maintained such that the pH of the cathode electrolyte 114 is lower than the pH of the anode electrolyte 108 and such that the cathode electrolyte 114 has an electrical conductivity that does not adversely affect the cell voltage owing to a large resistance across the electrochemical cell 100. In an example, the cathode electrolyte 114 includes a salt comprising a polyatomic anion. The term "polyatomic anion," used herein, includes a covalently bonded set of two or more atoms that has a non-zero net charge. Examples of the polyatomic anion salt of the cathode electrolyte 114 include, but are not limited to, a carbonate, a citrate, an oxalate, ethylene diamine tetraacetic acid (EDTA), a malate, an acetate, a phosphate, a sulfate, or combinations thereof. In an example, the salt comprising polyatomic anion includes a cation, wherein the cation is selected from the group consisting of lithium, sodium, potassium, rubidium, cesium, or the like, and combinations thereof.

It is to be understood that this "polyatomic anion in the salt" or "salt comprising polyatomic anion" in the cathode electrolyte 114 is different from the "metal oxyanion" or "non-metal oxyanion" or "metal salt" in the anode electrolyte 108 (described in more detail below) or any other "salt" or "saltwater" in the electrolytes 108, 114, as described herein.

In an example, the aforementioned salt comprising cations and the polyatomic anion is selected such that the salt is stable and soluble in alkaline (i.e., pH>7) conditions and possesses one or more properties, such as, but not limited to, not blocking the transport mechanism of the separator, not migrating through the separator, not reacting at the cathode, and/or not reacting with hydroxide, hydrogen, or oxygen. In an example, the polyatomic anion is such that the anion is selectively rejected by the AEM 120 so that only or substantially only the hydroxide ions 118 are transported across the AEM 120 from the cathode chamber 110 to the anode chamber 104 to maintain the steady-state pH differential. In an example, the polyatomic anion may also be selected such that the anion is stable in a reducing environment so that water is reduced at the cathode 112 instead of the polyatomic anion. In an example, the corresponding cation in the salt is selected such that the cation does not diffuse through the AEM 120 from the cathode chamber 110 to the anode chamber 104 and is not reduced at the cathode 112.

In an example, a concentration of the aforementioned salt comprising the polyatomic anion within the cathode electrolyte is from about 0.1 M to about 3 M, for example from about 0.1 M to about 2.5 M, such as from about 0.1 M to about 2 M, for example from about 0.1 M to about 1.5 M, such as from about 0.1 M to about 1 M, for example from about 0.1 M to about 0.5 M, such as from about 0.5 M to about 3 M, for example from about 0.5 M to about 2.5 M, such as from about 0.5 M to about 2 M, for example from about 0.5 M to about 1.5 M, such as from about 0.5 M to about 1 M, for example from about 1 M to about 3 M, such as from about 1 M to about 2.5 M, for example from about 1 M to about 2 M, such as from about 1 M to about 1.5 M, for example from about 1.5 M to about 3 M, such as from about 1.5 M to about 2.5 M, for example from about 1.5 M to about 2 M, such as from about 2 M to about 3 M, for example from about 2 M to about 2.5 M.

Anode Chamber and Reactions at the Anode

In an example, for the aforementioned reaction at the cathode 112 described above, the reaction or reactions at the anode 106 can be any desired oxidation reaction. Some examples for reactions at the anode 106 in combination with the foregoing cathode reactions, are described below.

Oxygen Evolution at the Anode

In an example, the hydroxide ions 118 formed at the cathode 112 and transported to the anode chamber 104 through the AEM 120 are oxidized at the anode 106 to form oxygen gas. Just such an anode reaction is shown below and is illustrated e.g., in FIG. 1:

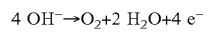

4 OH⁻→O₂+2 H₂O+4 e⁻

The oxygen gas 122 may be vented out or captured and stored for commercial purposes.

As illustrated in FIG. 1, in the electrochemical cell 100, there is a formation of the hydrogen gas 102 and the hydroxide ions 118 at the cathode 118. The cathode chamber 110 and the anode chamber 104 are separated by the AEM 120 and at least a portion of the hydroxide ions 118 pass through the AEM 120 from the cathode electrolyte 114 to the anode electrolyte 108. The hydroxide ions 118 can then be oxidized at the anode 106 to form the oxygen gas 122.

Accordingly, the present disclosure describes a method to generate hydrogen gas, the method comprising:
  providing an anode and an anode electrolyte in an electrochemical cell;
  providing a cathode and a cathode electrolyte in the electrochemical cell;
  forming hydrogen gas and hydroxide ions at the cathode;
  separating the anode electrolyte from the cathode electrolyte by a separator, such as an anion exchange membrane (AEM);
  migrating the hydroxide ions from the cathode electrolyte to the anode electrolyte through the separator;
  oxidizing the hydroxide ions to oxygen gas at the anode; and
  maintaining a steady-state pH differential of greater than 1 between the anode electrolyte and the cathode electrolyte.

In addition, the present disclosure describes an electrochemical cell to generate hydrogen gas, the electrochemical cell comprising:
  an anode and an anode electrolyte;
  a cathode and a cathode electrolyte comprising water, wherein the cathode is configured to reduce water to form hydroxide ions and hydrogen gas; and
  a separator (such as an anion exchange membrane) disposed between the anode electrolyte and the cathode electrolyte and configured for migration of the hydroxide ions from the cathode electrolyte to the anode electrolyte;
  wherein the anode is configured to oxidize the hydroxide ions to oxygen gas; and
  wherein the electrochemical cell is configured to maintain a steady-state pH differential of greater than 1 between the anode electrolyte and the cathode electrolyte.

Various pH ranges for the anode electrolyte 108 and the cathode electrolyte 114 as well as the steady-state pH differentials are described herein and are applicable to the systems and methods described herein. In an example, the oxygen evolution reaction may have a lower theoretical voltage at a higher pH and may be performed in a concentrated hydroxide solution wherein the pH of the anode electrolyte 108 is from about 10 to about 15, e.g., wherein a solution concentration of the anode electrolyte 108 is at least about 10 M. Examples of the anode electrolyte 108 containing hydroxide solution include, but is not limited to, LiOH, NaOH, KOH, and the like, and combinations thereof. In an example, the cation of the hydroxide, e.g., Li⁺, Na⁺, K⁺, can be selected such that it does not block the transport mechanism of the separator 120, does not migrate through the separator 120, does not react at the anode 106, and/or does not react with the oxygen gas 122 formed at the anode 106.

Redox Mediator in the Anode Electrolyte

In an example, the anode electrolyte 108 comprises a redox mediator that is oxidized at the anode 106 in alkaline conditions. The term "redox mediator," as used herein, refers to a chemical species that can undergo oxidation and reduction, e.g., at the anode 106 and the cathode 112, respectively. Various examples of the redox mediator are described herein, including, but not limited to, a redox metal ion (e.g., a redox metal oxyanion), a redox non-metal ion (e.g., a redox non-metal oxyanion), a redox metal salt, a redox organic compound, and combinations thereof. However, as will be appreciated by those having ordinary skill in the art, any compound or species capable of undergoing redox reaction at the anode can be used as the redox mediator in the systems and methods described herein.

Accordingly, the present disclosure describes a method to generate hydrogen gas, the method comprising:
providing an anode and an anode electrolyte in an electrochemical cell;
providing a cathode and a cathode electrolyte in the electrochemical cell;
forming hydrogen gas and hydroxide ions at the cathode;
separating the anode electrolyte from the cathode electrolyte by a separator, such as an anion exchange membrane (AEM);
migrating the hydroxide ions from the cathode electrolyte to the anode electrolyte through the separator; and
oxidizing a redox mediator from a lower oxidation state to a higher oxidation state at the anode.

In an example, the method further comprises maintaining a steady-state pH differential of greater than 1 between the anode electrolyte and the cathode electrolyte.

In addition, the present disclosure describes an electrochemical cell to generate hydrogen gas, the electrochemical cell comprising:
an anode and an anode electrolyte;
a cathode and a cathode electrolyte comprising water, wherein the cathode is configured to reduce water to form hydroxide ions and hydrogen gas; and
a separator (such as an anion exchange membrane) disposed between the anode electrolyte and the cathode electrolyte, wherein the separator is configured for migration of the hydroxide ions from the cathode electrolyte to the anode electrolyte; and
wherein the anode is configured to oxidize a redox mediator from a lower oxidation state to a higher oxidation state at the anode.

In an example, the electrochemical cell is configured to maintain a steady-state pH differential of greater than 1 between the anode electrolyte and the cathode electrolyte.

Various pH ranges for the anode electrolyte 108 and the cathode electrolyte 114 as well as the steady-state pH differentials between them are described herein and are all applicable to the aforementioned method and system. In an example, the redox mediator is oxidized at the anode 106 from the lower oxidation state to the higher oxidation state.

The term "oxidation state," as used herein when referring to the redox mediator, includes the degree of oxidation of the redox mediator. In some examples, the oxidation state is the net charge on an ion of the redox mediator. As used herein, the term "lower oxidation state" refers to the relative oxidation state when compared to the "higher oxidation state," i.e., with a lower oxidation number when compared to that of the same ion when in the higher oxidation state. The "lower oxidation state" may be represented as "Redox Mediator (L)" in the Figures to illustrate the lower oxidation state of the ion of the redox mediator. For example, the lower oxidation state of the ion of the redox mediator may be 1+, 2+, 3+, 4+, 5+, or 6+. Similarly, as used herein, the term "higher oxidation state" refers to the relative oxidation state when compared to the "lower oxidation state," i.e., with a higher oxidation number when compared to that of the same ion when in the lower oxidation state. The "higher oxidation state" may be represented "Redox Mediator (H)" in the Figures to illustrate the higher oxidation state of the ion of the redox mediator. For example, the higher oxidation state of the ion of the redox mediator may be 2+, 3+, 4+, 5+, 6+, 7+.

Figure 2:
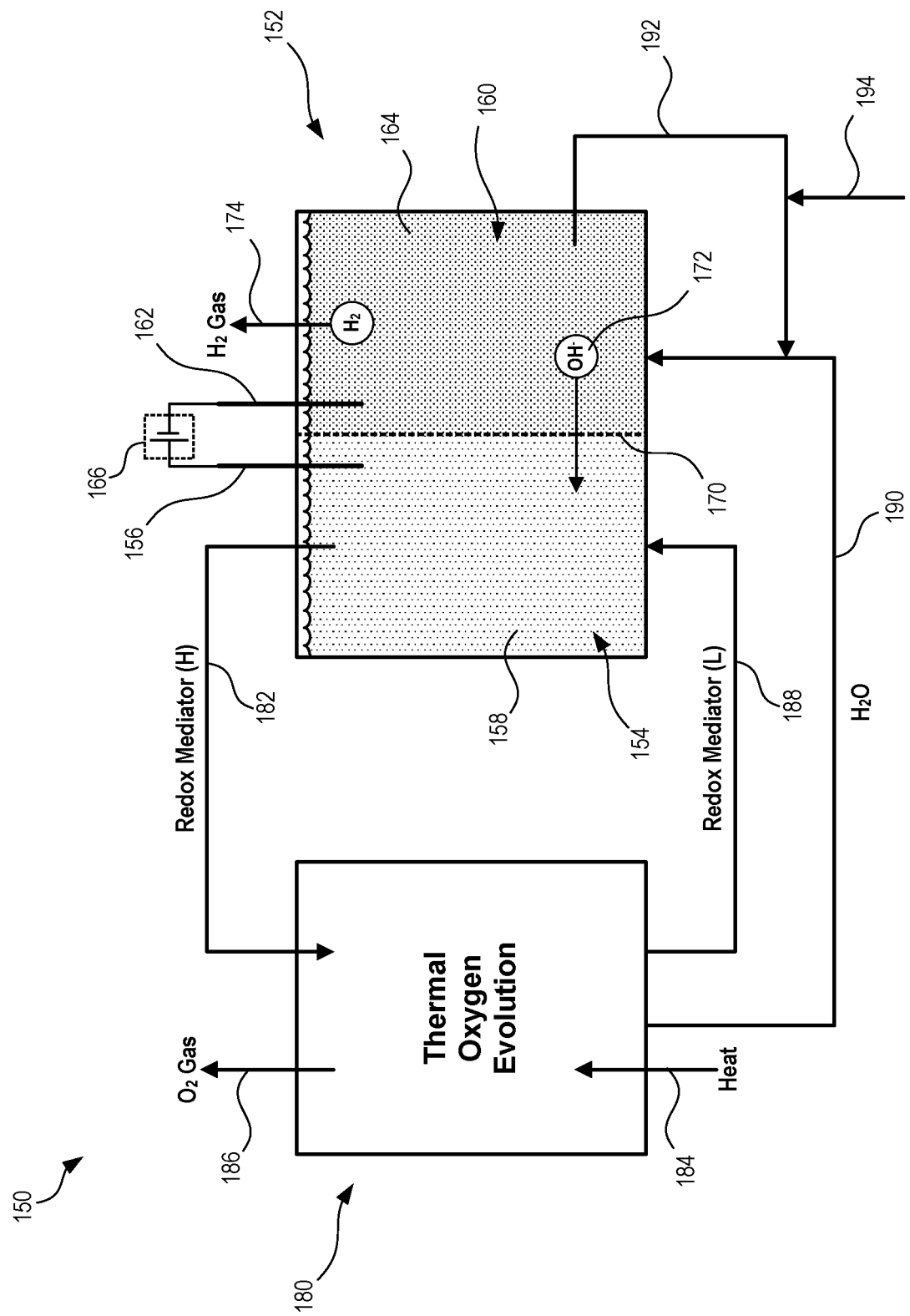
FIG. 2 is an illustration of an example system configured for the formation of hydrogen gas and hydroxide ions at a cathode; migration of the hydroxide ions from a cathode electrolyte to an anode electrolyte; oxidation of a redox mediator from a lower oxidation state to a higher oxidation state at an anode; transfer of at least a portion of the anode electrolyte comprising the redox mediator in the higher oxidation state to a thermal reactor; and thermal reduction of the redox mediator from the higher oxidation state to the lower oxidation state and the formation of oxygen gas in the thermal reactor.

FIG. 2 illustrates an example system 150 that uses a redox mediator as summarized above. The system 150 includes an electrochemical cell 152 that is similar or identical to the electrochemical cell 100 of FIG. 1. For example, the electrochemical cell 152 of the system 150 includes an anode chamber 154 that houses an anode 156 and an anode electrolyte 158, a cathode chamber 160 that houses a cathode 162 and a cathode electrolyte 164, a voltage source 166 electrically connected to the anode 156 and the cathode 162 and configured to apply a potential across the electrodes 156, 162, and a separator 170 (which can be a membrane, such as an anion exchange membrane, which will be referred to as the "AEM 170" for brevity) separating the anode electrolyte 158 in the anode chamber 154 from the cathode electrolyte 164 in the cathode chamber 160. As with the cell 100 of FIG. 1, the cathode 162 is configured so that when the potential is applied across the electrodes 156, 162 by the voltage source 166, water ($H_2O$) within the cathode electrolyte 164 is reduced to form hydroxide ions 172 ($OH^-$) and hydrogen gas 174 ($H_2$). At least a portion of the hydroxide ions 172 migrate across the AEM 170 and into the anode electrolyte 158. As noted above, the anode electrolyte 158 also includes a redox mediator in a lower oxidation state (Redox Mediator (L)). The anode 156 is configured to oxidize the redox mediator in the lower oxidation state (Redox Mediator (L)) to a higher oxidation state (Redox Mediator (H)).

In an example, the redox mediator in the higher oxidation state (Redox Mediator (H)) can be converted back to the lower oxidation state (Redox Mediator (L)) thermally. For example, as shown in the example system 150 of FIG. 2, at least a portion of the anode electrolyte 158, which includes the redox mediator in the higher oxidation state (Redox Mediator (H)), can be transferred to a thermal reactor 180, e.g., as a transferring electrolyte solution 182 so that the redox mediator in the higher oxidation state (Redox Mediator (H)) can be subjected to thermal reaction in the thermal reactor 180. The transferring electrolyte solution 182 also includes hydroxide ions 172, such as those that were formed at the cathode 162 and migrated through the AEM 170 into the anode electrolyte 158.

In an example, the thermal reactor 180 receives the transferring electrolyte solution 182 from the electrochemical cell 150 and applies heat 184 to subject the redox mediator to the thermal reaction wherein the redox mediator in the higher oxidation state (Redox Mediator (H)) is reduced to the lower oxidation state (Redox Mediator (L)). In an example the thermal reaction in the reactor 180 also reduces at least a portion of the hydroxide ions 172 present in the transferring electrolyte solution 182 to form oxygen gas 186 and water.

At least a portion of the redox mediator in the lower oxidation state (Redox Mediator (L)) can be transferred back to the anode chamber 154 of the electrochemical cell 150, e.g., as a returning electrolyte solution 188. In an example, the water formed in the thermal reaction at the thermal reactor 180 can be partially or fully transferred to the cathode chamber 160, such as via a water recycle line 190. In an example, a portion of the cathode electrolyte can be recirculated as a circulated cathode electrolyte solution 192 with or without additional water 194, which can be added into cathode chamber 160.

Figure 3:
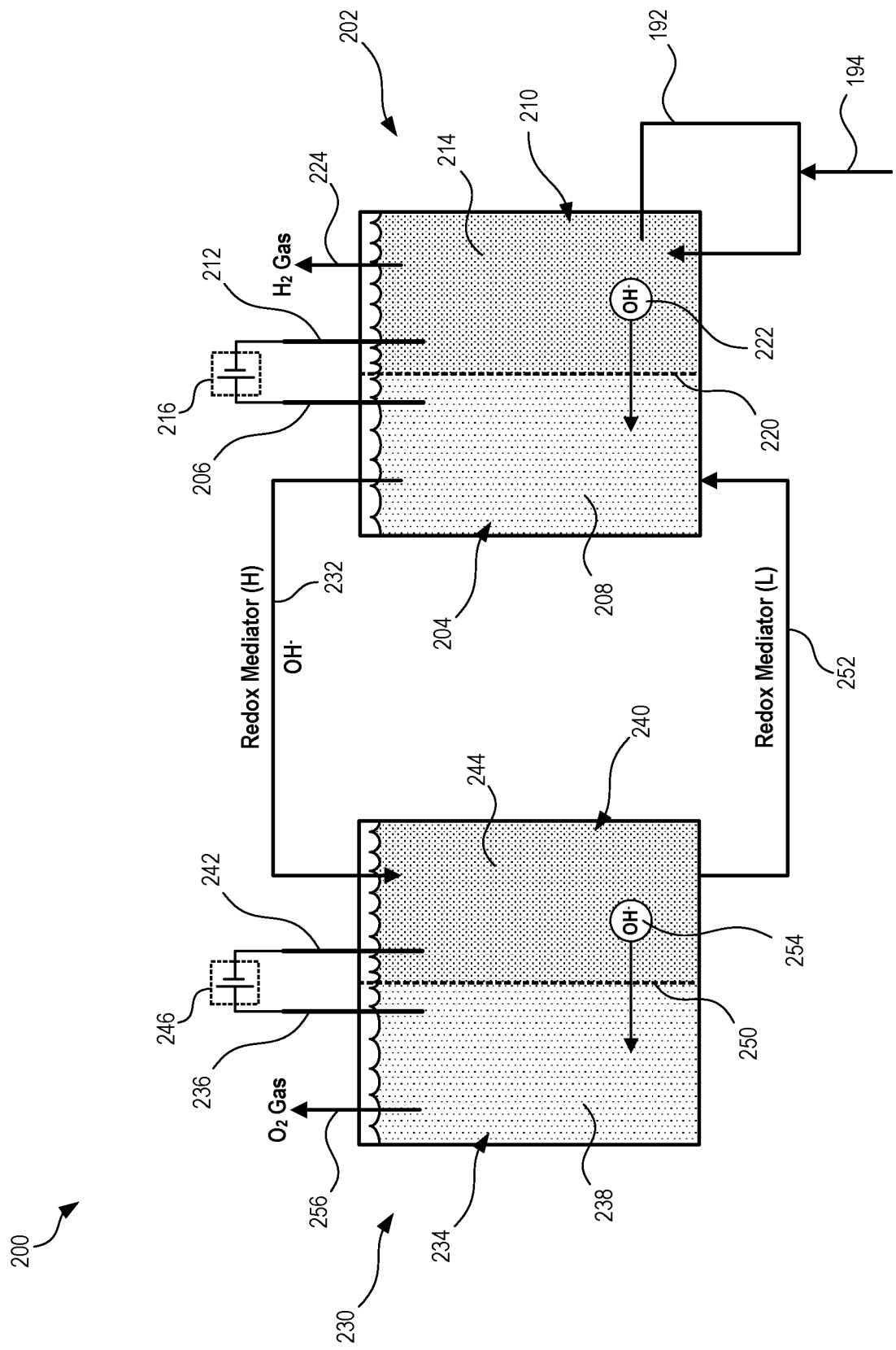
FIG. 3 is an illustration of another example system configured for the formation of hydrogen gas and hydroxide ions at a cathode in an electrochemical cell; migration of the hydroxide ions from a cathode electrolyte to an anode electrolyte in the electrochemical cell; oxidation of a redox mediator from a lower oxidation state to a higher oxidation state at an anode or oxidation of a redox organic compound at the anode in the electrochemical cell; transferring at least a portion of the anode electrolyte from the electrochemical cell to a second cathode electrolyte of a second electrochemical cell; and reduction of the redox mediator from the higher oxidation state to the lower oxidation state or reduction of the redox organic compound at a second cathode of the second electrochemical cell.

In another example, described in more detail below, the redox mediator in the higher oxidation state (Redox Mediator (H)) can be reduced to the lower oxidation state (Redox Mediator (L)) electrochemically, e.g., in a second electrochemical cell. FIG. 3 illustrates an example system 200 configured for electrochemical reduction of the redox mediator in the higher oxidation state (Redox Mediator (H)) to the lower oxidation state (Redox Mediator (L)). The system 200 includes a first electrochemical cell 202, which can be similar or identical to the cells 100 and 150 in FIGS. 1 and 2. For example, the first electrochemical cell 202 can include a first anode chamber 204 that houses a first anode 206 and a first anode electrolyte 208, a first cathode chamber 210 that houses a first cathode 212 and a first cathode electrolyte 214, a first voltage source 216 electrically connected to the first anode 206 and the first cathode 212 and configured to apply a potential across the first electrodes 206, 212, and a first separator 220 (such as a first anion exchange membrane, referred to as the "first AEM 220" for brevity) separating the first anode electrolyte 208 in the first anode chamber 204 from the first cathode electrolyte 214 in the first cathode chamber 210. As with the cells 100 and 150, the first cathode 212 is configured so that when the potential is applied by the first voltage source 216, water ($H_2O$) within the first cathode electrolyte 214 is reduced to form hydroxide ions 222 ($OH^-$) and hydrogen gas 224 ($H_2$). At least a portion of the hydroxide ions 222 migrate across the first AEM 220 and into the first anode electrolyte 208. Similar to the cell 150, the first anode electrolyte 208 of the cell 200 also includes a redox mediator in a lower oxidation state (Redox Mediator (L)) and the first anode 206 can be configured to oxidize the redox mediator in the lower oxidation state (Redox Mediator (L)) to a higher oxidation state (Redox Mediator (H)). At least a portion of the first anode electrolyte 208, which includes the redox mediator in the higher oxidation state (Redox Mediator (H)), can be transferred to a second electrochemical cell 230, e.g., as a transferring electrolyte solution 232 so that the redox mediator in the higher oxidation state (Redox Mediator (H)) can be electrochemically reduced to the lower oxidation state (Redox Mediator (L)) in the second electrochemical cell 230. The transferring electrolyte solution 232 can also include hydroxide ions 222, such as those that were formed at the first cathode 212 and migrated through the first AEM 220 into the first anode electrolyte 208.

The second electrochemical cell 230 can be similar or identical to the other electrochemical cells 100, 150, 202 described herein. For example, the second electrochemical cell 230 can include a second anode chamber 234 that houses a second anode 236 and a second anode electrolyte 238, a second cathode chamber 240 that houses a second cathode 242 and a second cathode electrolyte 244, a second voltage source 246 electrically connected to the second anode 236 and the second cathode 242 and configured to apply a potential across the second electrodes 236, 242, and a second separator 250 (such as a second anion exchange membrane, referred to as the "second AEM 250" for brevity) separating the second anode electrolyte 238 in the second anode chamber 234 from the second cathode electrolyte 244 in the second cathode chamber 240. As shown in FIG. 3, the transferring electrolyte solution 232 that is transferred from the first anode electrolyte 208, which includes the redox mediator in the higher oxidation state (Redox Mediator (H)) and hydroxide ions 222, can be added to the second cathode electrolyte 244 in the second cathode chamber 240. The second cathode 212 is configured so that when the potential is applied by the second voltage source 246, the redox mediator in the higher oxidation state (Redox Mediator (H)) is reduced to the lower oxidation state (Redox Mediator (L)), which can then be transferred back to the first electrochemical cell 202, such as via a returning electrolyte solution 252 that can be added to the first anode chamber 204 and combined with the first anode electrolyte 208 contained therein. At least a portion of the hydroxide ions 254 in the second cathode electrolyte 244, e.g., the hydroxide ions 222 that had migrated through the first AEM 220 to the first anode electrolyte 208 and then transferred to the second cathode electrolyte 244 via the transferring electrolyte solution 232, can migrate across the second AEM 250 and into the second anode electrolyte 208. The second anode 236 can be configured to oxidize the hydroxide ions 254 to form oxygen gas 256 ($O_2$) and water.

In an example, the anode electrolyte 158, 208 comprises both the redox mediator in the lower oxidation state (Redox Mediator (L)) (e.g., as part of the feedstock that forms the anode electrolyte 158, 208) and the redox mediator in the higher oxidation state (Redox Mediator (H)) (e.g., formed after oxidation at the anode 156, 206). In such examples, the anode electrolyte 158, 208 exiting the anode chamber 154, 204 (e.g., as the transferring electrolyte solution 182, 232) comprises the redox mediator in the higher oxidation state (Redox Mediator (H)) in a higher amount than the anode electrolyte 158, 208 that remains in the anode chamber 154, 204. Similarly, the anode electrolyte entering the anode chamber 154, 204 (e.g., as part of the returning electrolyte solution 188 being fed into the anode chamber 154 in the system 150 of FIG. 2 or as part of the returning electrolyte solution 252 being fed into the first anode chamber 204 from the second cathode chamber 240 in the system 200 of FIG. 3) comprises the redox mediator in the lower oxidation state (Redox Mediator (L)) in a higher amount than the anode electrolyte 158, 208 that is already present in the anode chamber 154, 204.

Various examples of the redox mediator are described below.

Redox Metal Oxyanions and Redox Non-Metal Oxyanions in the Anode Electrolyte

In an example, the redox mediator is a redox metal oxyanion or a redox non-metal oxyanion. The term "redox metal oxyanion" as used herein, refers to a polyatomic anion containing two or more atoms where at least one atom is a redox metal and at least one other atom is an oxygen atom. The term "redox non-metal oxyanion" as used herein, refers to a polyatomic anion containing two or more atoms where at least one atom is a redox non-metal and at least one other atom is an oxygen atom.

Accordingly, the present disclosure describes a method to generate hydrogen gas, the method comprising:
providing an anode and an anode electrolyte in an electrochemical cell, wherein the anode electrolyte includes a redox metal oxyanion with a redox metal ion;
providing a cathode and a cathode electrolyte in the electrochemical cell;

forming hydrogen gas and hydroxide ions at the cathode;
separating the anode electrolyte from the cathode electrolyte by a separator, such as an anion exchange membrane (AEM);
migrating hydroxide ions from the cathode electrolyte to the anode electrolyte through the separator;
oxidizing the redox metal ion in the redox metal oxyanion from a lower oxidation state to a higher oxidation state at the anode; and
maintaining a steady-state pH differential of greater than 1 between the anode electrolyte and the cathode electrolyte.

The present disclosure also describes an electrochemical cell to generate hydrogen gas, the electrochemical cell comprising:
an anode and an anode electrolyte, wherein the anode electrolyte includes a redox metal oxyanion with a redox metal ion;
a cathode and a cathode electrolyte comprising water, wherein the cathode is configured to reduce water to form hydroxide ions and hydrogen gas; and
a separator (such as an anion exchange membrane) disposed between the anode electrolyte and the cathode electrolyte and configured for migration of hydroxide ions from the cathode electrolyte to the anode electrolyte;
wherein the anode is configured to oxidize the redox metal ion in the redox metal oxyanion from a lower oxidation state to a higher oxidation state; and
wherein the electrochemical cell is configured to maintain a steady-state pH differential of greater than 1 between the anode electrolyte and the cathode electrolyte.

The present disclosure also describes a method to generate hydrogen gas, the method comprising:
providing an anode and an anode electrolyte in an electrochemical cell, wherein the anode electrolyte includes a redox non-metal oxyanion with a redox non-metal ion;
providing a cathode and a cathode electrolyte in the electrochemical cell;
forming hydrogen gas and hydroxide ions at the cathode;
separating the anode electrolyte from the cathode electrolyte by a separator, such as an anion exchange membrane (AEM);
migrating the hydroxide ions from the cathode electrolyte to the anode electrolyte through the separator;
oxidizing the redox non-metal ion in the redox non-metal oxyanion from a lower oxidation state to a higher oxidation state at the anode; and
maintaining a steady-state pH differential of greater than 1 between the anode electrolyte and the cathode electrolyte.

The present disclosure also describes an electrochemical cell to generate hydrogen gas, the electrochemical cell comprising:
an anode and an anode electrolyte, wherein the anode electrolyte includes a redox non-metal oxyanion with a redox non-metal ion;
a cathode and a cathode electrolyte comprising water, wherein the cathode is configured to reduce water to form hydroxide ions and hydrogen gas; and
a separator (such as an anion exchange membrane) disposed between the anode electrolyte and the cathode electrolyte and configured to migrate the hydroxide ions from the cathode electrolyte to the anode electrolyte;
wherein the anode is configured to oxidize the redox non-metal ion in the redox non-metal oxyanion from a lower oxidation state to a higher oxidation state;
wherein the electrochemical cell is configured to maintain a steady-state pH differential of greater than 1 between the anode electrolyte and the cathode electrolyte.

Various pH ranges for the anode electrolyte 158, 208 and the cathode electrolyte 164, 214 as well as the steady-state pH differentials have been provided herein and are all applicable to the aforementioned aspects.

Various examples of the redox metal oxyanions or the redox non-metal oxyanions are described herein. It is to be understood that the redox metal oxyanion or the redox non-metal oxyanion may contain any number of redox metal or the redox non-metal atoms, respectively, and any number of oxygen atoms depending on the permissible valences. Examples of redox metal atoms include, but are not limited to, manganese (Mn), iron (Fe), chromium (Cr), selenium (Se), copper (Cu), tin (Sn), silver (Ag), cobalt (Co), uranium (U), lead (Pb), mercury (Hg), vanadium (V), bismuth (Bi), titanium (Ti), ruthenium (Ru), osmium (Os), europium (Eu), zinc (Zn), cadmium (Cd), gold (Au), nickel (Ni), palladium (Pd), platinum (Pt), rhodium (Rh), iridium (Ir), technetium (Tc), rhenium (Re), molybdenum (Mo), tungsten (W), niobium (Nb), tantalum (Ta), zirconium (Zr), hafnium (Hf), and combinations thereof, Examples of redox non-metal atoms include, but are not limited to, halogen, carbon, sulfur, nitrogen, phosphorus, and combinations thereof. The halogens include chloro, bromo, fluoro, and iodo atoms.

In an example, the anode electrolyte 158, 208 comprises both the redox metal oxyanion with the redox metal ion in the lower oxidation state (e.g., as the feedstock to the anode electrolyte) and the redox metal oxyanion with the redox metal ion in the higher oxidation state (e.g., formed after oxidation at the anode 156, 206). In some examples, the anode electrolyte 158, 208 comprises both the redox non-metal oxyanion with the redox non-metal ion in the lower oxidation state (e.g., as the feedstock to the anode electrolyte) and the redox non-metal oxyanion with the redox non-metal ion in the higher oxidation state (e.g., formed after oxidation at the anode 156, 206).

The use of the redox metal oxyanion or the redox non-metal oxyanion as the redox metal ion or the redox non-metal ion (e.g., going from the lower oxidation state to the higher oxidation state and vice versa) can lower the operating cell voltage even if the half-cell voltage is above that for oxygen generation. Typically, oxygen generation at the anode may require over-potential beyond the theoretical minimum in order to generate the molecular oxygen at reasonable current densities. Therefore, reducing the required over-potential as provided herein, related to the oxidation of the redox metal oxyanion or the redox non-metal oxyanion at the anode, can lower the operating voltage even if the theoretical voltage is slightly higher.

The formation of the redox metal oxyanion or the redox non-metal oxyanion with the redox metal or the redox non-metal ion in the higher oxidation state, respectively, may also be a non-catalytic electron transfer step, e.g., the oxidation of the redox metal or the redox non-metal ion. In some examples, the oxidized redox metal oxyanions or the redox non-metal oxyanions are transported outside of the electrochemical cell where the oxygen gas can then be liberated from the solution comprising the oxidized redox metal oxyanions or the redox non-metal oxyanions using heat so that the required energy for oxygen gas formation can be provided thermally (e.g., in the thermal reactor 180 in the system 150 of FIG. 2). As noted above, this type of change in half-cell reaction to oxidize the redox metal or the redox non-metal ion of the redox metal oxyanion or the redox non-metal oxyanion, respectively, from the lower to the higher oxidation state, can result in a lower operating voltage even if the fundamental half-cell potential is higher because of savings on the over-potential.

The oxidation of the redox metal or the redox non-metal ion of the redox metal oxyanion or the redox non-metal oxyanion, respectively, from the lower oxidation state to the higher oxidation state can further reduce the operating voltage by reducing thermo-neutral voltage. Typically, if heat is supplied from a source other than resistive losses in the cell, the electrochemical cell 152 can operate at lower voltages. However, resistive losses that add heat into the cell 152 may not be considered as losses until the cell voltage exceeds the thermo-neutral voltage. By oxidizing the redox metal or the redox non-metal oxyanions at the anode 156, it may be possible to lower the operating voltage by reducing the thermo-neutral voltage. For example, oxidizing the redox metal oxyanions or the redox non-metal oxyanions at the anode 156 may lower the overall voltage by lowering the thermo-neutral voltage below 1.48 V. Therefore, the lower thermo-neutral voltage in the aspects provided herein, may be used to lower overall operating voltage.

In an example, the reduction of the operating voltage may also be the result of a lower half-cell potential than oxygen evolution (at the anode) or hydrogen evolution (at the cathode). Because the Gibbs Free Energy may include minimum external work required to accomplish a given transformation (e.g., conversion of water into hydrogen and oxygen), operation below the thermodynamic minimum voltage may be possible if additional energy is provided into the system either as work or as heat. If the heat is obtained from a source other than resistive losses (these losses may include, but not limited to, the losses within the separator, conductive resistances, solution resistances, and electrode overpotentials) within the cell 152, the net effect will be a reduced demand in electric power.

Accordingly, in some examples, no oxygen gas is formed at the anode 156 or less than 25% or less than 10% of the Faradaic efficiency is for the oxygen evolution reaction at the anode.

In an example, the anode electrolyte comprising redox metal oxyanion with the redox metal ion in the higher oxidation state or the anode electrolyte comprising redox non-metal oxyanion with the redox non-metal ion in the higher oxidation state is transferred outside the electrochemical cell and is either reduced thermally (e.g., in a thermal reactor 180 as in the system 150) and/or electrochemically (e.g., in a second electrochemical cell 230 as in the system 200) to form oxygen gas and subsequent reduced forms of the redox metal oxyanion or the redox non-metal oxyanion. Both the thermal reaction/reactor as well as the electrochemical reaction/cell to form the oxygen gas are described herein. The thermal reaction/reactor and the second electrochemical reaction/cell to form the oxygen gas can be carried out simultaneously or substantially simultaneously (e.g., with both a thermal reaction and a second electrochemical reaction being carried out simultaneously or substantially simultaneously), serially (e.g., with the thermal reaction and the second electrochemical reaction being carried out one after the other), or independently.

These aspects of the present disclosure are illustrated in FIG. 2, e.g., with the anode chamber 154 containing the anode 156 and the anode electrolyte 158, which comprises a redox metal oxyanion with a redox metal ion in a lower oxidation state or a redox non-metal oxyanion with a redox non-metal ion in a lower oxidation state (shown generically as Redox Mediator (L) in FIG. 2) and the cathode chamber 160 containing the cathode 162 and the cathode electrolyte 164 in the electrochemical cell 152.

In an example, the cathode electrolyte 164 comprises water and the water is reduced at the cathode 162 to hydroxide ions 172 and hydrogen gas 174. In an example, the anode electrolyte 158 and the cathode electrolyte 164 are separated by a separator 170 (an anion exchange membrane (AEM) 170). In an example, at least a portion of the hydroxide ions 172 migrate from the cathode electrolyte 164 to the anode electrolyte 158 through the AEM 170. In an example, the anode electrolyte 158 further comprises hydroxide ions 172.

As illustrated in FIG. 2, the redox metal oxyanion with the redox metal ion in the lower oxidation state or the redox non-metal oxyanion with the redox non-metal ion in the lower oxidation state (shown generically as Redox Mediator (L) in FIG. 2) is oxidized to the redox metal oxyanion with the redox metal ion in the higher oxidation state or the redox non-metal oxyanion with the redox non-metal ion in the higher oxidation state, respectively (shown generically as Redox Mediator (H) in FIG. 2) at the anode 156. In some examples, the anode electrolyte 158 comprises redox metal oxyanions or redox non-metal oxyanions and water or in some examples, the anode electrolyte 158 comprises redox metal oxyanions or redox non-metal oxyanions and saltwater (further described herein). In some examples, the presence of saltwater with the redox metal oxyanion or the redox non-metal oxyanion system (e.g., alkali metal halide salt as described herein) can improve the efficiency of the thermal process.

In some examples, the method can further comprise transferring at least a portion of the anode electrolyte 158 comprising the redox metal oxyanion with the redox metal ion in the higher oxidation state or the redox non-metal oxyanion with the redox non-metal ion in the higher oxidation state (Redox Mediator (H)) to thermal reaction (e.g., in the thermal reactor 180) to form oxygen gas 186 and the redox metal oxyanion with the redox metal ion in the lower oxidation state or the redox non-metal oxyanion with the redox non-metal ion in the lower oxidation state (Redox Mediator (L)), respectively.

In some examples, at least a portion of the anode electrolyte 158 comprising the redox metal oxyanion with the redox metal ion in the higher oxidation state or the redox non-metal oxyanion with the redox non-metal ion in the higher oxidation state (Redox Mediator (H)) is transferred outside the electrochemical cell 152 (e.g., in the transferring electrolyte solution 182) and is subjected to a thermal oxygen evolution reaction/reactor where evolution of oxygen gas takes place and the redox metal oxyanion with the redox metal ion in the lower oxidation state or the redox non-metal oxyanion with the redox non-metal ion in the lower oxidation state (Redox Mediator (L)) is respectively formed. This redox metal oxyanion with the redox metal ion in the lower oxidation state or the redox non-metal oxyanion with the redox non-metal ion in the lower oxidation state (Redox Mediator (L)) may be transferred back to the anode chamber 154 of the electrochemical cell 152. The water formed in the thermal reaction can be partially or fully transferred to the cathode chamber 160 of the cell 152, such as via the water recycle line 180.

The thermal oxygen evolution reaction may take place in a thermal reactor 180 operably connected to the electrochemical cell 152 and configured to receive the anode electrolyte comprising the redox metal oxyanion with the redox metal ion in the higher oxidation state or the redox non-metal oxyanion with the redox non-metal ion in the higher oxidation state (Redox Mediator (H)) and subject it to thermal reaction to form oxygen gas and the corresponding reduced redox metal oxyanion with the redox metal ion in the lower oxidation state or the redox non-metal oxyanion with the redox non-metal ion in the lower oxidation state (Redox Mediator (L)), respectively.

The anode chamber 154 and the cathode chamber 160 are separated by the anion exchange membrane (AEM) 170 (shown by a vertical dashed line in FIG. 2). In an example, an AEM is used rather than a PEM to separate the electrode chambers 154, 160. The use of the AEM 170 minimizes or eliminates the transport of the redox metal oxyanions or the redox non-metal oxyanions from the anode chamber 154 to the cathode chamber 160, preventing or minimizing contamination of the cathode electrolyte 164 and improving the efficiency of the process.

In an example, the transferring electrolyte solution 182 that provides for the transfer of the redox metal oxyanions with the redox metal ions in the higher oxidation state or the redox non-metal oxyanions with the redox non-metal ions in the higher oxidation state (Redox Mediator (H)) from the anode chamber 154 to the thermal reactor 180 can be in solid solution form or in liquid solution form. In an example, the redox metal oxyanion with the redox metal ion or the redox non-metal oxyanion with the redox non-metal ion can be partially or fully insoluble in the anode electrolyte 158. In such examples, the redox metal oxyanion or the redox non-metal oxyanion may or may not be separated from the anode electrolyte 158. Various known techniques can be used for the separation including, but not limited to, techniques for liquid-solid separation, e.g., filtration.

The methods and systems described herein can be closed-loop processes, therefore, the order of one or more steps provided herein can be alternated or rearranged and the steps are not necessarily arranged in a serial fashion.

The redox metal ion or the redox non-metal ion in the redox metal oxyanion or the redox non-metal oxyanion, respectively, can be any redox metal or redox non-metal ion. Various examples of redox metal ions and redox non-metal ions are described herein. An illustrative example of the oxidation of the redox metal oxyanion is shown in half-cell reactions as below:

Anode Reaction: 

Cathode Reaction: 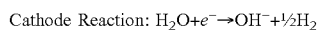

In the above noted reaction, the manganate ion ($MnO_4^{2-}$) with Mn in a lower oxidation state is oxidized to permanganate ion ($MnO_4^-$) with Mn in a higher oxidation state at the anode 156. Water is reduced to hydrogen gas and hydroxide ions at the cathode 162. The hydroxide ions can migrate from the cathode electrolyte 164 to the anode electrolyte 158 through the AEM 170, maintaining a steady-state pH differential of greater than 1 between the anode electrolyte 158 and the cathode electrolyte 164. The anode electrolyte 158 containing the permanganate ions ($MnO_4^-$) and the hydroxide ions can then transferred out of the electrochemical cell 152 to the thermal reactor 180 to form oxygen gas 186 and the manganate ions as follows:

Thermal reaction: 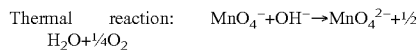

An overall reaction of the $MnO_4^{2-}/MnO_4^-$ system is as shown below:

Overall: 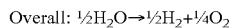

In some examples, the thermal reaction to generate the oxygen gas may be replaced by a second electrochemical reaction (e.g., with the second electrochemical cell 230 in the system 200 of FIG. 3).

In some embodiments, the method described herein comprises transferring at least a portion of the anode electrolyte 208 comprising the redox metal oxyanion with the redox metal ion in the higher oxidation state or the redox non-metal oxyanion with the redox non-metal ion in the higher oxidation state (Redox Mediator (H)) outside the electrochemical cell 202 to a second cathode electrolyte 244 of a second electrochemical cell 230; and reducing the redox metal oxyanion with the redox metal ion in the higher oxidation state or the redox non-metal oxyanion with the redox non-metal ion in the higher oxidation state (Redox Mediator (H)) to the redox metal oxyanion with the redox metal ion in the lower oxidation state or the redox non-metal oxyanion with the redox non-metal ion in the lower oxidation state (Redox Mediator (L)), respectively, at a second cathode 242 of the second electrochemical cell 230. In an example, the method further comprises migrating hydroxide ions 254 from the second cathode electrolyte 244 to a second anode electrolyte 234 of the second electrochemical cell 230 through a second separator 250 (such as a second AEM 250) and oxidizing the hydroxide ions at a second anode 236 in the second electrochemical cell 230 to form oxygen gas 256.

In an example, the systems described herein further comprise the second electrochemical cell 230 operably connected to the first electrochemical cell 202, wherein the second electrochemical cell 230 comprising the second anode 236 and the second anode electrolyte 238; the second cathode 242 and the second cathode electrolyte 244, wherein the second cathode electrolyte 244 is configured to receive at least a portion of the first anode electrolyte 208 of the first electrochemical cell 202 (e.g., via the transferring electrolyte solution 232), which comprises the redox metal oxyanion with the redox metal ion in the higher oxidation state or the redox non-metal oxyanion with the redox non-metal ion in the higher oxidation state (Redox Mediator (H)) and the second cathode 242 is configured to reduce the redox metal oxyanion with the redox metal ion in the higher oxidation state or the redox non-metal oxyanion with the redox non-metal ion in the higher oxidation state (Redox Mediator (H)) to the redox metal oxyanion with the redox metal ion in the lower oxidation state or the redox non-metal oxyanion with the redox non-metal ion in the lower oxidation state (Redox Mediator (L)), respectively.

In an example, the system comprises a first separator 220 such as a first AEM 220) between the first anode 206 and the first cathode 212 in the first electrochemical cell 202 as well as a second separator 250 (such as a second AEM 250) between the second anode 236 and the second cathode 242 in the second electrochemical cell 230, wherein each AEM 220, 250 is configured to transfer hydroxide ions 222, 254 from the corresponding cathode electrolyte 214, 244 to the corresponding anode electrolyte 208, 238 through the AEM 220, 250. In an example, the second anode 236 in the second electrochemical cell 230 is configured to oxidize the hydroxide ions 254 to form oxygen gas 256.

In an example, the first electrochemical cell 202 and the second electrochemical cell 230 operate at different currents and/or voltages to selectively perform their respective anode reactions.

These aspects of the present disclosure are illustrated in FIG. 3. In an example, at least a portion of the first anode electrolyte 208 from the first electrochemical cell 202 comprising the redox metal oxyanion with the redox metal ion in the higher oxidation state or the redox non-metal oxyanion with the redox non-metal ion in the higher oxidation state (Redox Mediator (H)) is transferred outside the first electrochemical cell 202 and is added to the second cathode electrolyte 244 of the second electrochemical cell 230, such as via the transferring electrolyte solution 232. In the second electrochemical cell 230, the redox metal oxyanion with the redox metal ion in the higher oxidation state or the redox non-metal oxyanion with the redox non-metal ion in the higher oxidation state (Redox Mediator (H)) are reduced to the redox metal oxyanion with the redox metal ion in the lower oxidation state or the redox non-metal oxyanion with the redox non-metal ion in the lower oxidation state (Redox Mediator (L)), respectively, at the second cathode 242. In the second electrochemical cell 230, hydroxide ions 254 migrate from the second cathode electrolyte 244 to the second anode electrolyte 238 through the second AEM 250 and the second anode 236 oxidizes the hydroxide ions 254 to form oxygen gas 256. At least a portion of the second cathode electrolyte 244 in the second electrochemical cell 242, which includes the redox metal oxyanions with the redox metal ion in the lower oxidation state or the redox non-metal oxyanion with the redox non-metal ion in the lower oxidation state (Redox Mediator (L)), can be transferred back to the first anode electrolyte 208 of the first electrochemical cell 202.

In an example, the pH of the first anode electrolyte 208 may affect oxidation of the redox metal oxyanion or the redox non-metal oxyanion over any other competing oxidation reaction. For example, the pH of the anode electrolyte 208 can be more than about 10, for example from about 10 to about 12, such as from about 10 to about 14, for example from about 10 to about 11.5, such as from about 10 to about 15, for example from about 11 to about 15, or is about 10, about 11, about 11.5, about 13, or about 14. In an example, the pH of the first anode electrolyte 208 can facilitate oxidation of the redox metal oxyanion or the redox non-metal oxyanion over the oxidation of the hydroxide ions 222 that had migrated from the first cathode electrolyte 210 to the first anode electrolyte.

In an example, the steady-state pH differential between the first anode electrolyte 214 and the first cathode electrolyte 208, when the oxidation of the redox metal oxyanion or the redox non-metal oxyanion takes place at the first anode 206, is greater than about 1, for example from about 1 to about 7, such as from about 1 to about 6, for example from about 1 to about 5, such as from about 1 to about 4, for example from about 1 to about 3, such as from about 1 to about 2, for example from about 2 to about 7, such as from about 2 to about 6, for example from about 2 to about 5, such as from about 2 to about 4, for example from about 2 to about 3, such as from about 3 to about 7, for example from about 3 to about 6, such as from about 3 to about 5, for example from about 3 to about 4, such as from about 4 to about 7, for example from about 4 to about 6, such as from about 4 to about 5, for example from about 5 to about 7, such as from about 5 to about 6, for example from about 6 to about 7.

In an example, the systems 150, 200 have a theoretical voltage of less than about 1.3 V, or less than about 1.23 V, or less than about 1.5 V, or less than about 2 V, or less than about 2.5 V, for the electrochemical cells 152, 202, 230. In an example, the systems 150, 200 have an operating voltage of from about 1.3 V to about 3 V, for example from about 1.5 V to about 3 V, such as from about 2 V to about 3 V, for example from about 1 V to about 3 V, such as from about 1.5 V to about 2.5 V, for the electrochemical cells 152, 202, 230.

In an example, the corresponding cation for the redox metal oxyanion or the redox non-metal oxyanion is an alkali metal or an alkali earth metal. Examples of alkali metals that can be the corresponding cation for the redox metal oxyanion or the redox non-metal oxyanion include, but are not limited to, sodium (Na), potassium (K), lithium (Li), cesium (Cs), and combinations thereof. Examples of alkali earth metals that can be the corresponding cation for the redox metal oxyanion or the redox non-metal oxyanion include, but are not limited to, calcium (Ca), strontium (Sr), magnesium (Mg), barium (Ba), and combinations thereof. In a particular example, the corresponding cation is a sodium ion or a potassium ion.

In an example, the anode electrolyte 158, 208, 238 or the cathode electrolyte 164, 214, 244, or both, comprises water.

The terms "redox metal ion," "redox metal," "redox metal ion of the redox metal oxyanion," "redox metal ion of the redox metal salt," and "redox metal cation," as well as similar terms related to the redox mediator that comprises, for example, a redox metal oxyanion, as used herein, include any metal ion capable of being converted from a lower oxidation state to a higher oxidation state. Examples of redox metal ions include, but are not limited to, manganese (Mn), iron (Fe), chromium (Cr), selenium (Se), copper (Cu), tin (Sn), silver (Ag), cobalt (Co), uranium (U), lead (Pb), mercury (Hg), vanadium (V), bismuth (Bi), titanium (Ti), ruthenium (Ru), osmium (Os), europium (Eu), zinc (Zn), cadmium (Cd), gold (Au), nickel (Ni), palladium (Pd), platinum (Pt), rhodium (Rh), iridium (Ir), technetium (Tc), rhenium (Re), molybdenum (Mo), tungsten (W), niobium (Nb), tantalum (Ta), zirconium (Zr), hafnium (Hf), and combinations thereof. In some examples, the redox metal ion in the corresponding redox metal oxyanion or the redox metal salt include, but not limited to, iron (Fe), copper (Cu), tin (Sn), chromium (Cr), manganese (Mn), selenium (Se), tantalum (Ta), and combinations thereof. In an example, the redox metal ion is copper (Cu). In an example, the redox metal ion is tin (Sn). In an example, the redox metal ion is iron (Fe). In an example, the redox metal ion is chromium (Cr). In an example, the redox metal ion is manganese (Mn). In an example, the redox metal ion is selenium (Se). In an example, the redox metal ion is tantalum (Ta). In an example, the redox metal ion is platinum (Pt).

In an example, the redox metal oxyanion with the redox metal ion in the lower oxidation state is selected from the group consisting of $MnO_4^{2-}$, $FeO_4^{2-}$, $RuO_4^{2-}$, $OsO_4^{2-}$, $HsnO_2^-$, $SeO_3^{2-}$, $Cu_2O$, $Cr_3^{3-}$, $TeO_3^{2-}$, and combinations thereof.

In an example, the redox metal oxyanion with the redox metal ion in the higher oxidation state is selected from the group consisting of $MnO_4^-$, $HfeO_2^-$, $RuO_4^-$, $OsO_5^{2-}$, $SnO_3^{2-}$, $SeO_4^{2-}$, $CuO_2^{2-}$, $CrO_4^{2-}$, and $TeO_4^{2-}$, and combinations thereof.

In some examples,
  the redox metal oxyanion with the redox metal ion in the lower oxidation state is $MnO_4^{2-}$ and the redox metal oxyanion with the redox metal ion in the higher oxidation state is $MnO_4^-$;
  the redox metal oxyanion with the redox metal ion in the lower oxidation state is $FeO_4^{2-}$ and the redox metal oxyanion with the redox metal ion in the higher oxidation state is $HfeO_2^-$;
  the redox metal oxyanion with the redox metal ion in the lower oxidation state is $RuO_4^{2-}$ and the redox metal oxyanion with the redox metal ion in the higher oxidation state is $RuO_4^-$;

the redox metal oxyanion with the redox metal ion in the lower oxidation state is $OsO_4^{2-}$ and the redox metal oxyanion with the redox metal ion in the higher oxidation state is $OsO_5^{2-}$;

the redox metal oxyanion with the redox metal ion in the lower oxidation state is $HsnO_2^-$ and the redox metal oxyanion with the redox metal ion in the higher oxidation state is $SnO_3^{2-}$;

the redox metal oxyanion with the redox metal ion in the lower oxidation state is $SeO_3^{2-}$ and the redox metal oxyanion with the redox metal ion in the higher oxidation state is $SeO_4^{2-}$;

the redox metal oxyanion with the redox metal ion in the lower oxidation state is $Cu_2O$ and the redox metal oxyanion with the redox metal ion in the higher oxidation state is $CuO_2^{2-}$;

the redox metal oxyanion with the redox metal ion in the lower oxidation state is $CrO_3^{3-}$ and the redox metal oxyanion with the redox metal ion in the higher oxidation state is $CrO_4^{2-}$; or the redox metal oxyanion with the redox metal ion in the lower oxidation state is $TeO_3^{2-}$ and the redox metal oxyanion with the redox metal ion in the higher oxidation state is $TeO_4^{2-}$.

I illustrative examples of oxidation reactions of the redox metal oxyanions at the anode in the presence of hydroxide ions are shown below:

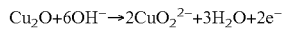

$$Cu_2O + 6OH^- \rightarrow 2CuO_2^{2-} + 3H_2O + 2e^-$$

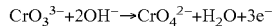

$$CrO_3^{3-} + 2OH^- \rightarrow CrO_4^{2-} + H_2O + 3e^-$$

The terms "redox non-metal ion," "redox non-metal," and "redox non-metal ion of the redox non-metal oxyanion," as well as similar terms related to the redox mediator that comprises, for example, a redox non-metal oxyanion, as used herein, includes any redox non-metal ion capable of being converted from a lower oxidation state to a higher oxidation state. Examples of redox non-metal ions in the corresponding redox non-metal oxyanion include, but are not limited to, a halogen, carbon(C), sulfur (S), nitrogen (N), phosphorus (P), and combinations thereof. Examples of halogens that can be part of the redox non-metal ion include chloro (Cl), fluoro (F), bromo (B), and iodo (I) atoms.

In an example, the redox non-metal oxyanion with the redox non-metal ion in the lower oxidation state comprises $NO_2^-$, $PO_3^{3-}$, $SO_3^{2-}$, $ClO^-$, $ClO_2^-$, $ClO_3^-$, $BrO^-$, $BrO_2^-$, $BrO_3^-$, $IO^-$, $IO_2^-$, $IO_3^-$, and combinations thereof.

In some embodiments, the redox non-metal oxyanion with the redox non-metal ion in the higher oxidation state comprises $NO_3^-$, $PO_4^{3-}$, $SO_4^{2-}$, $ClO_2^-$, $ClO_3^-$, $ClO_4^-$, $BrO_2^-$, $BrO_3^-$, $BrO_4^-$, $IO_2^-$, $IO_3^-$, $IO_4^-$, and combinations thereof.

In some examples,
the redox non-metal oxyanion with the redox non-metal ion in the lower oxidation state is $NO_2^-$ and the redox non-metal oxyanion with the redox non-metal ion in the higher oxidation state is $NO_3^-$;

the redox non-metal oxyanion with the redox non-metal ion in the lower oxidation state is $PO_3^{3-}$ and the redox non-metal oxyanion with the redox non-metal ion in the higher oxidation state is $PO_4^{3-}$;

the redox non-metal oxyanion with the redox non-metal ion in the lower oxidation state is $SO_3^{2-}$ and the redox non-metal oxyanion with the redox non-metal ion in the higher oxidation state is $SO_4^{2-}$;

the redox non-metal oxyanion with the redox non-metal ion in the lower oxidation state is $ClO^-$ and the redox non-metal oxyanion with the redox non-metal ion in the higher oxidation state is $ClO_2^-$;

the redox non-metal oxyanion with the redox non-metal ion in the lower oxidation state is $ClO_2^-$ and the redox non-metal oxyanion with the redox non-metal ion in the higher oxidation state is $ClO_3^-$;

the redox non-metal oxyanion with the redox non-metal ion in the lower oxidation state is $ClO_3^-$ and the redox non-metal oxyanion with the redox non-metal ion in the higher oxidation state is $ClO_4^-$;

the redox non-metal oxyanion with the redox non-metal ion in the lower oxidation state is $BrO^-$ and the redox non-metal oxyanion with the redox non-metal ion in the higher oxidation state is $BrO_2^-$;

the redox non-metal oxyanion with the redox non-metal ion in the lower oxidation state is $BrO_2^-$ and the redox non-metal oxyanion with the redox non-metal ion in the higher oxidation state is $BrO_3^-$;

the redox non-metal oxyanion with the redox non-metal ion in the lower oxidation state is $BrO_3^-$ and the redox non-metal oxyanion with the redox non-metal ion in the higher oxidation state is $BrO_4^-$;

the redox non-metal oxyanion with the redox non-metal ion in the lower oxidation state is $IO^-$ and the redox non-metal oxyanion with the redox non-metal ion in the higher oxidation state is $IO_2^-$;

the redox non-metal oxyanion with the redox non-metal ion in the lower oxidation state is $IO_2^-$ and the redox non-metal oxyanion with the redox non-metal ion in the higher oxidation state is $IO_3^-$; or the redox non-metal oxyanion with the redox non-metal ion in the lower oxidation state is $IO_3^-$ and the redox non-metal oxyanion with the redox non-metal ion in the higher oxidation state is $IO_4^-$.

Some illustrative, non-limiting examples of oxidation states of the redox non-metal oxyanions and their oxidation to higher oxidation states are provided in TABLE1 below:

TABLE 1

Redox Non-Metal Oxyanions and Oxidation States

| Oxidation State | +7 | +6 | +5 | +4 | +3 | +1 |
|---|---|---|---|---|---|---|
| | | | $NO_3^-$ | | $NO_2^-$ | |
| | | | $PO_4^{3-}$ | | $PO_3^{3-}$ | |
| | | $SO_4^{2-}$ | | $SO_3^{2-}$ | | |
| | $ClO_4^-$ | | $ClO_3^-$ | | $ClO_2^-$ | $ClO^-$ |
| | $BrO_4^-$ | | $BrO_3^-$ | | $BrO_2^-$ | $BrO^-$ |
| | $IO_4^-$ | | $IO_3^-$ | | $IO_2^-$ | $IO^-$ |

Those having skill in the art will appreciate that any redox non-metal oxyanion with its redox non-metal ion in the lower oxidation state can oxidize to its corresponding redox non-metal oxyanion with the redox non-metal ion in the higher oxidation state. For example, $ClO^-$ can oxidize to $ClO_2^-$, or $ClO^-$ can oxidize to $ClO_3^-$, or $ClO^-$ can oxidize to $ClO_4^-$, or $ClO_2^-$ can oxidize to $ClO_3^-$, or $ClO_2^-$ can oxidize to $ClO_4^-$, or $ClO_3^-$ can oxidize to $ClO_4^-$, or any combination thereof. In an example, there can be a combination of one or more of the aforementioned chlorooxyanion oxidation species in the anode electrolyte.

Similarly, $BrO^-$ can oxidize to $BrO_2^-$, or $BrO^-$ can oxidize to $BrO_3^-$, or $BrO^-$ can oxidize to $BrO_4^-$, or $BrO_2^-$ can oxidize to $BrO_3^-$, or $BrO_2^-$ can oxidize to $BrO_4^-$, or $BrO_3^-$ can oxidize to $BrO_4^-$, or any combination thereof. In an example, there can be a combination of one or more of the aforementioned bromooxyanion oxidation species in the anode electrolyte.

Similarly, $IO^-$ can oxidize to $IO_2^-$, or $IO^-$ can oxidize to $IO_3^-$, or $IO^-$ can oxidize to $IO_4^-$, or $IO_2^-$ can oxidize to $IO_3^-$, or $IO_2^-$ can oxidize to $IO_4^-$, or $IO_3^-$ can oxidize to $IO_4^-$, or any combination thereof. In an example, there can be a combination of one or more of the aforementioned iodooxyanion oxidation species in the anode electrolyte.

Those having skill in the art will appreciate that the redox metal oxyanion with the redox metal ion in the lower oxidation state and the redox metal oxyanion with the redox metal ion in the higher oxidation state can both be present in the anode electrolyte 158, 208 entering and/or exiting the anode chamber 154, 204 depending on the oxidation. Similarly, those having skill in the art will appreciate that the redox non-metal oxyanion with the redox non-metal ion in the lower oxidation state and the redox non-metal oxyanion with the redox non-metal ion in the higher oxidation state can both be present in the anode electrolyte 158, 208 entering and/or exiting the anode chamber 154, 204 depending on the oxidation.

Owing to the oxidation of the redox metal oxyanion or the redox non-metal oxyanion from the lower oxidation state to the higher oxidation state at the anode 156, 206, the amount of the redox metal oxyanion or the redox non-metal oxyanions in the lower oxidation state is different in the anode electrolyte entering the anode chamber 154, 204 (e.g., as the returning electrolyte solution 188, 252) and exiting the anode chamber 154, 204 (e.g., as the transferring electrolyte solution 182, 232).

Redox Metal Salt in the Anode Electrolyte

In an example, the redox mediator in the anode electrolyte 154, 204 is a redox metal salt that is converted to a redox metal hydroxy salt, and vice versa. The term "redox metal salt," as used herein, refers to an ionic compound formed by a redox metal cation and an anion. In an example, the redox metal salt is represented as MX, wherein M is the redox metal ion and X is the counter anion Examples of the redox metal ion and the redox metal cation in the redox metal salt are described herein. The term "redox metal hydroxy salt," as used herein, refers to an ionic compound formed by a redox metal cation, a hydroxy ion, and a counter anion. Examples of the redox metal ion or the redox metal cation in the redox metal hydroxy salt are described herein. In an example, the redox metal hydroxy salt is represented as M(OH)X, wherein M is the redox metal ion, OH is a hydroxyl group, and X is the counter anion. Examples of the counter anion (X) in the redox metal salt or the redox metal hydroxy salt include, but are not limited to, a halide, a sulfate, or a phosphate. Examples of halides include chloride, bromide, fluoride, and iodide.

Accordingly, the present disclosure describes a method to generate hydrogen gas, the method comprising:
  providing an anode and an anode electrolyte in an electrochemical cell, wherein the anode electrolyte comprises a redox metal salt;
  providing a cathode and a cathode electrolyte in the electrochemical cell;
  forming hydrogen gas and hydroxide ions at the cathode;
  separating the anode electrolyte from the cathode electrolyte by a separator, such as an anion exchange membrane (AEM);
  migrating hydroxide ions from the cathode electrolyte to the anode electrolyte through the separator;
  oxidizing the redox metal salt to a redox metal hydroxy salt at the anode; and
  maintaining a steady-state pH differential of greater than 1 between the anode electrolyte and the cathode electrolyte.

In addition, the present disclosure describes an electrochemical cell to generate hydrogen gas, the electrochemical cell comprising:
  an anode and an anode electrolyte, wherein the anode electrolyte comprises a redox metal salt;
  a cathode and a cathode electrolyte comprising water, wherein the cathode is configured to reduce water to form hydroxide ions and hydrogen gas; and
  a separator (such as an anion exchange membrane) disposed between the anode electrolyte and the cathode electrolyte and configured to migrate the hydroxide ions from the cathode electrolyte to the anode electrolyte;
  wherein the anode is configured to oxidize the redox metal salt to a redox metal hydroxy salt; and
  wherein the electrochemical cell is configured to maintain a steady-state pH differential of greater than 1 between the anode electrolyte and the cathode electrolyte.

Various pH ranges for the anode electrolyte and the cathode electrolyte as well as the steady-state pH differentials are described herein and are all applicable to the aforementioned aspects.

In an example, the anode electrolyte 154, 204 comprising the redox metal hydroxy salt is transferred outside the electrochemical cell 152, 202 and is either reduced thermally (e.g., in the thermal reactor 180) and/or electrochemically (e.g., in the second electrochemical cell 230) to form oxygen gas 186, 256 and a reduced form of the redox metal salt. Both the thermal reaction and the electrochemical reaction to form the oxygen gas 186, 256 have been described herein. The thermal reaction and the second electrochemical reaction to form the oxygen gas 186, 256 can be carried out simultaneously (both the thermal reaction and the second electrochemical reaction being carried out simultaneously), serially (both the thermal reaction and the second electrochemical reaction being carried out one after the other), or independently, and all of these combinations are well within the scope of the present disclosure.

In an example, the anode electrolyte 154, 204 comprises a redox metal salt, wherein the redox metal salt comprises a redox metal ion in a lower oxidation state (feedstock to the anode electrolyte) and a redox metal hydroxy salt wherein the redox metal ion is in a higher oxidation state (after the oxidation reaction at the anode 156, 206).

The use of the redox metal salt as the redox metal ion (e.g., going from the lower oxidation state to the higher oxidation state and vice versa), as described herein, can lower the operating cell voltage even if the half-cell voltage is above that for the oxygen generation. Typically, oxygen generation at the anode may require over-potential at the anode beyond the theoretical minimum in order to generate the molecular oxygen at reasonable current densities. Therefore, reducing the required over-potential as described herein, related to the oxidation of the redox metal salt at the anode, can lower the operating voltage even if the theoretical voltage is slightly higher.

The formation of the redox metal hydroxy salt (i.e., with the redox metal ion in the higher oxidation state) from the redox metal salt (i.e., with the redox metal ion in the lower oxidation state) can also be a non-catalytic electron transfer step, e.g., the oxidation of the redox metal ion of the redox metal salt. In some examples, the oxidized redox metal salt or the redox metal hydroxy salt is transported outside of the cell 152 where the oxygen gas 186 can then be liberated from the redox metal hydroxy salt using heat 184 so that the required energy for formation of the oxygen gas 186 can be provided thermally (e.g., as illustrated in the system 150 of FIG. 2). As noted above, this type of change in half-cell reaction to form the redox metal hydroxy salt can result in a lower operating voltage even if the fundamental half-cell potential is higher because of savings on the over-potential.

The oxidation of the redox metal from the lower to the higher oxidation state, i.e., to form the redox metal hydroxy salt, can further reduce the operating voltage by reducing thermo-neutral voltage. Typically, if the heat 184 is supplied from a source other than resistive losses in the cell 152, the cell 152 can operate at lower voltages. However, resistive losses that add heat into the cell 152 may not be considered as losses until the cell voltage exceeds the thermo-neutral voltage. By forming the redox metal hydroxy salt at the anode 156, it may be possible to lower the operating voltage by reducing the thermo-neutral voltage. For example, oxidizing the redox metal salt at the anode 156 to form the redox metal hydroxy salt can lower the overall voltage by lowering the thermo-neutral voltage below 1.48 V. Therefore, the lower thermo-neutral voltage as described herein can be used to lower overall operating voltage.

As described herein, the reduction of the operating voltage can also be the result of a lower half-cell potential than oxygen evolution (at the anode) or hydrogen evolution (at the cathode). Because the Gibbs Free Energy can include minimum external work required to accomplish a given transformation (e.g., conversion of water into hydrogen and oxygen), operation below the thermodynamic minimum voltage can be possible if additional energy is provided into the system either as work or as heat. If the heat is obtained from a source other than resistive losses (which can include, but are not limited to, losses within the separator, conductive resistance, solution resistance, and electrode overpotential) within the cell, the net effect will be a reduced demand in electric power.

Accordingly, in an example, no oxygen gas is formed at the anode 156, 206 or less than 25% or less than 10% of the Faradaic efficiency is for the oxygen evolution reaction at the anode 156, 206.

This aspect of the present disclosure is illustrated in FIG. 2, which depicts the anode chamber 154 containing the anode 156 and the anode electrolyte 158, which can include the redox metal salt (with the redox metal ion in the lower oxidation state, shown as Redox Mediator (L) in FIG. 2) and the cathode chamber 160 containing the cathode 162 in the cathode electrolyte 164 in the electrochemical cell 152. The redox metal salt is oxidized to the redox metal hydroxy salt (with the redox metal ion in the higher oxidation state, shown as Redox Mediator (H) in FIG. 2) in the presence of hydroxide ions 172 at the anode 156 and hydrogen gas 174 is formed at the cathode 162.

In an example, the cathode electrolyte 164 comprises water and the water is reduced at the cathode 162 to form the hydroxide ions 172 and the hydrogen gas 174. In an example, the anode electrolyte 158 and the cathode electrolyte 164 are separated by a separator 170 (such as an anion exchange membrane 170 (AEM)). In an example, hydroxide ions 172 migrate from the cathode electrolyte 164 to the anode electrolyte 164 through the AEM 170. In an example, the anode electrolyte 158 further comprises hydroxide ions 172.

In an example, the anode electrolyte 158 comprises the redox metal salt and water. In some examples, the anode electrolyte 158 comprises the redox metal salt and saltwater. In some examples, the presence of saltwater can solubilize the redox metal salt and/or the redox metal hydroxy salt in the anode electrolyte 158 resulting in improved efficiency of the process. In some examples, the presence of saltwater in the thermal reactor 180 can facilitate the evolution of the oxygen gas 186.

In some examples, the methods described herein further comprise transferring at least a portion of the anode electrolyte 158 comprising the redox metal hydroxy salt (e.g., as part of the transferring electrolyte solution 182) to the thermal reactor 180 to form the oxygen gas 186 and the redox metal salt.

At least a portion of the anode electrolyte 158 comprising the redox metal hydroxy salt is transferred outside the electrochemical cell 152 (e.g., as the transferring electrolyte solution 182), which is subjected to a thermal oxygen evolution reaction (e.g., in the thermal reactor 180) where evolution of oxygen gas 186 takes place and the redox metal salt is reformed. The redox metal salt can be transferred back to the anode chamber 154 of the electrochemical cell 152, such as via the returning electrolyte solution 188. The water formed in the thermal reaction can be partially or fully transferred to the cathode chamber 160 of the cell 152, such as via the water recycle line 190.

The thermal oxygen evolution reaction can take place in the thermal reactor 180, which can be operably connected to the electrochemical cell 152 and configured to receive the transferring electrolyte solution 182, which comprises the redox metal hydroxy salt, and subject it to thermal reaction to form oxygen gas 186 and the redox metal salt.

The anode chamber 154 and the cathode chamber 160 are separated by a separator 170 (such as an anion exchange membrane 170 (AEM 170)) (shown by a vertical dashed line in FIG. 2). In an example, the AEM 170 is used to separate the electrode chambers 154, 160 rather than a proton exchange (PEM). The use of the AEM 170 reduces, minimizes, or eliminates the transport of the redox metal ion from the anode chamber 154 to the cathode chamber 160 in order to minimize or prevent contamination of the cathode electrolyte 164 and to improve the efficiency of the process.

In an example, the transferring electrolyte solution 182 that transfers the redox metal hydroxy salt from the anode chamber 154 to the thermal reactor 180 can be in solid form or in liquid solution form. In some examples, the redox metal salt or the redox metal hydroxy salt, or both, can be partially or fully insoluble in the anode electrolyte 158. In such examples, the redox metal salt or the redox metal hydroxy salt, or both, may or may not be separated from the anode electrolyte 158. Various known techniques can be used for such a separation including, but not limited to, techniques for liquid-solid separation, e.g., filtration.

The methods and systems provided herein are sometimes closed-loop processes, therefore, the order of one or more steps provided herein can be alternated or rearranged and the steps are not necessarily arranged in a serial fashion.

The redox metal ion in the redox metal salt can be any redox metal. In an example, the redox metal ion in the lower oxidation state enters the anode chamber 154 of the electrochemical cell 150 where it is oxidized to the higher oxidation state at the anode 156. The redox metal salt can combine with one or more hydroxide ions 172 in accordance with the change in the oxidation state so that the half-cell reactions are given as below:

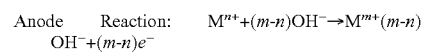

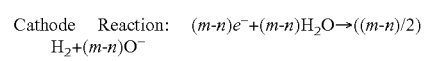

In the above reactions, the redox metal ion of the redox metal salt in the lower oxidation state is represented as $M^{n+}$ and the redox metal ion of the redox metal salt in the higher oxidation state is represented as $M^{m+}$. The metal hydroxy anion ($M^{m+}(m-n)OH^-$) then undergoes thermal reaction to form oxygen gas, as below:

Thermal reaction: $M^{m+}(m-n)OH^- \rightarrow M^{n+} + ((m-n)/4)O_2 + ((m-n)/2)H_2O$ It is to be understood that the redox metal hydroxy salt can be one or more species of stoichiometry $M_x^{m+}X_y(OH)_{(mx-y)}$, $M_xX_y(OH)_{(2x-y)}$, $M_xX_y(OH)_{(3x-y)}$, or $M_xX_y(OH)_{(4x-y)}$, where M is the redox metal ion, X is the corresponding anion (such as, e.g. halide, sulfate, or phosphate, and the like), OH is a hydroxyl group, and m, x, and y are integers. In some examples, m, x, and y are integers from 1 to 5. For example, the CuBrOH species represents one of many possible copper hydroxy bromide species of stoichiometry $Cu_xBr_y(OH)_{(2x-y)}$. Other examples of the redox metal hydroxy salt, without limitation include, $MX(OH)_3$, $MX_2(OH)_2$, and $MX_3(OH)$ (where M is the redox metal and X is the corresponding anion).

An illustrative example of the redox metal ion of the redox metal salt is copper. In an example, wherein the redox metal salt is copper halide, the reactions can be illustrated as below:

Anode Reaction: $4CuX + 4OH^- \rightarrow 4CuXOH + 4e^-$

Cathode Reaction: $4e^- + 4H_2O \rightarrow 2H_2 + 4OH^-$

Thermal reaction: $4CuXOH \rightarrow 4CuX + O_2 + 2H_2O$

Where X is a halide selected from fluoride, bromide, chloride, or iodide. For example, the redox metal hydroxy halide CuXOH in the above embodiment can be copper hydroxy chloride, copper hydroxy bromide, or copper hydroxy iodide.

In the above noted reaction, the CuX with Cu in the lower oxidation state is oxidized to CuXOH with the Cu in the higher oxidation state at the anode 156. Water is reduced to hydrogen gas 174 and hydroxide ions 172 at the cathode 162. Hydroxide ions 172 migrate from the cathode electrolyte 164 to the anode electrolyte 158 through the AEM 170, maintaining a steady-state pH differential of greater than 1 between the anode electrolyte 158 and the cathode electrolyte 164. The anode electrolyte 158 containing the CuXOH and optionally the hydroxide ions 172 is then transferred out of the electrochemical cell 152 via the transferring electrolyte solution 182 to the thermal reactor 180, where oxygen gas 186 and CuX is formed.

In an, the thermal reactor/reaction to generate the oxygen gas 186 can be replaced by a second electrochemical cell/reaction, as in the system 200 of FIG. 3.

In an example, the method can further comprise transferring at least a portion of the anode electrolyte 208 comprising the redox metal hydroxy salt outside the electrochemical cell 202 and combining it with a second cathode electrolyte 244 of a second electrochemical cell 230, and reducing the redox metal hydroxy salt to the redox metal salt at a second cathode 242 of the second electrochemical cell 232. In an example, the method further comprises migrating hydroxide ions 254 from the second cathode electrolyte 244 to a second anode electrolyte 238 through a second separator 250 (such as a second AEM 250) in the second electrochemical cell 230 and oxidizing the hydroxide ions 254 at a second anode 236 of the second electrochemical cell 230 to form oxygen gas 256.

In an example, the system provided herein further comprises the second electrochemical cell 230 operably connected to the first electrochemical cell 202, wherein the second electrochemical cell 230 comprising the second anode 236 and the second anode electrolyte 238, the second cathode 242 and the second cathode electrolyte 244, wherein the second cathode electrolyte 244 is configured to receive the transferred portion of the first anode electrolyte 208 from the first electrochemical cell 202 (e.g., via the transferring electrolyte solution 182), which comprises the redox metal hydroxy salt, and the second cathode 242 is configured to reduce the redox metal hydroxy salt to the redox metal salt.

In an example, the system further comprises a first separator 220 (such as a first AEM 220) between the first anode 206 and the first cathode 212 in the first electrochemical cell 202 as well as a second separator 250 (such as a second AEM 250) between the second anode 236 and the second cathode 242 of the second electrochemical cell 230, wherein the AEMs 220, 250 are configured to transfer hydroxide ions 222, 254 from their corresponding cathode electrolyte 214, 244 to their corresponding anode electrolyte 208, 238. In an example, the second anode 236 in the second electrochemical cell 230 is configured to oxidize the hydroxide ions 250 to oxygen gas 256.

In an example, the first electrochemical cell 202 and the second electrochemical cell 230 operate at different current and voltage to selectively perform their respective anode reactions.

Figure 4:
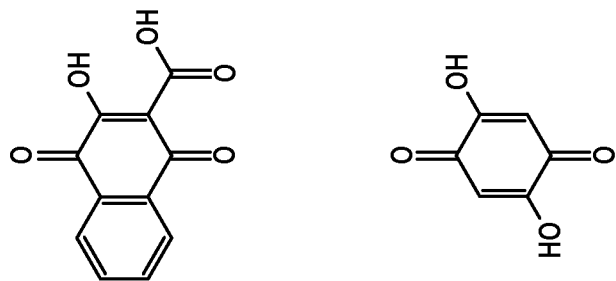
FIG. 4 are chemical structure diagrams of some examples of the redox organic compounds such as quinones.
Figure 4:
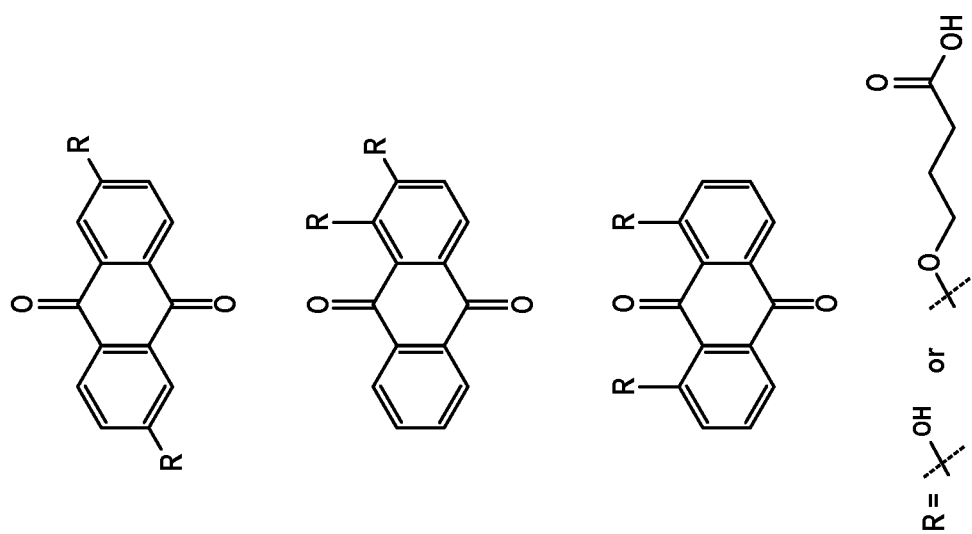

This aspects of the present disclosure is illustrated in FIG. 4. In an example, at least a portion of the first anode electrolyte 208 comprising the redox metal hydroxy salt in the higher oxidation state (shown as "Redox Mediator (H)" in FIG. 4) is transferred outside the first electrochemical cell 202 (e.g., via a transferring electrolyte solution 232) and is added to the second cathode electrolyte 244 of the second electrochemical cell 230. In the second electrochemical cell 230, the redox metal hydroxy salt is reduced to the redox metal salt at the second cathode 242. In the second electrochemical cell 230, hydroxide ions 254 migrate from the second cathode electrolyte 244 to the second anode electrolyte 238 through the second AEM 250 in the second electrochemical cell 230 and the second anode 256 oxidizes the hydroxide ions 254 to form oxygen gas 256. At least a portion of the second cathode electrolyte 244 comprising the redox metal salt in the lower oxidation state (shown as "Redox Mediator (L" in FIG. 4) can be transferred back to the first electrochemical cell 202, such as via a returning electrolyte solution 252, where it is combined with the first anode electrolyte 208 in the first anode chamber 204 of the first electrochemical cell 202.

In an example, the pH of the first anode electrolyte 208 may affect oxidation of the redox metal salt over any other competing oxidation reaction. For example, the pH of the first anode electrolyte 208 can be more than 10, or for example from about 10 to about 12, such as from about 10 to about 14, for example from about 10 to about 11.5, such as from about 10 to about 15, for example from about 11 to about 15, or can be about 10, about 11, about 11.5, about 13, or about 14. In an example, the pH of the first anode electrolyte 208 can facilitate oxidation of the redox metal salt over the oxidation of the hydroxide ions 222 migrating from the first cathode electrolyte 214 to the first anode electrolyte 208 through the first AEM 220.

In an example, a steady-state pH differential between the first anode electrolyte 208 and the first cathode electrolyte 214, when the oxidation of the redox metal salt to the redox metal hydroxy salt takes place at the first anode 206, is greater than about 1, for example from about 1 to about 7, such as from about 1 to about 6for example from about 1 to about 5such as from about 1 to about 4, for example from about 1 to about 3, such as from about 1 to about 2, for example from about 2 to about 7, such as from about 2 to about 6, for example from about 2 to about 5, such as from about 2 to about 4, for example from about 2 to about 3, such as from about 3 to about 7, for example from about 3 to about 6, such as from about 3 to about 5, for example from about 3 to about 4, such as from about 4 to about 7, for example from about 4 to about 6, such as from about 4 to about 5, for example from about 5 to about 7, such as from about 5 to about 6, such as from about 6 to about 7.

In an example, the method and system have a theoretical voltage of less than about 1.3 V, for example less than about 1.23 V, such as less than about 1.5 V, for example less than about 2 V, such as less than about 2.5 V of the electrochemical cell 202. In an example, the method and system have an operating voltage of from about 1.3 V to about 3 V, for example from about 1.5 V to about 3 V, such as from about 2 V to about 3 V, for example from about 1 V to about 3 V, such as from about 1.5 V to about 2.5 V, of the electrochemical cell 202.

In an example, the redox metal salt with the redox metal ion in the lower oxidation state is selected from the group consisting of CuCl, CuBr, CuI, FeCl$_2$, FeBr$_2$, FeI$_2$, SnCl$_2$, SnBr$_2$, SnI$_2$, Cu$_2$SO$_4$, FeSO$_4$, SnSO$_4$, Cu$_3$PO$_4$, Fe$_3$(PO$_4$)$_2$, and Sn$_3$(PO$_4$)$_2$.

In an example, the redox metal hydroxy salt with the metal ion in the higher oxidation state is selected from the group consisting of Cu(OH)$_x$Cl$_y$, Cu(OH)$_x$Br$_y$, Cu(OH)$_x$I$_y$, Fe(OH)$_x$Cl$_y$, Fe(OH)$_x$Br$_y$, Fe(OH)$_x$I$_y$, Sn(OH)$_x$Cl$_y$, Sn(OH)$_x$Br$_y$, Sn(OH)$_x$I$_y$, Cu$_2$(OH)$_x$(SO$_4$)$_y$, Fe(OH)$_x$(SO$_4$)$_y$, Sn(OH)$_x$(SO$_4$)$_y$, Cu$_3$(OH)$_x$(PO$_4$)$_y$, Fe$_3$(OH)$_x$(PO$_4$)$_y$, and Sn$_3$(OH)$_x$(PO$_4$)$_y$, wherein x and y are integers and add to balance the charge on the metal.

In some examples,
the redox metal salt with the metal ion in the lower oxidation state is CuCl and the redox metal hydroxy salt with the metal ion in the higher oxidation state is Cu(OH)$_x$Cl$_y$;
the redox metal salt with the metal ion in the lower oxidation state is CuBr and the redox metal hydroxy salt with the metal ion in the higher oxidation state is Cu(OH)$_x$Br$_y$;
the redox metal salt with the metal ion in the lower oxidation state is CuI and the redox metal hydroxy salt with the metal ion in the higher oxidation state is Cu(OH)$_x$I$_y$;
the redox metal salt with the metal ion in the lower oxidation state is FeCl$_2$ and the redox metal hydroxy salt with the metal ion in the higher oxidation state is Fe(OH)$_x$Cl$_y$;
the redox metal salt with the metal ion in the lower oxidation state is FeBr$_2$ and the redox metal hydroxy salt with the metal ion in the higher oxidation state is Fe(OH)$_x$Br$_y$; or
the redox metal salt with the metal ion in the lower oxidation state is FeI$_2$ and the redox metal hydroxy salt with the metal ion in the higher oxidation state is Fe(OH)$_x$I$_y$,
wherein x, and y are integers.

In some examples, the redox metal hydroxy salt with the redox metal ion in the higher oxidation state is M$_x^{m+}$X$_y$(OH)$_{(mx-y)}$, M$_x$X$_y$(OH)$_{(2x-y)}$, M$_x$X$_y$(OH)$_{(3x-y)}$, M$_x$X$_y$(OH)$_{(4x-y)}$, or combinations thereof, wherein M is the redox metal ion, X is the corresponding anion, OH is a hydroxyl group, and m, x, and y are integers (depending on the valences of M and X). In some examples, the x and y are integers independently between about 1-10 or 1-8 or 1-5.

Non-limiting examples of the reaction of the redox metal ions at the anode 206 are shown in TABLE 2 below. In TABLE 2, "SHE" is "standard hydrogen electrode". Theoretical values of the anode potential are also shown. It is to be understood that some variation from these voltages may occur depending on conditions, pH, concentrations of the electrolytes, etc., and such variations are well within the scope of the present disclosure.

TABLE 2

| Anode Reaction | Anode Potential (V vs. SHE) |
| --- | --- |
| Ag$^+$ → Ag$^{2+}$ + e$^-$ | −1.98 |
| Co$^{2+}$ → Co$^{3+}$ + e$^-$ | −1.82 |
| Pb$^{2+}$ → Pb$^{4+}$ + 2e$^-$ | −1.69 |
| Ce$^{3+}$ → Ce$^{4+}$ + e$^-$ | −1.44 |
| 2Cr$^{3+}$ + 7H$_2$O → Cr$_2$O$_7^{2-}$ + 14H$^+$ + 6e$^-$ | −1.33 |
| Tl$^+$ → Tl$^{3+}$ + 2e$^-$ | −1.25 |
| Hg$_2^{2+}$ → 2Hg$^{2+}$ + 2e$^-$ | −0.91 |
| Fe$^{2+}$ → Fe$^{3+}$ + e$^-$ | −0.77 |
| V$^{3+}$ + H$_2$O → VO$^{2+}$ + 2H$^+$ + e$^-$ | −0.34 |
| U$^{4+}$ + 2H$_2$O → UO$_2^{2+}$ + 4H$^+$ + e$^-$ | −0.27 |
| Bi$^+$ → Bi$^{3+}$ + 2e$^-$ | −0.20 |
| Ti$^{3+}$ + H$_2$O → TiO$^{2+}$ + 2H$^+$ + e$^-$ | −0.19 |
| Cu+ → Cu$^{2+}$ + e$^-$ | −0.16 |
| UO$_2^+$ → UO$_2^{2+}$ + e$^-$ | −0.16 |
| Sn$^{2+}$ → Sn$^{4+}$ + 2e$^-$ | −0.15 |
| Ru(NH$_3$)$_6^{2+}$ → Ru(NH$_3$)$_6^{3+}$ + e$^-$ | −0.10 |
| V$^{2+}$ → V$^{3+}$ + e$^-$ | +0.26 |
| Eu$^{2+}$ → Eu$^{3+}$ + e$^-$ | +0.35 |
| Cr$^{2+}$ → Cr$^{3+}$ + e$^-$ | +0.42 |
| U$^{3+}$ → U$^{4+}$ + e$^-$ | +0.52 |

Those having skill in the art will appreciate that the redox metal salt and the redox metal hydroxy salt can both be present in the anode electrolyte 208 exiting the anode chamber 204 (e.g., in the transferring electrolyte solution 232) depending on the oxidation.

Owing to the oxidation of the redox metal salt from the lower oxidation state to the higher oxidation state at the anode 206, the amount of the redox metal salt can be different in the anode electrolyte entering the anode chamber 204 (e.g., the returning electrolyte solution 252) can be different from the amount in the electrolyte exiting the anode chamber 204 (e.g., as the transferring electrolyte solution 232).

Examples of the redox metal salt with the redox metal ion in the lower oxidation state that can be used in the systems and methods provided herein include, but are not limited to, copper (I) halide, iron (II) halide, tin (II) halide, chromium (II) halide, zinc (II) halide, and combinations thereof.

Redox Organic Compound in the Anode Electrolyte

In an example, the redox mediator is a redox organic compound. The term "redox organic compound," as used herein, refers to an organic compound that can undergo oxidation-reduction reactions that involves transfer of one or more electrons. Examples of redox organic compounds include, but are not limited to, hydroquinone or quinone compounds. Quinone or hydroquinone compounds are well known and can be any compound containing a quinone or a hydroquinone moiety. The redox organic compound such as a hydroquinone or a quinone compound can contain any number of derivative groups, independently including, but not limited to, a hydroxyl, a halide, a carboxyl, an alcohol, an amine, or combinations thereof. A few non-limiting examples of quinones are illustrated in FIG. 4. Examples of quinones include, but are not limited to, a hydroxy benzoquinone, such as a monohydroxy benzoquinone, a dihydroxy benzoquinone, a trihydroxy benzoquinone, or a tetrahydroxy benzoquinone (e.g., 2,5-dihydroxy-1,4-benzoquinone); a hydroxy naphthoquinone, such as a monohydroxy naphthoquinone, a dihydroxy naphthoquinone, a trihydroxy naphthoquinone, a tetrahydroxy naphthoquinone, or a hydroxy carboxy naphthoquinone or esters thereof (e.g., 2-hydroxy-3-carboxy-1,4-naphthoquinone); a hydroxy anthraquinone, such as a monohydroxy anthraquinone, a dihydroxy anthraquinone, a trihydroxy anthraquinone, or a tetrahydroxy anthraquinone (e.g., 2,6-dihydroxyanthraquinone, 2,3,6,7-tetrahydroxy anthraquinone, or 1,5-dimethyl-2,6-dihydroxy anthraquinone); a hydroxy carboxy anthraquinone or esters thereof (e.g., 4,4'-((9,10-anthraquinone-2,6-diyl)dioxy)dibutyrate) (also referred to as 2,6-DBEAQ), 1,2-DBEAQ, or 1,8-DBEAQ, or the like. The structure of some of these compounds are illustrated in FIG. 4.

Accordingly, the present disclosure describes a method to generate hydrogen gas, the method comprising:
providing an anode and an anode electrolyte in an electrochemical cell, wherein the anode electrolyte comprise a hydroquinone;
providing a cathode and a cathode electrolyte in the electrochemical cell;
forming hydrogen gas and hydroxide ions at the cathode;
separating the anode electrolyte from the cathode electrolyte by a separator, such as an anion exchange membrane (AEM);
migrating the hydroxide ions from the cathode electrolyte to the anode electrolyte through the separator; and
oxidizing the hydroquinone to a quinone at the anode.

In an example, the method further comprises maintaining a steady-state pH differential of greater than 1 between the anode electrolyte and the cathode electrolyte.

Similarly, the present disclosure also describes an electrochemical cell to generate hydrogen gas, the electrochemical comprising:
an anode and an anode electrolyte, wherein the anode electrolyte comprises a hydroquinone;
a cathode and a cathode electrolyte comprising water, wherein the cathode is configured to reduce water to form hydroxide ions and hydrogen gas; and
a separator (such as an anion exchange membrane) disposed between the anode electrolyte and the cathode electrolyte and configured to migrate the hydroxide ions from the cathode electrolyte to the anode electrolyte;
wherein the anode is configured to oxidize the hydroquinone to a quinone.

In an example, the electrochemical cell is configured to maintain a steady-state pH differential of greater than 1 between the anode electrolyte and the cathode electrolyte.

In an example, the anode electrolyte comprises both hydroquinone (e.g., as feedstock to the anode electrolyte) and quinone (e.g., after the oxidation reaction at the anode).

Various pH ranges for the anode electrolyte and the cathode electrolyte as well as the steady-state pH differentials have been provided herein and are all applicable to the aforementioned aspects. The cathode reactions have been described herein.

In some examples, the anode electrolyte comprising quinone is transferred outside the first electrochemical cell 202 and is reduced electrochemically in the second electrochemical cell 230 to form oxygen gas 256 and a reduced form of hydroquinone. The electrochemical cell 230 and the reactions that take place therein to form the oxygen gas 256 has been described herein.

In some examples, the methods of the present disclosure further comprise transferring a portion of the anode electrolyte 204 comprising the quinone outside the electrochemical cell 202 (e.g., as the transferring electrolyte solution 232) and combining the transferred portion with the cathode electrolyte 244 of the second electrochemical cell 230. The quinone can be reduced to hydroquinone at the cathode 242 of the second electrochemical cell 230.

In some examples, the method further comprise migrating hydroxide ions 254 from the second cathode electrolyte 244 to the second anode electrolyte 238 through the second AEM 250 in the second electrochemical cell 230 and oxidizing the hydroxide ions 254 at the anode 236 in the second electrochemical cell 230 to form oxygen gas 256.

In some examples, the systems described herein further comprise the second electrochemical cell 230 operably connected to the first electrochemical cell 202, wherein the second electrochemical cell 230 comprises the second anode 236 and the second anode electrolyte 238 contained at least partially in the second anode chamber 234 and the second cathode 242 and the second cathode electrolyte 244 contained at least partially in the second cathode chamber 240, wherein the second cathode electrolyte 244 receives the transferred portion of the first anode electrolyte 208 from the first electrochemical cell 202 comprising quinone (e.g., by receiving the transferring electrolyte solution 232 in the second cathode chamber 240) and the second cathode 242 is configured to reduce the quinone to hydroquinone.

In some examples, the system further comprises a first separator 220 (such as a first AEM 220) between the first anode 206 and the first cathode 212 in the first electrochemical cell 202 as well as a second separator 250 (such as a second AEM 250) between the second anode 2\36 and the second cathode 242 in the second electrochemical cell 230, wherein each AEM 220, 250 is configured to transfer hydroxide ions 222, 254 from the corresponding cathode electrolyte 214, 244 to the corresponding anode electrolyte 208, 238 through the AEM 220, 250 in both the first electrochemical cell 202 and the second electrochemical cell 230. In some examples, the anode 236 in the second electrochemical cell 230 is configured to oxidize hydroxide ions 254 to form the oxygen gas 256.

In some examples, the first electrochemical cell 202 and the second electrochemical cell 230 operate at different currents and voltages to selectively perform their respective anode reactions.

Thes aspects are illustrated in FIG. 3 where there is illustrated a first electrochemical cell 202 comprising a first anode chamber 204 containing a first anode 206 and a first anode electrolyte 208 comprising a redox organic compound in a lower oxidation state, such as, e.g., hydroquinone (shown as Redox Mediator (L) entering the first anode chamber 204 of the first electrochemical cell 202 in the returning electrolyte solution 252 in FIG. 3) and a first cathode 210 chamber containing a first cathode 212 and a first cathode electrolyte 214. The redox organic compound in the lower oxidation state, such as hydroquinone, is oxidized at the first anode 206 to form a redox organic compound in a higher oxidation state, such as, e.g., quinone (shown as Redox Mediator (H) exiting the first anode chamber of the first electrochemical cell 202 in the transferring electrolyte solution 232 in FIG. 2). Hydrogen gas 224 is formed at the first cathode 212.

As described above, in an example the first anode chamber 204 and the first cathode chamber 210 can be separated by a separator 220 (such as an anion exchange membrane (AEM) 220) (shown as a vertical dashed line in FIG. 3). In an example, the AEM 220, rather than a PEM, is used to separate the electrode chambers 204, 210. The use of the AEM 220 can reduce, minimize, or eliminate the transport of the redox organic compound from the anode chamber 204 to the cathode chamber 210, preventing contamination of the cathode electrolyte 214 and improving the efficiency of the process.

In some examples, the cathode electrolyte 214 comprises water and the water is reduced at the cathode 212 to form hydroxide ions 222 and hydrogen gas 224. In some examples, the anode electrolyte 208 and the cathode electrolyte 214 are separated by the anion exchange membrane (AEM) 220. In some examples, the hydroxide ions 2322 migrate from the cathode electrolyte 214 to the anode electrolyte 208 through the AEM 220 and maintain a steady-state pH differential of greater than 1 between the anode electrolyte 2308 and the cathode electrolyte 214 in the first electrochemical cell 202. In some examples, the anode electrolyte 208 further comprises hydroxide ions 222, e.g., that had been transferred to the anode electrolyte 208 via the AEM 220.

In some examples, the anode electrolyte 208 comprises the redox organic compound and water, and in some examples, the anode electrolyte 208 comprises the redox organic compound and saltwater ("saltwater" has been described herein).

In some examples, at least a portion of the anode electrolyte 208 comprising the redox organic compound in the higher oxidation state, such as, e.g., quinone, is transferred outside the first electrochemical cell 202 (shown as the Redox Mediator (H) in the transferring electrolyte solution 232 in FIG. 3) so that the redox organic compound in the higher oxidation state can be subjected to a second electrochemical reaction. In an example, the transferred portion of the first anode electrolyte 208 comprising the redox organic compound in the higher oxidation state, such as, e.g., quinone, is combined with the second cathode electrolyte 244 of the second electrochemical cell 230. In the second electrochemical cell 230, the redox organic compound in the higher oxidation state, e.g., quinone, can be reduced to a corresponding redox organic compound in a lower oxidation state, e.g., hydroquinone, at the second cathode 242 of the second electrochemical cell 230. In the second electrochemical cell 230, hydroxide ions 254 migrate from the second cathode electrolyte 244 to the second anode electrolyte 238 through a second separator 250 (such as a second AEM 250) in the second electrochemical cell 230 and a second anode 236 of the second electrochemical cell 230 oxidizes the hydroxide ions 254 to form oxygen gas 256. At least a portion of the second cathode electrolyte 244 comprising the redox organic compound in the lower oxidation state, e.g., hydroquinone (shown as Redox Mediator (L) in the returning electrolyte solution 252 in FIG. 3) can be transferred back to the first anode electrolyte 208 of the first electrochemical cell 202.

The methods and systems described herein can be closed-loop processes, such that the order of one or more steps provided herein can be alternated or rearranged and the steps are not necessarily arranged in a serial fashion.

Figure 5:
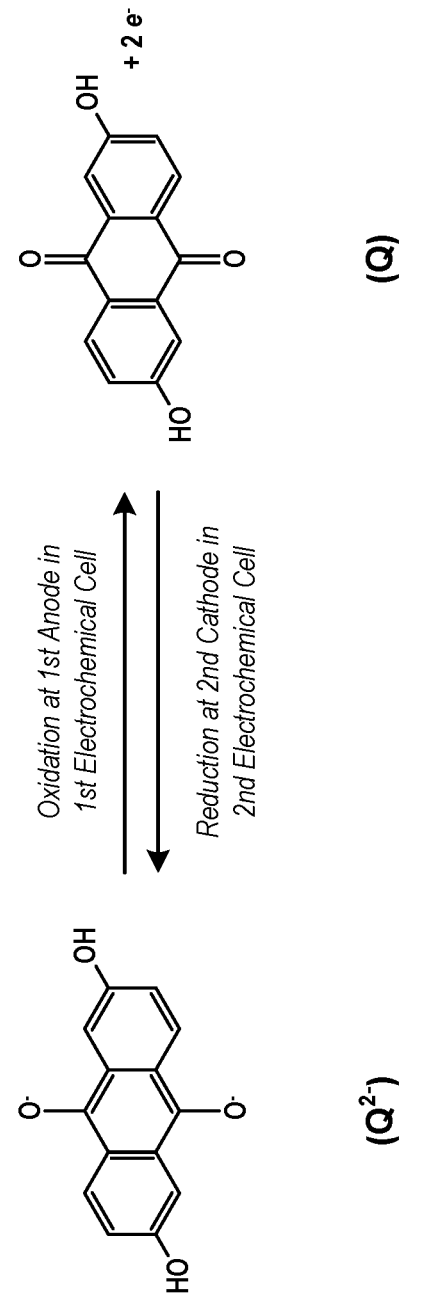
FIG. 5 are chemical reaction diagrams of an example reduction-oxidation reaction of the redox organic compound.

An exemplary oxidation of hydroquinone to its quinone at the anode 206, such as, e.g., 2,6-dihydroxyanthraquinone, is illustrated in FIG. 5.

For example, in the first electrochemical cell 202, the cathode electrolyte 214 enables evolution of hydrogen gas 224 from water while the anode reaction oxidizes hydroquinone ($Q^{2-}$) to quinone (Q), as shown below. The generated hydroxide ions 222 can migrate from the cathode electrolyte 214 through the AEM 220 to the anode electrolyte 208 containing the quinone/hydroquinone solution:

Cathode Reaction: 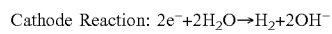 $2e^- + 2H_2O \rightarrow H_2 + 2OH^-$

Anode Reaction: 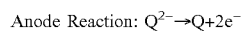 $Q^{2-} \rightarrow Q + 2e^-$

At least a portion of the anode electrolyte 208 containing the quinone solution from the first electrochemical cell 202 can be transferred to the second cathode electrolyte 244 of the second electrochemical cell 232. In the second electrochemical cell 232, the cathode reaction reduces the quinone (Q) to hydroquinone ($Q^{2-}$). Hydroxide ions from the quinone/hydroquinone solution can migrate from the second cathode chamber 240 of the second electrochemical cell 232 through the second AEM 250 to the second anode chamber 234 where the oxygen gas 256 is formed:

Cathode Reaction: 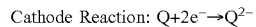 $Q + 2e^- \rightarrow Q^{2-}$

Anode Reaction:  $2OH^- \rightarrow \frac{1}{2}O_2 + H_2O + 2e^-$

In some examples, the pH of the anode electrolyte 208 can affect oxidation of the redox organic compound over any other competing oxidation reaction. For example, in some embodiments, the pH of the anode electrolyte 208 is more than 10, or from about 10 to about 12, or from about 10 to about 14, or from about 10 to about 11.5, or from about 10 to about 15, or from about 11 to about 15, or is about 10, or is about 11, or is about 11.5, or is about 12, or is about 13, or is about 14. In some examples, a pH of the anode electrolyte 208 can facilitate oxidation of the redox organic compound over the oxidation of the hydroxide ions 222 that had migrated from the cathode electrolyte 214 to the anode electrolyte 208 through the AEM 220.

In an example, a steady-state pH differential between the anode electrolyte 208 and the cathode electrolyte 214, when the oxidation of the redox organic compound takes place at the anode 206, is greater than about 1, for example from about 1 to about 7, such as from about 1 to about 6, for example from about 1 to about 5, such as from about 1 to about 4, for example from about 1 to about 3, such as from about 1 to about 2, for example from about 2 to about 7, such as from about 2 to about 6, for example from about 2 to about 5, such as from about 2 to about 4, for example from about 2 to about 3, such as from about 3 to about 7, for example from about 3 to about 6, such as from about 3 to about 5, for example from about 3 to about 4, such as from about 4 to about 7, for example from about 4 to about 6, such as from about 4 to about 5, for example from about 5 to about 7, such as from about 5 to about 6, for example from about 6 to about 7.

In some examples, the methods and systems described herein have a theoretical voltage of less than about 2.5 V, for example less than about 2 V, such as less than about 1.5 V, for example less than about 1.3 V, such as less than about 1.23 V for a theoretical voltage of the electrochemical cell 202. In some examples, the methods and systems described herein have an operating voltage of from about 1 V to about 3 V, for example from about 1.3 V to about 3 V, such as from about 1.5 V to about 3 V, for example from about 1.5 V to about 2.5 V for an operating voltage of the electrochemical cell 202.

Both Oxidation of the Redox Mediator and Oxygen Evolution at the Anode

As described above, oxidation of the redox mediator at the anode 206 can be at a voltage low enough to not evolve gas (e.g., oxygen or chlorine gas) or to evolve only a small amount of gas to reduce or minimize efficiency losses in the electrochemical cell 202. In such examples, the electrochemical cell 202 can operate at below about 25% Faradaic efficiency to oxygen (i.e., at least about 75% of current may be for oxidation of the redox mediator and no more than about 25% of the current, e.g., no more than about 15% or 10% or 5% or 1%, of the current can be for oxygen evolution).

In an example, the electrochemical cell 202 that oxidizes the redox mediator (e.g., a redox metal oxyanion, a redox non-metal oxyanion, a redox metal salt, or a redox organic compound) at the anode 206 can also be operated in such a way as to form oxygen gas at the anode 206 simultaneously, or sequentially, or solely, depending on the applied current and the voltage in the cell 202. In such examples, the cell 202 can operate at below about 95% Faradaic efficiency to oxygen (i.e., no more than about 95% may be for the oxygen evolution).

Typically, electrochemical systems are designed to prevent a secondary reaction at the electrode in order to reduce or minimize efficiency losses in making an undesirable product. Applicants have surprisingly and unexpectedly found that it is economically advantageous to have an electrochemical system with the flexibility to run at variable power to form different products at the anode 206 to align with variable electrical power availability/prices and form the hydrogen gas 224 at the cathode 212 with lower cost. For example, oxidation of the redox mediator at the anode 206 can be predominant at low current and voltage with minimal or no oxygen gas formed at the anode 206 and oxidation of hydroxide ions 222 to oxygen gas can be predominant at high current and high voltage with minimal or no oxidation of the redox mediator. The cell 202 can be operated at low current (or load shedding) during peak electricity prices (such as, e.g., day time) to oxidize the redox mediator and the same cell 202 can be operated at high current (or load gaining) when electricity prices are low (such as, e.g., night time or day time when the power comes from a solar plant) to form the oxygen gas at the anode 206.

In some examples, select redox mediator oxidation occurs at a lower voltage at the anode 206 than oxygen evolution, increasing efficiency of hydrogen production (i.e., at a lower overall voltage) at the cathode 212. Applicants have surprisingly found that in some examples oxidation of the redox mediator may not be sustained at higher current due to mass transfer limitations, such that the reactive species may not be replenished at the anode 206 quickly enough. The voltage of the system can be increased in order to sustain the desired current and can then oxidize the next energetically lowest reactant, such as the hydroxide ions 222 to oxygen gas. Therefore, in some examples, the redox mediator can be oxidized and oxygen gas 228 can evolved simultaneously (illustrated in FIG. 6 with oxygen gas 228 evolution at the anode 206 shown with a dashed arrow) or sequentially, or solely by controlling the current and the voltage. This can provide an advantage to generate hydrogen at a lower voltage overall and to have the ability to increase hydrogen production when conditions are favorable (such as low electricity prices) by both oxidizing the redox mediator and evolving oxygen gas 228.

Accordingly, in an example, there are provided methods to generate hydrogen gas, comprising: providing an anode 206 and an anode electrolyte 208 comprising a redox mediator in a lower oxidation state in an electrochemical cell 202; oxidizing the redox mediator in the lower oxidation state to form a redox mediator in a higher oxidation state at the anode 206; oxidizing hydroxide ions 222 at the anode 206 to form oxygen gas 228; and providing a cathode 212 and a cathode electrolyte 214 in the electrochemical cell 202 and forming hydrogen gas 224 at the cathode 212.

In some examples, at least a portion of the anode electrolyte 208 comprising the redox mediator in the higher oxidation state can be transferred outside the electrochemical cell 202 (such as via a transferring electrolyte solution 232) and thermally reducing and/or electrochemically reducing the redox mediator in the higher oxidation state to form oxygen gas 256 and a reduced form of the redox mediator. i.e., a redox mediator in a lower oxidation state. Both the thermal reaction and electrochemical reaction to form oxygen gas 256 have been described herein (and as illustrated in figures). In some examples, the cathode 212 forms hydroxide ions 222 and the hydroxide ions 222 transfer or migrate from the cathode electrolyte 214 to the anode electrolyte 208.

In an example, a system to generate hydrogen gas comprises: an electrochemical cell 202 comprising an anode 206 and an anode electrolyte 208 comprising a redox mediator in a lower oxidation state, wherein the anode 206 is configured to oxidize the redox mediator in the lower oxidation state to form a redox mediator in a higher oxidation state and/or to oxidize hydroxide ions 222 to form oxygen gas 228; and a cathode 212 and a cathode electrolyte 214 comprising water, wherein the cathode 212 is configured to reduce water to form hydroxide ions 222 and hydrogen gas 224.

In an example, the system further comprises a thermal reactor (such as the thermal reactor 180 shown in FIG. 2) operably connected to the electrochemical cell 202 and configured to receive at least a portion of the anode electrolyte 208 comprising the redox mediator in the higher oxidation state (e.g., in the transferring electrolyte solution 232) and subject the redox mediator in the higher oxidation state to a thermal reaction to form oxygen gas and the redox mediator in the lower oxidation state.

In some examples, oxidation of the redox mediator from the lower oxidation state to the higher oxidation state is at a first current density and oxidation of hydroxide ions 222 to form oxygen gas 228 is at a second current density, wherein the second current density is higher than the first current density.

In an example, a method to generate hydrogen gas comprises:
  providing an anode and an anode electrolyte comprising a redox mediator in a lower oxidation state in an electrochemical cell;
  oxidizing the redox mediator in the lower oxidation state to a redox mediator in a higher oxidation state at the anode at a first current density of from about 1 mA/cm$^2$ to about 1000 mA/cm$^2$, for example from about 1 mA/cm$^2$ to about 600 mA/cm$^2$, such as from about 1 mA/cm$^2$ to about 500 mA/cm$^2$, for example from about 1 mA/cm$^2$ to about 300 mA/cm$^2$;
  oxidizing hydroxide ions at the anode to form oxygen gas at second current density of from about 300 mA/cm$^2$ to about 3000 mA/cm$^2$, for example from about 300 mA/cm$^2$ to about 2000 mA/cm$^2$, such as from about 300 mA/cm$^2$ to about 1000 mA/cm$^2$, for example from about 300 mA/cm$^2$ to about 500 mA/cm$^2$; and providing a cathode and a cathode electrolyte in the electrochemical cell and forming hydrogen gas at the cathode.

In an example, a system to generate hydrogen gas comprises:
an electrochemical cell comprising:
an anode and an anode electrolyte comprising a redox mediator in a lower oxidation state, wherein the anode is configured to oxidize the redox mediator in the lower oxidation state to a redox mediator in higher oxidation state at a first current density of from about 1 mA/cm$^2$ to about 1000 mA/cm$^2$, for example from about 1 mA/cm$^2$ to about 600 mA/cm$^2$, such as from about 1 mA/cm$^2$ to about 500 mA/cm$^2$, for example from about 1 mA/cm$^2$ to about 300 mA/cm$^2$ and/or to oxidize hydroxide ions to oxygen gas at a second current density of from about 300 mA/cm$^2$ to about 3000 mA/cm$^2$, for example from about 300 mA/cm$^2$ to about 2000 mA/cm$^2$, such as from about 300 mA/cm$^2$ to about 1000 mA/cm$^2$, for example from about 300 mA/cm$^2$ to about 500 mA/cm$^2$; and
a cathode and a cathode electrolyte comprising water, wherein the cathode is configured to reduce water to form hydroxide ions and hydrogen gas.

In some examples, oxidation of the hydroxide ions at the anode to form oxygen gas occurs simultaneously or sequentially, or alone with respect to oxidation of the redox mediator from the lower oxidation state to the higher oxidation state.

In some examples, the electrochemical cell operates at below about 25% Faradaic efficiency to oxygen during oxidation of the redox mediator and the cell operates at below about 95% Faradaic efficiency to oxygen during oxidation of the hydroxide ions to form the oxygen gas.

In some examples, the electrochemical cell operates at relatively low current when electricity prices are high (e.g., during daytime) during oxidation of the redox mediator and the electrochemical cell operates at relative high current when electricity prices are low (e.g., at nighttime) during oxidation of the hydroxide ions to form the oxygen gas.

In all the aspects and examples described herein, the redox mediator has been exemplified as a redox metal oxyanion, a redox non-metal oxyanion, a redox metal salt, or a redox organic compound.

Figure 7:
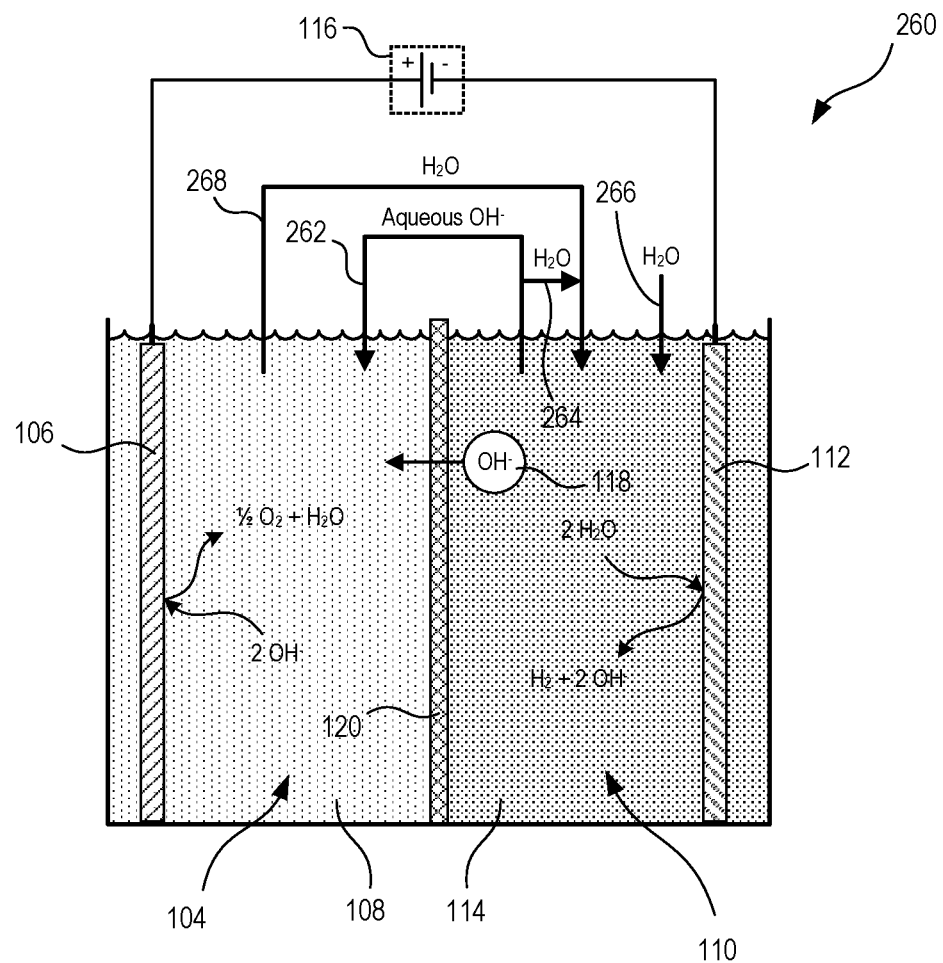
FIG. 7 is an illustration of an example electrochemical cell for the formation of hydrogen gas with an example configuration to maintain a steady-state pH differential between the anode chamber and the cathode chamber of the electrochemical cell.

FIG. 7 shows an example of an electrochemical cell that is configured to provide for the steady-state pH differential between the anode chamber and the cathode chamber of the electrochemical cell, as described above—i.e., so that the anode electrolyte 108, 158, 208 has a pH that is higher than the pH of the cathode electrolyte 114, 164, 214 by a specified amount, e.g., wherein the pH of the anode electrolyte is greater than the pH of the cathode electrolyte by at least 1, for example at least 2, such as at least 3, for example at least 4.

As can be seen in the example of FIG. 7, the example electrochemical cell 260 can be similar to the electrochemical cell 100 described above. Therefore, where appropriate, the reference numbers used for the structures of the electrochemical cell 260 will be the same as that which was used for the electrochemical cell 100. The specific configuration of the electrochemical cell 260 of FIG. 7 can be used for any of the electrochemical cells 100, 152, 202, 230 to maintain a steady-state pH differential between the anode and cathode chambers of the cell 100, 152, 202, 230.

In the example shown in FIG. 7, the electrochemical cell 260 includes an anode chamber 104 that houses an anode 106 and an anode electrolyte 108 and a cathode chamber 110 that houses a cathode 112 and a cathode electrolyte 114. A voltage source 116 is electrically connected to the anode 106 and the cathode 112 and is configured to apply a potential across the electrodes 106, 112, as is known in the art. When the potential is applied across the electrodes 106, 112 by the voltage source 116, water ($H_2O$) within the cathode electrolyte 114 is reduced at the cathode 112 to form hydroxide ions 118 ($OH^-$) and hydrogen gas (not shown in FIG. 7), such as via the reaction described above. A separator 120, such as an anion exchange membrane 120 (referred to as the "AEM 120" for brevity), separates the anode chamber 104 from the cathode chamber 110. Also, when the potential is applied by the voltage source 116, hydroxide ions 118 that had migrated across the AEM 120 are oxidized at the anode 106 to form oxygen gas ($O_2$) and water ($H_2O$).

The electrochemical cell 260 provides for the controlled flow of electrolyte between the anode chamber 104 and the cathode chamber 110 or vice versa to maintain a pH in each chamber 104, 110 as desired to maintain the steady-state pH differential as described above. Specifically, as will be appreciated by those having ordinary skill in the art, as the electrochemical cell 260 is operated, the reduction of water at the cathode 112 to form hydroxide ions $OH^-$ within the cathode electrolyte 114 which tends to raise the pH within the cathode electrolyte 114 as the reduction reaction proceeds. At the same time, the oxidation of hydroxide ions within the anode electrolyte 108 at the anode 106 tends to lower the pH within the anode electrolyte 108 as the oxidation reaction proceeds. As discussed above, the electrochemical cell 260 operates more efficiently when the pH of the anode electrolyte 108 is higher than the pH of the cathode electrolyte 114 by at least a specified amount that is maintained in a steady state during operation of the electrochemical cell 260. But, if something is not done to control the pH of the electrolytes 108, 114, then the raising of the pH of the cathode electrolyte 114 due to the reduction reaction and the lowering of the pH of the anode electrolyte 108 due to the oxidation reaction will cause the pH of the two electrolytes 108, 114 to be driven toward each other.

In order to counter this tendency for the operation of the electrochemical cell 260 to cause the pHs of the electrolytes 108, 114 to be driven toward each other, the electrochemical cell 260 includes piping configured to flow a specified amount the anode electrolyte 108 from the anode chamber 104 to the cathode chamber 110 to mix with the cathode electrolyte 114, or to flow a specified amount of the cathode electrolyte 114 from the cathode chamber 110 to the anode chamber 104 to mix with the anode electrolyte 108, or both. As can be seen in the example of FIG. 7, the electrochemical cell 260 can include a circulation line 262 that bypasses the separator 120 in order to flow aqueous hydroxide ions ($OH^-$) from the cathode chamber 110 to the anode chamber 104. As mentioned above, the reduction reaction that takes place at the cathode 112 results in the formation and accumulation of hydroxide ions ($OH^-$) in the cathode electrolyte 114. The circulation line 262 is configured to flow hydroxide ions ($OH^-$), in the form of an aqueous $OH^-$ solution, in order to (a) reduce the pH of the cathode electrolyte 114 in the cathode chamber 110, and (b) increase the pH of the anode electrolyte 108 in the anode chamber 104.

In an example, the circulation line 262 removes a portion of the cathode electrolyte 114 from the cathode chamber 110 and then water 264 is removed from this portion of the cathode electrolyte 114 and is fed back into the cathode chamber 110. Therefore, the solution in the circulation line 262 has a relatively high concentration of hydroxide ions (OH⁻) and, consequently, a relatively high pH, i.e., a pH that is higher than the pH of the anode electrolyte 108 in the anode chamber 104. This relatively high pH solution is mixed with the anode electrolyte 108 so that it will raise the pH of the anode electrolyte 108 to a specified anode-side pH, such as the anode-side pHs specified above for the anode electrolyte. In addition, the removal of the OH⁻ ions from the cathode electrolyte 114 via the circulation line 262 will lower the pH of the cathode electrolyte 114 to a specified cathode-side pH, such as the cathode-side pHs specified above for the cathode electrolyte. As is also shown in FIG. 7, makeup water 266 can be fed to the cathode chamber 110 to make up for the $H_2O$ that is consumed by the reduction reaction at the cathode 112.

In an example, the electrochemical cell 260 can include another circulation line 268 that passes liquid from the anode chamber 104 to the cathode chamber 110. In an example, the circulation line 268 is configured to remove water from the anode electrolyte 108 so that the water in the circulation line 268 has a relatively low pH compared to the anode electrolyte 108 and the cathode electrolyte 114. The removal of the water in the circulation line 268 will cause the relative concentration of hydroxide ions (OH⁻) in the anode chamber 104 to increase so that the pH of the anode electrolyte 108 will also increase toward the specified anode-side pH. The removed water also has a lower pH than the cathode electrolyte 114 with which it is being mixed, which will tend to lower the pH of the cathode electrolyte 114 toward the specified cathode-side pH.

Electrochemical Cell(s) and Thermal Reactor

In some examples, the concentration of the redox mediator in the lower oxidation state and the concentration of the redox mediator in the higher oxidation state, each individually or collectively, can affect the performance of each of the electrochemical cell/reaction, and the thermal reactor/reaction.

In some examples, the concentration of the redox mediator, such as the redox metal oxyanion or the redox non-metal oxyanion or the redox metal salt (with the redox metal ion or the redox non-metal ion in the lower oxidation state) or the redox organic compound (e.g. hydroquinone), entering the anode chamber has a molar concentration of more than about 0.01 M, for example more than about 0.05 M, such as from about 0.01 M to about 2 M, for example from about 0.01 M to about 1.8 M, such as from about 0.01 M to about 1.5 M, for example from about 0.01 M to about 1.2 M, such as from about 0.01 M to about 1 M, for example from about 0.01 M to about 0.8 M, such as from about 0.01 M to about 0.6 M, for example from about 0.01 M to about 0.5 M, such as from about 0.01 M to about 0.4 M, for example from about 0.01 M to about 0.1 M, such as from about 0.01 M to about 0.05 M, for example from about 0.05 M to about 2 M, such as from about 0.05 M to about 1.8 M, for example from about 0.05 M to about 1.5 M, such as from about 0.05 M to about 1.2 M, for example from about 0.05 M to about 1 M, such as from about 0.05 M to about 0.8 M, for example from about 0.05 M to about 0.6 M, such as from about 0.05 M to about 0.5 M, for example from about 0.05 M to about 0.4 M, such as from about 0.05 M to about 0.1 M, for example from about 0.1 M to about 2 M, such as from about 0.1 M to about 1.8 M, for example from about 0.1 M to about 1.5 M, such as from about 0.1 M to about 1.2 M, for example from about 0.1 M to about 1 M, such as from about 0.1 M to about 0.8 M, for example from about 0.1 M to about 0.6 M, such as from about 0.1 M to about 0.5 M, for example from about 0.1 M to about 0.4 M, such as from about 0.5 M to about 2 M, for example from about 0.5 M to about 1.8 M, such as from about 0.5 M to about 1.5 M, for example from about 0.5 M to about 1.2 M, such as from about 0.5 M to about 1 M, for example from about 0.5 M to about 0.8 M, such as from about 0.5 M to about 0.6 M, for example from about 1 M to about 2 M, such as from about 1 M to about 1.8 M, for example from about 1 M to about 1.5 M, such as from about 1 M to about 1.2 M, for example from about 1.5 M to about 2 M.

In some examples, the concentration of the redox mediator, such as the redox metal oxyanion or the redox non-metal oxyanions or the redox metal hydroxy salt (with the redox metal ion or the redox non-metal ion in the higher oxidation state) or the redox organic compound (e.g. quinone), exiting the anode chamber is from about 0.1 M to about 2 M, such as from about 0.1 M to about 1.8 M, for example from about 0.1 M to about 1.5 M, such as from about 0.1 M to about 1.2 M, for example from about 0.1 M to about 1 M, such as from about 0.1 M to about 0.8 M, for example from about 0.1 M to about 0.6 M, such as from about 0.1 M to about 0.5 M, for example from about 0.1 M to about 0.4 M, such as from about 0.5 M to about 2 M, for example from about 0.5 M to about 1.8 M, such as from about 0.5 M to about 1.5 M, for example from about 0.5 M to about 1.2 M, such as from about 0.5 M to about 1 M, for example from about 0.5 M to about 0.8 M, such as from about 0.5 M to about 0.6 M, for example from about 1 M to about 2 M, such as from about 1 M to about 1.8 M, for example from about 1 M to about 1.5 M, such as from about 1 M to about 1.2 M, for example from about 1.5 M to about 2 M.

It is to be understood that any combination of the aforementioned concentrations for the redox mediator in the lower oxidation state or in the reduced form and the redox mediator in the higher oxidation state or in the oxidized form can be combined to achieve high efficiency.

For example only, the concentration of the redox mediator, such as the redox metal oxyanion or the redox non-metal oxyanion or the redox metal salt (with the redox metal ion or the redox non-metal ion in the lower oxidation state) or the redox organic compound (e.g. hydroquinone), is from about 0.01 M to about 2 M, or from about 0.01 M to about 1.5 M, or from about 0.01 M to about 1 M, or from about 0.1 M to about 1 M; and the concentration of the redox mediator, such as the redox metal oxyanion or the redox non-metal oxyanion or the redox metal hydroxy salt (with the redox metal ion or the redox non-metal ion in the higher oxidation state) or the redox organic compound (e.g. quinone), is from about 0.2 M to about 2 M, or from about 0.3 M to about 2 M, or from about 0.5 M to about 1 M, or from about 0.3 M to about 1 M.

In some examples, the anode electrolyte has a concentration of from about 0.3 M to about 5 M, or from about 0.3 M to about 4.5 M, or from about 0.3 M to about 4 M, or from about 0.3 M to about 3.5 M, or from about 0.3 M to about 3 M, or from about 0.3 M to about 2.5 M, or from about 0.3 M to about 2 M, or from about 0.3 M to about 1.5 M, or from about 0.3 M to about 1 M, or from about 0.3 M to about 0.5 M, or from about 0.5 M to about 5 M, or from about 0.5 M to about 4.5 M, or from about 0.5 M to about 4 M, or from about 0.5 M to about 3.5 M, or from about 0.5 M to about 3 M, or from about 0.5 M to about 2.5 M, or from about 0.5 M to about 2 M, or from about 0.5 M to about 1.5 M, or from about 0.5 M to about 1 M, or from about 1 M to about 5 M, or from about 1 M to about 4.5 M, or from about 1 M to about 4 M, or from about 1 M to about 3.5 M, or from about 1 M to about 3 M, or from about 1 M to about 2.5 M, or from about 1 M to about 2 M, or from about 1 M to about 1.5 M, or from about 2 M to about 5 M, or from about 2 M to about 4.5 M, or from about 2 M to about 4 M, or from about 2 M to about 3.5 M, or from about 2 M to about 3 M, or from about 2 M to about 2.5 M, or from about 3 M to about 5 M, or from about 3 M to about 4.5 M, or from about 3 M to about 4 M, or from about 3 M to about 3.5 M, or from about 4 M to about 5 M of the total redox mediator in the solution (comprising both the redox mediator in the lower oxidation state and the redox mediator in the higher oxidation state or in the reduced and oxidized form of the redox organic compound).

In some examples, the temperature of the anode electrolyte in the electrochemical cell/reaction is from about 50° C. to about 100° C., or from about 60° C. to about 100° C., or from about 70° C. to about 100° C.

In some examples, the anode electrolyte and/or the cathode electrolyte in the electrochemical cell further comprise saltwater. In some examples, the anode electrolyte and/or the cathode electrolyte further comprise saltwater when the anode electrolyte comprises redox mediator. The term "saltwater" as used herein includes its conventional sense to refer to a number of different types of salts including, but not limited to, alkali metal halides such as, sodium halide, potassium halide, lithium halide, cesium halide, etc.; alkali earth metal halides such as, calcium halide, strontium halide, magnesium halide, barium halide, etc.; or ammonium halide; or lanthanide halide. The term "halide" as used herein relates to halogens or halide atoms such as fluoride, bromide, chloride, or iodide. In some examples, the saltwater comprises alkali metal halide and/or alkali earth metal halide in water.

The term "lanthanide halide" as used herein above includes halide of an element from lanthanide series. The element or the lanthanide from the lanthanide series is selected from the group consisting of lanthanum, cerium, praseodymium, neodymium, promethium, samarium, europium, gadolinium, terbium, dysprosium, holmium, erbium, thulium, ytterbium, lutetium, and combinations thereof. Chemically similar elements, scandium and yttrium, often collectively known as the rare earth elements, are also included in the lanthanide halides used herein. In some embodiments, the lanthanide halide is cerium halide e.g., cerium chloride or cerium bromide or cerium iodide. The lanthanide halide as used herein may be one lanthanide halide or may be a combination of two or more lanthanide halides, where the lanthanide in the one or more lanthanide halides is as noted above. The lanthanide halide can be in anhydrous form or in the form of a hydrate.

In some examples, the aforementioned saltwater can be present in the thermal reaction and may facilitate the evolution of oxygen gas. The saltwater can be re-circulated with the redox mediator from the thermal reaction to the anode electrolyte. Therefore, the saltwater cany be present in both the anode electrolyte as well as in the thermal reaction.

In some examples, the salt in the saltwater can be from about 1 wt. % wt. % to about 30 wt. % wt. % salt, or from about 1 wt. % to about 25 wt. % wt. % salt, or from about 1 wt. % to about 20 wt. % wt. % salt, or from about 1 wt. % to about 10 wt. % wt. % salt, or from about 1 wt. % to about 5 wt. % wt. % salt, or from about 5 wt. % to about 30 wt. % wt. % salt, or from about 5 wt. % to about 20 wt. % wt. % salt, or from about 5 wt. % to about 10 wt. % wt. % salt, or from about 8 wt. % to about 30 wt. % wt. % salt, or from about 8 wt. % to about 25 wt. % wt. % salt, or from about 8 wt. % to about 20 wt. % wt. % salt, or from about 8 wt. % to about 15 wt. % wt. % salt, or from about 10 wt. % to about 30 wt. % wt. % salt, or from about 10 wt. % to about 25 wt. % wt. % salt, or from about 10 wt. % to about 20 wt. % wt. % salt, or from about 10 wt. % to about 15 wt. % wt. % salt, or from about 15 wt. % to about 30 wt. % wt. % salt, or from about 15 wt. % to about 25 wt. % wt. % salt, or from about 15 wt. % to about 20 wt. % wt. % salt, or from about 20 wt. % to about 30 wt. % wt. % salt, or from about 20 wt. % to about 25 wt. % wt. % salt, or from about 2 wt. % to about 5 wt. % salt, or from about 3 wt. % to about 5 wt. % salt, or from about 5 wt. % to about 10 wt. % salt, or from about 5 wt. % to about 8 wt. % salt, or from about 2 wt. % to about 6 wt. % salt, or from about 1 wt. % to about 3 wt. % salt, of the anode electrolyte and/or the cathode electrolyte and/or in the thermal reaction.

In some examples, the water in the anode electrolyte and/or the cathode electrolyte can be from about 10% to about 80%, or from about 20% to about 80%, or from about 40% to about 80%, or from about 40% to about 70%, or from about 40% to about 60%, or from about 40% to about 50%, or from about 50% to about 80%, or from about 50% to about 70%, or from about 50% to about 60%, or from about 60% to about 80%, or from about 60% to about 70%, or from about 70% to about 80%, or from about 60% to about 85%, or from about 60% to about 75%, or from about 60% to about 65%, or from about 70% to about 75%, or from about 75% to about 80%, by weight depending on the amount of the redox mediator and optionally the salt.

In some examples, the anode electrolyte further comprises an alkali metal hydroxide or an alkali earth metal hydroxide. Examples of the alkali metal and the alkali earth metal have been provided herein. For example, in some examples, the anode electrolyte comprises potassium hydroxide or sodium hydroxide. In some examples, the anode electrolyte comprises an alkali metal hydroxide, e.g., KOH or NaOH, or an alkali earth metal hydroxide, e.g., $Ca(OH)_2$ or $Mg(OH)_2$, in an amount of from about 1 M to about 6 M, or from about 1 M to about 5 M, or from about 1 M to about 4 M, or from about 1 M to about 3 M, or from about 1 M to about 2 M, or from about 2 M to about 7 M, or from about 3 M to about 6 M, or from about 4 M to about 6 M.

The electrochemical cells in the methods and systems described herein can be membrane electrolyzers. The electrochemical cell can be a single cell or can be a stack of cells connected in series or in parallel. The electrochemical cell can be a stack of 5 or 6 or 50 or 100 or more electrolyzers connected in series or in parallel. Each cell comprises an anode, a cathode, and a separator such as an ion exchange membrane.

In some examples, the electrolyzers described herein are monopolar electrolyzers. In the monopolar electrolyzers, the electrodes can be connected in parallel where all anodes and all cathodes are connected in parallel. In such monopolar electrolyzers, the operation can take place at high amperage and low voltage. In some examples, the electrolyzers provided herein are bipolar electrolyzers. In the bipolar electrolyzers, the electrodes can be connected in series where all anodes and all cathodes are connected in series. In such bipolar electrolyzers, the operation can take place at low amperage and high voltage. In some examples, the electrolyzers are a combination of monopolar and bipolar electrolyzers and can be called hybrid electrolyzers.

In some examples of bipolar electrolyzers, the cells are stacked serially to form the overall electrolyzer and are electrically connected in two ways. In bipolar electrolyzers, a single plate, called a bipolar plate, can serve as a base plate for both the cathode and anode. The electrolyte solution can be hydraulically connected through common manifolds and collectors internal to the cell stack. The stack can be compressed externally to seal all frames and plates against each other which are typically referred to as a filter press design. In some examples, the bipolar electrolyzer can also be designed as a series of cells, individually sealed, and electrically connected through back-to-back contact, typically known as a single element design. The single element design can also be connected in parallel, in which case it would be a monopolar electrolyzer.

In some examples, the cell size can be denoted by the active area dimensions. In some examples, the active area of the electrolyzers can range from about 0.5 m to about 1.5 m tall and from about 0.4 m to about 3 m wide. In an example, the individual chamber thicknesses range from about 0.5 mm to about 50 mm.

In an example, the electrolyzers used in the methods and systems described herein are made from corrosion resistant materials. Such corrosion resistant materials can include, but are not limited to, polyvinylidene fluoride (PVDF), a fluorocarbon-based fluoroelsatomer (e.g., VITON), polyether ether ketone (PEEK), fluorinated ethylene propylene (FEP), fiber-reinforced plastic, ethylene chlorotrifluoroethylene (ECTFE, also known as HALAR), polyether imide (PEI, also known as ULTEM), perfluoroalkoxy alkanes (PFAs), ethylene tetrafluoroethylene (ETFE, also known as TEFZEL), high molecular weight polyetheylene (also known as TIVAR), a fiber-reinforced plastic-coated with an epoxy vinyl ester (such as DERAKANE 441-400 resin), graphite, AKOT, tantalum, a chromium alloy (such as HASTELLOY C2000), titanium alloys (such as titanium Grade 7 or titanium Grade 2), or combinations thereof. In some examples, these materials can be used for making the electrochemical cells and/or it components including, but not limited to, tank materials, piping, heat exchangers, pumps, reactors, cell housings, cell frames, electrodes, instrumentation, valves, and all other balance of plant materials. In some examples, the material used for making the electrochemical cell and its components include, but not limited to, titanium Grade 2.

In some examples, the anode can contain a corrosion stable, electrically conductive base support, such as, but not limited to, amorphous carbon, such as carbon black, or fluorinated carbons (for example those available under the trademark SFC™ carbons). Other examples of electrically conductive base materials include, but are not limited to, sub-stoichiometric titanium oxides, such as, Magneli phase sub-stoichiometric titanium oxides having the formula $TiO_x$ wherein x ranges from about 1.67 to about 1.9. An example of a titanium sub-oxide that can be used includes, without limitation, $Ti_4O_7$. The electrically conductive base materials can also include, without limitation, metal titanates such as $M_xTi_yO_z$, e.g., $M_xTi_4O_7$, etc. Some other examples include, without limitation, iron (in form of alloy, e.g., steel), titanium, nickel, and their alloys. In some examples, carbon-based materials can be used because they can provide mechanical support or be used as a blending material to enhance electrical conductivity, but not necessarily as a catalyst support to prevent corrosion.

In some examples, the anode is not coated with an electrocatalyst. In some examples, the anode is made of an electrically conductive base metal such as titanium, either with or without an electrocatalyst coating. Examples of electrically conductive base materials include, but are not limited to, sub-stoichiometric titanium oxides, such as, Magneli phase sub-stoichiometric titanium oxides having the formula $TiO_x$ wherein x ranges from about 1.67 to about 1.9. An example of a titanium sub-oxide includes, without limitation, $Ti_4O_7$. The electrically conductive base materials can also include, without limitation, metal titanates such as $M_xTi_yO_z$, e.g., $M_xTi_4O_7$, etc. Other examples include, without limitation, iron (in form of alloy, e.g., steel), titanium, nickel, and their alloys.

Examples of electrocatalysts have been described herein and include, but are not limited to, highly dispersed metals or alloys of platinum group metals, such as platinum, palladium, ruthenium, rhodium, iridium, or their combinations such as platinum-rhodium, platinum-ruthenium, titanium mesh coated with PtIr mixed metal oxide or titanium coated with galvanized platinum; electrocatalytic metal oxides, such as, but not limited to, $IrO_2$; gold, tantalum, carbon, graphite, organometallic macrocyclic compounds, and other electrocatalysts well known in the art. The electrodes can be coated with electrocatalyst using processes well known in the art.

In some examples, the electrodes comprise porous homogeneous composite structures as well as heterogeneous, layered type composite structures, wherein each layer can have a distinct physical and compositional make-up, e.g., porosity and electroconductive base to prevent flooding, and loss of the three phase interface, and resulting electrode performance.

In some examples, the electrodes provided herein may include anodes and cathodes having porous polymeric layers on or adjacent to the anolyte or catholyte solution side of the electrode. If present, the polymeric layers can assist in decreasing penetration and electrode fouling. Stable polymeric resins or films can be included in a composite electrode layer adjacent to the anolyte and can include resins formed from non-ionic polymers, such as polystyrene, polyvinyl chloride, polysulfone, etc., or ionic-type charged polymers like those formed from polystyrenesulfonic acid, sulfonated copolymers of styrene and vinylbenzene, carboxylated polymer derivatives, sulfonated or carboxylated polymers having partially or totally fluorinated hydrocarbon chains and aminated polymers like polyvinyl pyridine. Stable microporous polymer films can also be included on the dry side to inhibit electrolyte penetration. In some examples, gas-diffusion cathodes can include such cathodes known in the art that are coated with high surface area coatings of precious metals, such as gold and/or silver, precious metal alloys, nickel, and the like.

AEMs, in the methods and systems described herein, can be exposed to concentrated redox metal or redox non-metal ion or redox organic compound containing anolytes. As a non-limiting example, a fully quarternized amine containing polymer can be used as an AEM. In some examples, depending on the need to restrict or allow migration of a specific anion species between the electrolytes, a separator (such as an anion exchange membrane) that is more restrictive and thus allows migration of one species of anions while restricting the migration of another species of anions can be used. Such restrictive anion exchange membranes are commercially available and can be selected by one having ordinary skill in the art.

In some examples, the separator can be selected such that it can function in an alkaline electrolytic solution as appropriate. Other desirable characteristics of the separator include high ion selectivity, low ionic resistance, high burst strength, and high stability in electrolytic solution in a temperature range of room temperature to about 150° C. or higher. In some examples, the separator (such as an ion exchange membrane) prevents the transport of the redox metal ion or the non-metal ion or the organic compound from the anolyte to the catholyte or vice versa.

In some examples, the separator is stable in a temperature range of from about 0° C. to about 150° C., such as from about 0° C. to about 100° C., for example from about 0° C. to about 90° C., such as from about 0° C. to about 80° C., for example from about 0° C. to about 70° C., such as from about 0° C. to about 60° C., for example from about 0° C. to about 50° C., such as from about 0° C. to about 40° C., for example from about 0° C. to about 30° C., or higher may be used. In other examples, an ion-specific ion exchange membrane that allows migration of one type of anion and not another can be used to achieve a desired product or products in an electrolyte.

The ohmic resistance of the separator can affect voltage drop across the anode and cathode because as the ohmic resistance of the separator increases, the voltage across the anode and cathode can increase, and vice versa. Separators that can be used in the systems and methods of the present disclosure include, but are not limited to, a membrane with a relatively low ohmic resistance, a membrane with a relatively high ionic mobility, and/or a membrane with relatively high hydration characteristics that increase with the temperature, and thus decrease the ohmic resistance. By selecting a membrane with lower ohmic resistance known in the art, the voltage drop across the anode and the cathode at a specified temperature can be lowered.

As used herein, the term "voltage" refers to a potential difference between two points of a circuit, and can include a voltage or a bias applied to or drawn from an electrochemical cell that drives a desired reaction between an anode and a cathode in the electrochemical cell. In some examples, the desired reaction can be the transfer of electrons between the anode and the cathode such that hydrogen gas is formed at the cathode and oxygen gas is formed at the anode; and/or oxidation of a redox metal oxyanion or the redox non-metal oxyanion at the anode; and/or oxidation of a redox organic compound at the anode; and/or oxidation of a redox metal salt at the anode. The voltage may be applied to the electrochemical cell by any means for applying current across the anode and the cathode of the electrochemical cell. Such means are well known in the art and include, without limitation, devices, such as, an electrical power source, a fuel cell, a device powered by sun light, a device powered by wind, and combination thereof. The type of electrical power source to provide the current can be any power source known to one skilled in the art. In an example, the voltage can be applied by connecting the anode and the cathode of the cell to an external direct current (DC) power source. The power source can be an alternating current (AC) rectified into DC. The DC power source can have an adjustable voltage and current to apply a requisite amount of the voltage to the electrochemical cell.

In some examples, the current applied to the electrochemical cell is at least about 50 mA/cm$^2$, such as at least about 100 mA/cm$^2$, for example at least about 150 mA/cm$^2$, such as at least about 200 mA/cm$^2$, for example at least about 500 mA/cm$^2$, such as at least about 1000 mA/cm$^2$, for example at least about mA/cm$^2$, such as at least about 2000 mA/cm$^2$, for example at least about 2500 mA/cm$^2$, such as from about 100 mA/cm$^2$ to about 2500 mA/cm$^2$, for example from about 100 mA/cm$^2$ to about 2000 mA/cm$^2$, such as from about 100 mA/cm$^2$ to about 1500 mA/cm$^2$, for example from about 100 mA/cm$^2$ to about 1000 mA/cm$^2$, such as from about 100 mA/cm$^2$ to about 500 mA/cm$^2$, for example from about 200 mA/cm$^2$ to about 2500 mA/cm$^2$, such as from about 200 mA/cm$^2$ to about 2000 mA/cm$^2$, for example from about 200 mA/cm$^2$ to about 1500 mA/cm$^2$, such as from about 200 mA/cm$^2$ to about 1000 mA/cm$^2$, for example from about 200 mA/cm$^2$ to about 500 mA/cm$^2$, such as from about 500 mA/cm$^2$ to about 2500 mA/cm$^2$, for example from about 500 mA/cm$^2$ to about 2000 mA/cm$^2$, such as from about 500 mA/cm$^2$ to about 1500 mA/cm$^2$, for example from about 500 mA/cm$^2$ to about 1000 mA/cm$^2$, such as from about 1000 mA/cm$^2$ to about 2500 mA/cm$^2$, for example from about 1000 mA/cm$^2$ to about 2000 mA/cm$^2$, such as from about 1000 mA/cm$^2$ to about 1500 mA/cm$^2$, for example from about 1500 mA/cm$^2$ to about 2500 mA/cm$^2$, such as from about 1500 mA/cm$^2$ to about 2000 mA/cm$^2$, for example from about 2000 mA/cm$^2$ to about 2500 mA/cm$^2$.

In some examples, the anode electrolyte is transferred outside the electrochemical cell to a thermal reactor using any means for transferring the solution. Examples of structures that can be used to transfer the anode electrolyte from the electrochemical cell to a thermal reactor include, but are not limited to, one or more conduits, one or more pipes, one or more tubes, and other means for transferring liquid solutions. In some examples, the structure or structures for transferring the anode electrolyte from the electrochemical cell to the thermal reaction can be attached to the systems also include means for transferring gases such as, but not limited to, one or more conduits, one or more pipes, one or more tubes, one or more tanks, and the like.

In the systems and methods described herein, the use of the electrochemical reaction and/or the thermal reaction can be varied throughout operation of the system, for example by being different and different times of day. For example, the thermal reactor/reaction can be run during peak power price times as compared to the electrochemical cell/reaction thereby reducing the energy use. For example, the thermal reactor/reaction can be run in the daytime while the electrochemical cell/reaction can be run in the nighttime in order to save the cost of energy or vice versa.

The systems described herein can include a thermal reactor that carries out the thermal reaction of the anode electrolyte comprising the redox mediator such as the redox metal oxyanion or the redox non-metal oxyanion or the redox metal hydroxide salt to form oxygen gas. The term "reactor," as used herein, refers to any vessel or unit in which a particular specified reaction is carried out. The thermal reactor can be configured to heat the anode electrolyte comprising a redox metal oxyanion with the redox metal ion in a higher oxidation state to form oxygen gas and a redox metal oxyanion with a redox metal ion in a lower oxidation state. In some examples, the thermal reactor can be configured to heat the anode electrolyte comprising a redox non-metal oxyanion with a redox non-metal ion in a higher oxidation state to form oxygen gas and a redox non-metal oxyanion with a redox non-metal ion in a lower oxidation state. In some examples, the thermal reactor can be configured to heat the anode electrolyte comprising a redox metal hydroxy salt with a redox metal ion in a higher oxidation state to form oxygen gas and a redox metal salt with a redox metal ion in a lower oxidation state. The reactor can be any means for contacting the contents as mentioned above. Structures that can be used for the thermal reactor are well known in the art and include, but are not limited to, a pipe, a column, a duct, a tank, a series of tanks, a container, a tower, a conduit, and the like. The thermal reactor can be equipped with one or more of sensors and one or more controllers to measure and control one or more of a temperature, a pressure, and/or to control one or more of a control mechanisms, an inert gas injector, etc., to monitor, control, and/or facilitate the thermal reaction. In some examples, the reactor is made from one or more corrosion resistant materials.

In some examples, the thermal reactor can be one reactor or can be a series of reactors connected to each other. The thermal reactor can include a stirred tank. Stirring can facilitate distribution of heat within the reactor, which can accelerate the thermal reaction and formation of oxygen gas. The thermal reactor can be made of material that is compatible with the aqueous or the saltwater streams containing the redox metal ion or the non-metal ion of the system. In some examples, the thermal reactor is made from one or more corrosion resistant materials that are compatible with the metal ion or the non-metal ion containing solution. Examples of such materials include, but are not limited to, titanium, stainless steel, etc.

Effluent gases from the one or more electrochemical cells and/or the thermal reactor can be collected and optionally compressed. Liquid or solution leaving the one or more electrochemical cells and/or the thermal reactor can be cooled and recycled back to the corresponding cell or reactor or can be split. Construction materials that form other parts of the system can include, but is not limited to, a pre-stressed brick lining, a chromium alloy (such as HASTELLOY B or HASTELLOY C), a nickel-chromium alloy (such as INCONEL), a dopant grade titanium (such as AKOT titanium or Grade II titanium), tantalum, polyvinylidene fluoride (PVDF), polytetrafluoroethylene (PTFE), polyether ether ketone (PEEK), glass, or other polymers or plastics. The thermal reactor can also be designed to continuously flow the anode electrolyte in and/or out of the thermal reactor.

In some examples, thermal reaction of the redox metal oxyanion or the redox non-metal oxyanion or the redox metal hydroxy salt to form oxygen gas is carried out in the thermal reactor under one or more reaction conditions including, but not limited to, a temperature of from about 50° C. to about 500° C., such as from about 50° C. to about 400° C., for example from about 50° C. to about 300° C., such as from about 50° C. to about 200° C., for example from about 50° C. to about 100° C.; a pressure of from about 10 psig to about 500 psig, such as from about 10 psig to about 400 psig, for example from about 10 psig to about 300 psig, such as from about 10 psig to about 200 psig, for example from about 10 psig to about 100 psig, such as from about 50 psig to about 350 psig, for example from about 200 psig to about 300 psig; in the presence of hydroxide ions; in the presence of catalyst; with a pH of more than 10; or combinations thereof.

In some examples, thermal reaction to form oxygen gas can be facilitated by the presence of a catalyst. Examples of catalysts for the generation of oxygen gas by a thermal reaction include, but are not limited to, a metal oxide, such as, e.g., manganese oxide, ruthenium oxide, silicon oxide, iron oxide, or aluminum oxide, and the like; and/or a non-metal halide, such as, e.g., an alkali metal halide or an alkali earth metal halide or lanthanide halide. In some examples ions such as e.g. $Co^{2+}$, $Ni^{2+}$, $Fe^{2+}$, $Ag^+$, $Cu^{2+}$, $Mn^{2+}$, $Sn^{4+}$, $Pb^{2+}$, $Hg^{2+}$, $Ca^{2+}$, $Cl^-$, $CO_3^{2-}$, $MoO_4^{2-}$, $WO_4^{2-}$, $SiO_4^{4-}$, or combinations thereof, can act as a catalyst for the evolution of oxygen gas in the thermal reactor. In some examples, a concentration of these ions can be from about $10^{-10}$ M to about $10^{-1}$ M, for example from about $10^{-9}$ M to about $10^{-4}$ M.

In some examples, the thermal reaction to form oxygen gas is facilitated by the presence of hydroxide ions or a pH of more than 10, such as a pH of from about 10 to about 14, for example a pH of from about 10 to about 12.

Heat may be removed by vaporizing water or by using one or more heat exchangers (described further herein). In some examples, a cooling surface may not be required in the reactor and thus no temperature gradients or close temperature control may be needed.

In some examples, the system is heat integrated to improve operating costs. Various heat integration approaches can be used in the methods and systems provided herein. In an example, the system further comprises a feed/effluent heat exchanger between the electrolysis cell and the thermal reactor that serves to recover heat from the solution leaving the thermal reactor and to apply it into the stream entering the thermal reactor. In an example, a portion of the heat used in the thermal reactor/reaction is provided by heat from another process. The heat from another process can be waste heat that is not economically recoverable under normal conditions or is on-purpose heat from a clean source of heat such as a solar thermal system, a geothermal system, or a nuclear process. In an example, the heat from another process can be heat generated by the compression of hydrogen up to a delivery pressure or some other fluid pressurization work.

In some examples, at least one of the electrolysis cell/reaction or the thermal reactor/reaction is operated at an elevated pressure. Because of the requirements for hydrogen delivery pressure, in some examples, it may be advantageous to operate the electrolysis cell at a pressures above atmospheric pressure. One concern with high pressure operation of a water-splitting electrolysis cell generating hydrogen at the cathode and oxygen at the anode is the risk of internal component failure leading to an explosive mixture. In some examples, oxygen may not be generated or may be generated in very small amounts within the electrolysis cell, thereby which lowers this risk. In some examples, a minimal amount of oxygen gas formed at the anode can contaminate the hydrogen gas formed at the cathode. In such cases, a hydrogen-oxygen separator can be operably connected to the electrolysis cell to separate hydrogen gas from oxygen gas. Examples of such separators include, without limitation, a membrane or other porous separator. Such separators are commercially available.

In some examples, operating the thermal reactor/reaction at a lower pressure can facilitate release of oxygen gas. Operating the thermal reactor/reaction at a lower pressure can reduce the overall cost of production, for reasons of process safety or for other reasons. For example, the electrolysis cell can be operated at a higher pressure to reduce the cost of compression of the hydrogen while the thermal reactor can be operated at a lower pressure to facilitate oxygen evolution. In some examples, the thermal reaction can occur under a vacuum followed by compression to atmospheric pressure. The economics of the reaction may depend on the relative sources of heat and costs of compression.

In some examples, the electrochemical cell is operated at a pressure of from about 14 psi to about 100 psi, or from about 14 psi to about 50 psi, or from about 14 psi to about 25 psi, or from about 14 psi to about 20 psi, or from about 20 psi to about 50 psi, or from about 15 psi to about 25 psi, or from about 40 psi to about 500 psi, or from about 40 psi to about 400 psi, or from about 40 psi to about 300 psi, or from about 40 psi to about 200 psi, or from about 40 psi to about 100 psi, or from about 500 psi to about 3000 psi. In some examples, the thermal reactor is operated at a pressure of from about 14 psi to about 300 psi, or from about 14 psi to about 200 psi, or from about 14 psi to about 100 psi, or from about 14 psi to about 50 psi, or from about 14 psi to about 25 psi, or from about 14 psi to about 20 psi, or from about 20 psi to about 50 psi, or from about 15 psi to about 25 psi.

In some examples, the system may include one thermal reactor or a series of multiple thermal reactors connected to each other or operating separately. In an example, the thermal reactor is a packed bed such as, but not limited to, a hollow tube, pipe, column, or other vessel filled with a packing material. In an example, the thermal reactor is a trickle-bed reactor. In an example, the thermal reactor is a tray column or a spray tower. Any of the configurations of the thermal reactor described herein can be used to carry out the methods/systems provided herein.

In the thermal reactor, the anode electrolyte can be agitated by stirring or shaking or any desired technique, e.g., the thermal reaction can be carried out in a column, such as a packed column, or a trickle-bed reactor or reactors described herein. For example, when the oxygen gas is formed, a counter-current technique can be employed wherein oxygen gas passes upwardly through a column or reactor and the redox mediator solution is passed downwardly through the column or reactor.

A variety of packing material of various shapes, sizes, structure, wetting characteristics, form, and the like can be used in a packed bed or trickle bed reactor, described herein. Examples of packing material that can be used in such a thermal reactor include, but are not limited to, a polymer (e.g., PTFE), a ceramic, a glass, a metal, a natural material (e.g., wood or bark), or combinations thereof. In some examples, the packing material can be structured packing or loose or unstructured or random packing or combination thereof. In an example, structured packing material can include unflowable corrugated metal plates or gauzes. In an example, the structured packing material can fit fully in the diameter of the reactor, either individually or in one or more stacks. In an example, unstructured packing material or loose packing material or random packing material can include a flowable void filling packing material.

Examples of loose or unstructured or random packing material include, but are not limited to, Raschig rings (such as ceramic Raschig rings), pall rings (e.g., metal or plastic), lessing rings, Michael Bialecki rings (e.g., metal), berl saddles, INTALOX saddles (e.g., ceramic), super INTALOX saddles, TELLERETTE rings (e.g., spiral shape and polymeric material), etc.

Examples of structured packing material include, but are not limited to, thin corrugated metal plates or gauzes (honeycomb structures) in different shapes with a specific surface area. A structured packing material can be used as a ring or a layer or a stack of rings or layers that have diameter that fit into the diameter of the reactor. The ring can be an individual ring or a stack of rings fully filling the reactor. In some examples, voids left out by the structured packing in the reactor can be filled with an unstructured packing material.

Examples of structured packing material include, but are not limited to, FLEXIPAC, FLEXIPAC HC, INTALOX, and the like. In an example of a structured packing material, corrugated sheets can be arranged in a crisscross pattern to create flow channels for the vapor phase. Intersections of the corrugated sheets can create mixing points for liquid and vapor phases. The structured packing material can be rotated about the column (reactor) axis to provide cross mixing and spreading of vapor and liquid streams in multiple directions. The structured packing material can be used in various corrugation sizes and packing configuration can be optimized to attain a higher efficiency, capacity, and pressure drop requirements of the reactor. The structured packing material can be made of a material of construction including, but not limited to, titanium, a stainless steel alloy, carbon steel, aluminum, a nickel alloy, a copper alloy, zirconium, a thermoplastic, etc. A corrugation crimp in the structured packing material can be of any size, including, but not limited to, Y designated packing having an inclination angle of 45° from the horizontal or X designated packing having an inclination angle of 60° from the horizontal. X designated packing can provide a lower pressure drop per theoretical stage for the same surface area. In an example, the specific surface area of the structured packing is from about 50 $m^2/m^3$ to about 800 $m^2/m^3$, such as from about 75 $m^2/m^3$ to about 350 $m^2/m^3$ for example from about 200 $m^2/m^3$ to about 800 $m^2/m^3$, such as from about 150 $m^2/m^3$ to about 800 $m^2/m^3$ for example from about 500 $m^2/m^3$ to about 800 $m^2/m^3$.

The systems described herein can be used for any of one or more methods described herein. In some examples, the systems described herein further include an oxygen gas delivery system operably connected to the thermal reactor. The oxygen gas delivery system can be configured to provide oxygen gas to an oxygen gas collection unit. Oxygen gas may be delivered to the oxygen gas collection unit using any means for directing the oxygen gas from the thermal reactor. Such means for directing oxygen gas from the thermal reactor to the oxygen gas delivery system are well known in the art and include, but not limited to, one or more pipes, one or more ducts, one or more conduits, and the like. In some examples, oxygen gas from the thermal reactor can be purified before being collected and optionally compressed.

In some examples, the thermal reactor and/or the electrochemical cell and its components, as provided herein, can include a control station, configured to control one or more of the amount of the redox mediator introduced into the anode chamber of the electrochemical cell, the amount of the anode electrolyte introduced into the thermal reactor, the temperature and pressure of the units, amount of the water, the flow rate in and out of the reactor, the time and the flow rate of the water going back to the electrochemical cell, etc.

The control station can include a set of valves or multi-valve systems which are manually, mechanically or digitally controlled, or may employ any other convenient flow regulator protocol. In some examples, the control station can include a computer interface, (where regulation is computer-assisted or is entirely controlled by a computer) configured to provide a user with input and output parameters to control the amount and conditions, as described above.

The methods and systems described herein can also include one or more detectors or sensors configured for monitoring the flow of gases or the concentration of the redox mediator in a stream. Monitoring can include, but is not limited to, collecting data about the pressure, temperature, and composition of the aqueous medium and gases. The detectors or sensors be any convenient device configured to monitor a parameter of interest, including, but not limited to, one or more pressure sensors (e.g., an electromagnetic pressure sensor, a potentiometric pressure sensor, etc.), one or more temperature sensors (e.g., a resistance temperature sensor, a thermocouple, a gas thermometer, a thermistors, a pyrometers, an infrared radiation sensor, etc.), one or more volume sensors (e.g., a geophysical diffraction tomography sensor, an X-ray tomography sensor, a hydroacoustic surveyor, etc.), and one or more devices for determining a chemical makeup of a stream of interest (e.g., of an aqueous medium or a gas) (such as an IR spectrometer, an NMR spectrometer, a UV-vis spectrophotometer, a high performance liquid chromatograph, an inductively coupled plasma emission spectrometer, an inductively coupled plasma mass spectrometer, an ion chromatograph, a X-ray diffractometer, a gas chromatographs, a gas chromatography-mass spectrometer, a flow-injection analysis device, a scintillation counter, an acidimetric titration device, a flame emission spectrometer, etc.).

In some examples, the one or more detectors or sensors can include a computer interface that is configured to provide a user with collected data about one or more streams of interest. For example, a detector can determine a concentration of the redox mediator and the computer interface can provide a summary of changes in the composition within the stream over time. In some examples, the summary can be stored as a computer readable data file or may be printed out as a user readable document.

In some examples, the one or more detector or sensors can be a monitoring device that can collect real-time data (e.g., internal pressure, temperature, etc.) about a stream, the redox mediator, and/or the salt ion. In other examples, the one or more detectors or sensors can be one or more detectors configured to determine the parameters of the redox mediator, and/or the salt ion at regular intervals, e.g., determining the composition every 1 minute, every 5 minutes, every 10 minutes, every 30 minutes, every 60 minutes, every 100 minutes, every 200 minutes, every 500 minutes, or some other interval.

The following examples are put forth so as to provide those of ordinary skill in the art with a complete disclosure and description of how to make and use the systems and methods described in the present disclosure, and are not intended to limit the scope of what the inventors regard as their invention nor are they intended to represent that the experiments below are all or the only experiments performed. Various modifications of the systems and methods in addition to those described herein will become apparent to those skilled in the art from the foregoing description and accompanying figures. Such modifications fall within the scope of the appended claims. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Generation of Hydrogen Gas and Oxygen Gas

Figure 8:
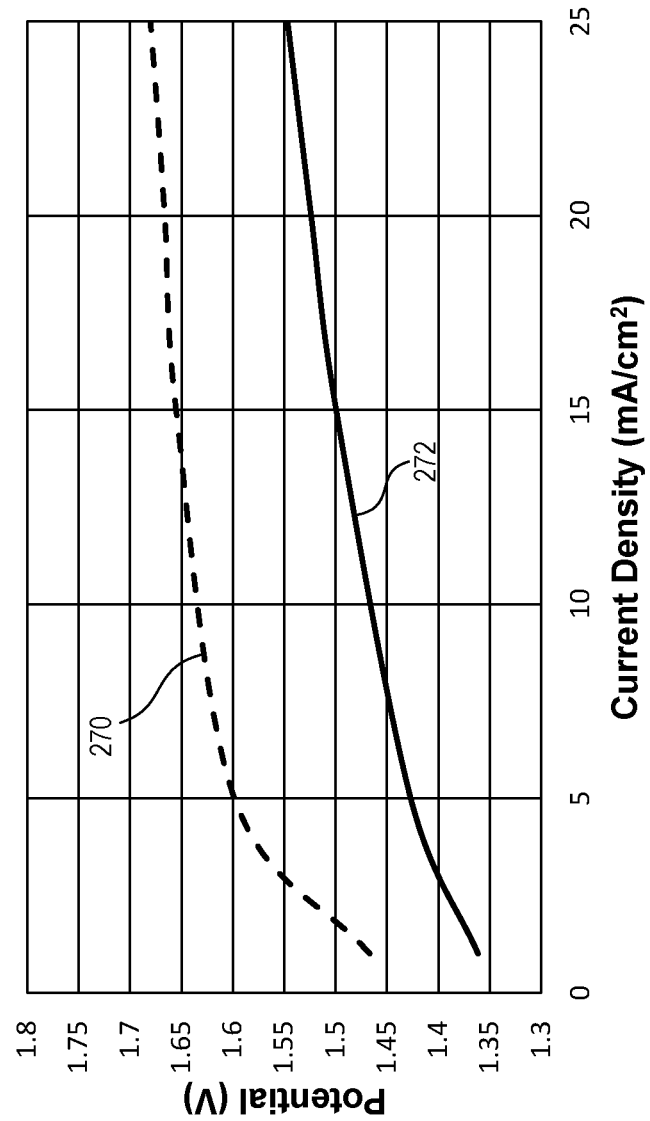
FIG. 8 is a graph showing voltage savings with the use of a salt comprising polyatomic anion in the cathode electrolyte of the electrochemical cell.

An electrochemical cell with an anode and a cathode was constructed with an anion exchange membrane separating a cathode chamber (in which the cathode was located) and an anode chamber (in which the anode was located). The cell was fed an aqueous solution of 15 wt. % sodium carbonate ($Na_2CO_3$) to the cathode chamber and an aqueous solution of 6 M potassium hydroxide (KOH) to the anode chamber. A potential between 1.3V and 3V, depending on the total current desired, was applied between the anode and cathode. Hydroxide ions were oxidized to oxygen gas at the anode and water was reduced to hydrogen gas and hydroxide ions at the cathode. The hydroxide ions maintained charge balance of the system by passing through the anion exchange membrane from the cathode chamber to the anode chamber. A steady-state pH differential of from about 3 to about 5 was maintained between the anode electrolyte and the cathode electrolyte. As is demonstrated in FIG. 8, the voltage with the $Na_2CO_3$ catholyte (represented by data series 260 in FIG. 8) was between about 100 mV and about 150 mV lower than the voltage with the KOH catholyte (represented by data series 262 in FIG. 8).

Hydrogen gas from the cathode chamber was separated from the aqueous $Na_2CO_3$ solution with a vessel for gas-liquid separation. The aqueous $Na_2CO_3$ solution from the cathode chamber was reconstituted with an amount of water to replace the water that was reduced and recirculated to an intermediate feed tank that fed the cathode chamber.

The solution from the anode chamber was passed into a thermal vessel for water removal. In this thermal vessel, the solution was heated to a temperature around 100° C., to affect water removal. Water from this vessel was separated by condensation and was used to reconstitute the aqueous $Na_2CO_3$ solution fed to the cathode chamber. The aqueous solution of KOH from the thermal vessel was fed back to an intermediate tank for feeding into the anode chamber.

Example 2

Oxidation of the Metal Oxyanion and Generation of Hydrogen Gas and Oxygen Gas

An electrochemical cell with an anode and a cathode was constructed with an anion exchange membrane separating the anode chamber and the cathode. The cell was fed an aqueous solution of 0.4 M potassium permanganate ($KMnO_4$), 0.2 M potassium manganate ($K_2MnO_4$), and 6 M potassium hydroxide (KOH) to the anode chamber and an aqueous solution of potassium hydroxide to the cathode chamber. A potential between 1.3V and 3V, depending on the total current desired, was applied between the anode and cathode, where the manganate was oxidized to permanganate at the anode and water was reduced to hydrogen gas and hydroxide ions at the cathode. The hydroxide ions maintained a charge balance of the system by passing through the anion exchange membrane from the cathode chamber to the anode chamber. The amount of manganate oxidized to permanganate was about 0.1 M. A steady-state pH differential of from about 1 to about 7 was maintained between the anode electrolyte and the cathode electrolyte.

Hydrogen gas from the cathode chamber was separated from the aqueous KOH solution with a vessel for gas-liquid separation. The aqueous KOH solution from the cathode chamber was reconstituted with an amount of water to replace the water that was reduced and recirculated to an intermediate feed tank that fed the cathode chamber.

The solution from the anode chamber was passed into a thermal reactor. In this thermal reactor, the solution was heated to a temperature around 100° C. to affect oxygen evolution and permanganate reduction, which also consumed hydroxide ions and generated manganate and water. Water from this reactor was separated by condensation and some of the water was used to reconstitute the aqueous KOH solution fed to the cathode chamber. The aqueous solution of $KMnO_4$, $K_2MnO_4$, and KOH from the thermal reactor was fed back to an intermediate tank for feeding into the anode chamber.

Example 3

Oxidation of the Metal Salt and Generation of Hydrogen Gas and Oxygen Gas

An electrochemical cell with an anode and a cathode was constructed with an anion exchange membrane separating the anode chamber and the cathode chamber. The cell was fed an aqueous solution of 0.4 M copper (I) chloride (CuCl) and 6 M potassium hydroxide (KOH) to the anode chamber and an aqueous solution of potassium hydroxide to the cathode chamber. A potential between 1.3V and 3V, depending on the total current desired, was applied between the anode and cathode, where the CuCl was oxidized to Cu(OH)Cl at the anode and water was reduced to hydrogen gas and hydroxide ions at the cathode. The hydroxide ions maintained a charge balance of the system by passing through the anion exchange membrane from the cathode chamber to the anode chamber. The amount of CuCl oxidized to Cu(OH)Cl was about 0.1 M. A steady-state pH differential of from about 1 to about 7 was maintained between the anode electrolyte and the cathode electrolyte.

The hydrogen from the cathode chamber was separated from the aqueous KOH solution with a vessel for gas-liquid separation. The aqueous KOH solution from the cathode chamber was reconstituted with an amount of water to replace the water that was reduced and was recirculated to an intermediate feed tank that feeds the cathode chamber.

The solution from the anode chamber was passed into a thermal reactor. In this thermal reactor, the solution was heated to a temperature of around 100° C. to affect oxygen evolution and Cu(OH)Cl reduction, which also consumed hydroxide ions and generated CuCl and water. Water from this reactor was separated by condensation and some of the water was used to reconstitute the aqueous KOH solution fed to the cathode chamber. The aqueous solution of CuCl and KOH from the thermal reactor was fed back to an intermediate tank for feeding into the anode chamber.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method to generate hydrogen gas, comprising:
    providing an anode and an anode electrolyte comprising water in an electrochemical cell;
    providing a cathode and a cathode electrolyte comprising water in the electrochemical cell and forming hydrogen gas and hydroxide ions at the cathode;
    separating the anode electrolyte from the cathode electrolyte by a separator;
    migrating the hydroxide ions from the cathode electrolyte to the anode electrolyte through the separator; and
    maintaining a stready-state pH differential of greater than 1 between the anode electrolyte and the cathode electrolyte by thermally removing water from the anode electrolyte and transferring the removed water to the cathode electrolyte to increase a pH of the anode electrolyte and to decrease the pH of the cathode electrolyte so that the pH of the cathode electrolyte is lower than the pH of the anode electrolyte, wherein the pH of the anode electrolyte is about 11 or more and the pH of the cathode electrolyte is about 10 or more.

2. A method according to claim 1, further comprising operating the electrochemical cell at a theoretical voltage of less than 1.23 V.

3. A method according to claim 1, wherein the pH of the anode electrolyte is from about 12 to about 15 and the pH of the cathode electrolyte is from about 11 to about 13.

4. A method according to claim 1, further comprising adding a salt comprising a polyatomic anion to the cathode electrolyte.

5. A method according to claim 4, wherein a concentration of the salt is from about 0.1 M to about 3 M.

6. A method according to claim 4, wherein the salt is stable in the cathode electrolyte and does not migrate across the separator to the anode electrolyte.

7. A method according to claim 1, further comprising reducing water at the cathode to form the hydrogen gas and the hydroxide ions.

8. A method according to claim 1, wherein thermally removing water from the anode electrolyte comprises heating at least a portion of the anode electrolyte to vaporize water from the portion of the anode electrolyte.

9. A method according to claim 1, further comprising oxidizing the hydroxide ions at the anode to form oxygen gas.

10. A method according to claim 1, wherein the anode electrolyte further comprises a redox mediator.

11. A method according to claim 1, wherein the anode electrolyte further comprises an alkali metal halide or an alkali earth metal halide.

12. A method according to claim 1, wherein the anode electrolyte further comprises a redox organic compound.

13. A method according to claim 1, wherein the steady-state pH differential is from about 2 to about 7.

14. A method according to claim 1, wherein the steady-state pH differential is from about 3 to about 6.

15. A method according to claim 10, wherein the redox mediator is selected from the group consisting of:
a redox metal oxyanion, a redox non-metal oxyanion, a redox metal salt, and a redox organic compound.

16. A method according to claim 10, further comprising oxidizing the redox mediator at the anode from a lower oxidation state to a higher oxidation state.

17. A method according to claim 8, wherein heating at least the portion of the anode electrolyte comprises heating at least the portion of the anode electrolyte to a temperature of about 100° C.

* * * * *